US012510845B2

(12) United States Patent
Matsuzaki et al.

(10) Patent No.: US 12,510,845 B2
(45) Date of Patent: Dec. 30, 2025

(54) IMAGE FORMING APPARATUS WITH PUMP PORTION FOR GENERATING AIR TO MOVE TONER TO TONER SUPPLYING DEVICE TO DEVELOPING DEVICE

(71) Applicant: CANON KABUSHIKI KAISHA, Tokyo (JP)

(72) Inventors: Hiroomi Matsuzaki, Shizuoka (JP); Hiroki Ogino, Shizuoka (JP); Tetsuo Uesugi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/378,209

(22) Filed: Oct. 10, 2023

(65) Prior Publication Data

US 2024/0036495 A1 Feb. 1, 2024

Related U.S. Application Data

(60) Division of application No. 17/695,918, filed on Mar. 16, 2022, now Pat. No. 11,815,830, which is a (Continued)

(30) Foreign Application Priority Data

Sep. 17, 2019 (JP) ................................ 2019-168100
Sep. 17, 2019 (JP) ................................ 2019-168101
Sep. 17, 2019 (JP) ................................ 2019-168102

(51) Int. Cl.
*G03G 15/08* (2006.01)

(52) U.S. Cl.
CPC ..... *G03G 15/0879* (2013.01); *G03G 15/0865* (2013.01); *G03G 15/0874* (2013.01); (Continued)

(58) Field of Classification Search
CPC .......... G03G 15/0865; G03G 15/0874; G03G 15/0875; G03G 15/0879; G03G 2215/066; (Continued)

(56) References Cited

U.S. PATENT DOCUMENTS 5,943,529 A 8/1999 Miyabe et al.
5,966,567 A 10/1999 Matsuzaki et al.
(Continued)

FOREIGN PATENT DOCUMENTS

CN 105182715 A 12/2015
EP 1 154 333 A2 11/2001
(Continued)

OTHER PUBLICATIONS

International Search Report and Written Opinion for International Patent Application No. PCT/JP2020/035884.
(Continued)

*Primary Examiner* — Robert B Beatty
(74) *Attorney, Agent, or Firm* — Venable LLP

(57) ABSTRACT

An image forming apparatus includes a pump portion that is variable in volume, a feeding path portion including a connection opening communicating with the pump portion at one end and including a discharge opening at the other end, and a toner accommodating portion connected to a communicating opening that is an intermediate portion between the one end and the other end of the feeding path portion. The apparatus also includes a main assembly path porting including a pipe configured to feed toner upward from the discharge opening toward the receiving opening by air flow generated by the pump portion.

13 Claims, 53 Drawing Sheets

Related U.S. Application Data continuation of application No. PCT/JP2020/035884, filed on Sep. 15, 2020.

(52) U.S. Cl.
CPC ....... *G03G 15/0868* (2013.01); *G03G 15/087* (2013.01); *G03G 15/0886* (2013.01); *G03G 2215/066* (2013.01); *G03G 2215/0682* (2013.01)

(58) Field of Classification Search
CPC ..... G03G 2215/068; G03G 2215/0682; G03G 2215/0685
USPC .................................. 399/258, 262; 222/163
See application file for complete search history.

(56) References Cited

U.S. PATENT DOCUMENTS 6,011,941 A 1/2000 Takashima et al.
6,097,906 A 8/2000 Matsuzaki et al.
6,144,815 A 11/2000 Chadani et al.
6,173,140 B1 1/2001 Suzuki et al.
6,173,145 B1 1/2001 Chadani et al.
6,205,305 B1 3/2001 Suzuki et al.
6,219,504 B1 4/2001 Matsuzaki et al.
6,282,389 B1 8/2001 Matsuzaki et al.
6,405,004 B2 6/2002 Matsuzaki et al.
6,507,720 B2 1/2003 Kabumoto et al.
6,549,736 B2 4/2003 Miyabe et al.
6,792,229 B2 9/2004 Matsuzaki
6,795,666 B2 9/2004 Miyabe et al.
6,931,226 B2 8/2005 Chadani et al.
6,934,485 B2 8/2005 Miyabe et al.
7,079,787 B2 7/2006 Ogino et al.
7,127,192 B2 10/2006 Batori et al.
7,224,925 B2 5/2007 Sato et al.
7,349,657 B2 3/2008 Sato et al.
7,412,193 B2 8/2008 Sato et al.
7,418,225 B2 8/2008 Morioka et al.
8,565,649 B2 10/2013 Murakami et al.
8,867,955 B2 10/2014 Yamaguchi et al.
9,063,464 B2 6/2015 Furutani et al.
9,146,500 B2 9/2015 Uesugi et al.
9,152,081 B2 10/2015 Yasui et al.
9,188,906 B2 11/2015 Batori et al.
9,207,581 B2 12/2015 Wada et al.
9,229,368 B2 1/2016 Okino et al.
9,291,942 B2 3/2016 Matsuzaki et al.
9,302,801 B2 4/2016 Matsumura et al.
9,304,439 B2 4/2016 Matsuzaki et al.
9,304,440 B2 4/2016 Yoshida et al.
9,310,717 B2 4/2016 Matsunaga et al.
9,354,550 B2 5/2016 Murakami et al.
9,354,551 B2 5/2016 Murakami et al.
9,354,553 B2 5/2016 Yoshida et al.
9,360,831 B2 6/2016 Matsuzaki et al.
9,383,678 B2 7/2016 Furutani et al.
9,494,890 B2 11/2016 Komatsu et al.
9,529,304 B2 12/2016 Uesugi et al.
9,599,930 B2 3/2017 Matsuzaki et al.
9,665,040 B2 5/2017 Matsuzaki et al.
9,715,191 B2 7/2017 Ogino et al.
9,753,402 B2 9/2017 Murakami et al.
9,857,733 B2 1/2018 Matsuzaki
9,885,978 B2 2/2018 Matsuzaki et al.
10,001,727 B2 6/2018 Matsuzaki et al.
10,162,289 B2 12/2018 Matsuzaki et al.
10,175,609 B2 1/2019 Matsuzaki et al.
10,185,251 B2 1/2019 Nonaka et al.
10,191,412 B2 1/2019 Okino et al.
10,203,631 B2 2/2019 Murakami et al.
10,423,120 B2 9/2019 Yamaguchi et al.
10,539,915 B2 1/2020 Mori et al.
10,620,567 B2 4/2020 Matsuzaki et al.
10,671,013 B2 6/2020 Uesugi et al.
10,739,702 B2 8/2020 Ogino et al.
10,754,276 B2 8/2020 Murakami et al.
10,795,311 B2 10/2020 Kamoshida et al.
10,824,106 B2 11/2020 Mori et al.
10,948,849 B2 3/2021 Okino et al.
10,948,871 B2 3/2021 Uesugi et al.
10,955,796 B2 3/2021 Uesugi et al.
10,969,730 B2 4/2021 Sueshige et al.
11,016,438 B2 5/2021 Kamoshida et al.
11,061,364 B2 7/2021 Uesugi et al.
11,061,366 B2 7/2021 Uesugi et al.
11,061,367 B2 7/2021 Uesugi et al.
11,061,368 B2 7/2021 Uesugi et al.
11,067,942 B2 7/2021 Uesugi et al.
11,067,947 B2 7/2021 Uesugi et al.
11,067,948 B2 7/2021 Uesugi et al.
11,073,790 B2 7/2021 Uesugi et al.
11,073,791 B2 7/2021 Uesugi et al.
11,150,591 B2 10/2021 Mori et al.
11,188,009 B2 11/2021 Murakami et al.
11,334,023 B2 5/2022 Uesugi et al.
2002/0009310 A1 1/2002 Kabumoto et al.
2009/0016777 A1 1/2009 Miyamoto et al.
2012/0014713 A1 1/2012 Murakami et al.
2012/0014722 A1 1/2012 Okino et al.
2012/0285540 A1 11/2012 Morii et al.
2013/0266345 A1 10/2013 Matsumoto et al.
2014/0016967 A1 1/2014 Murakami et al.
2014/0233986 A1 8/2014 Murakami et al.
2014/0248061 A1 9/2014 Takami et al.
2015/0277285 A1 10/2015 Okino et al.
2015/0378278 A1 12/2015 Kamura et al.
2016/0131994 A1 5/2016 Murakami et al.
2017/0115599 A1 4/2017 Kosone et al.
2017/0242367 A1 8/2017 Jimba et al.
2017/0285521 A1 10/2017 Murakami et al.
2018/0307158 A1 10/2018 Murakami et al.
2019/0113865 A1 4/2019 Matsuzaki et al.
2019/0137905 A1 5/2019 Okino et al.
2019/0250532 A1 8/2019 Murakami et al.
2019/0294080 A1 9/2019 Sadamitsu
2020/0004177 A1 1/2020 Okino et al.
2020/0033795 A1 1/2020 Uesugi et al.
2020/0033798 A1 1/2020 Uesugi et al.
2020/0033799 A1 1/2020 Uesugi et al.
2020/0310298 A1 10/2020 Kawata et al.
2020/0348616 A1 11/2020 Murakami et al.
2021/0165345 A1 6/2021 Okino et al.
2021/0286312 A1 9/2021 Uesugi et al.
2021/0341870 A1 11/2021 Mori et al.
2022/0035269 A1 2/2022 Murakami et al.
2022/0066385 A1 3/2022 Uesugi et al.
2022/0075312 A1 3/2022 Ozaki et al.

FOREIGN PATENT DOCUMENTS

JP H07-281521 A 10/1995
JP 2002-099130 A 4/2002
JP 2008-89946 A 4/2008
JP 2009-069800 A 4/2009
JP 2009-103805 A 5/2009
JP 2010-256894 A 11/2010
JP 2011-043861 A 3/2011
JP 2013-114181 A 6/2013
JP 5511471 B2 6/2014
JP 2015-028650 A 2/2015
JP 2017-72717 A 4/2017
JP 2018-112660 A 7/2018
JP 2018-169572 A 11/2018
JP 2019-066859 A 4/2019
JP 2019-082720 A 5/2019

OTHER PUBLICATIONS

Apr. 11, 2023 Office Action in Japanese Patent Application No. 2019-168100 (with English translation).

(56) References Cited

OTHER PUBLICATIONS

Aug. 17, 2023 Extended European Search Report in European Patent Application No. 20864737.0.
Jun. 17, 2024 Chinese Office Action in Chinese Application No. 202080064862.4 (with English translation).
Oct. 22, 2024 Office Action in Japanese Application No. 2023-126201 (with English translation).
Oct. 15, 2025 Communication in European Patent Application Pub. No. 20 864 737.0.

(a)

(b)

(a)

(b)

(a)

(b)

(a)

(b)

IMAGE FORMING APPARATUS WITH PUMP PORTION FOR GENERATING AIR TO MOVE TONER TO TONER SUPPLYING DEVICE TO DEVELOPING DEVICE

TECHNICAL FIELD

The present invention relates to a developer supplying device for use with an image forming apparatus such as a copying machine or a printer. The image forming apparatus such as the copying machine or the printer forms an image on a recording material such as paper by using an electrophotographic image forming process, for example. For example, an electrophotographic copying machine, an electrophotographic printer (for example, LED printer, laser beam printer or the like), an electrophotographic facsimile apparatus, and the like are included.

Further, the developer supplying device for use with such an image forming apparatus (hereinafter, also referred to as a "toner cartridge") includes an accommodating container in which at least a developer (hereinafter, also reformed to as "toner") was accommodated. Further, the developer supplying device includes a discharging means for discharging the accommodated toner from the toner cartridge, and refers to one in which these means (members) are integrally constituted and which is made mountable dismountable from an image forming apparatus main assembly.

BACKGROUND ART

In Japanese Laid-Open Patent Application (JP-A) 2010-256894, as in a first comparison example shown in FIG. 16, a toner cartridge B100 is provided with a toner accommodating portion 117 for accommodating the toner and a pump portion 121 for discharging the toner. Further, by utilizing a flow of air generated by the pump portion 121, the toner in the toner accommodating portion 117 can be discharged downward from a discharge opening 123.

SUMMARY OF THE INVENTION

However, in the toner cartridge B100, shown in FIG. 16, of JP-A 2010-256894, the discharge opening 123 was provided just below the neighborhood of the pump portion 121, and therefore, a distance and a direction from the discharge opening 123 to a toner supply destination were limited.

OBJECT OF THE INVENTION

An object of the present invention is to provide a developer supplying device improved in degree of freedom of a distance and a direction from a discharge opening to a toner supply destination.

A representation constitution of the developer supplying device according to the present invention includes a pump portion which is variable in volume, a feeding path portion including a connection opening connected to the pump portion at one end and including a discharge opening at the other end, and a developer accommodating portion connected to an intermediate portion between the above-described one end and the above-described the other end of the feeding path portion and for accommodating a developer.

Effect of the Invention

According to the present invention, the degree of the freedom of the distance and the direction from the discharge opening to the toner supply destination is improved.

EMBODIMENTS FOR CARRYING OUT THE INVENTION

An embodiment of a developer supplying device and an image forming apparatus according to the present invention will be specifically described by the drawings (figures).

First Embodiment

First, a constitution of a first embodiment of the developer supplying device and the image forming apparatus according to the present invention will be described using FIG. 1 to FIG. 7.

<Image Forming Apparatus>

Figure 1:
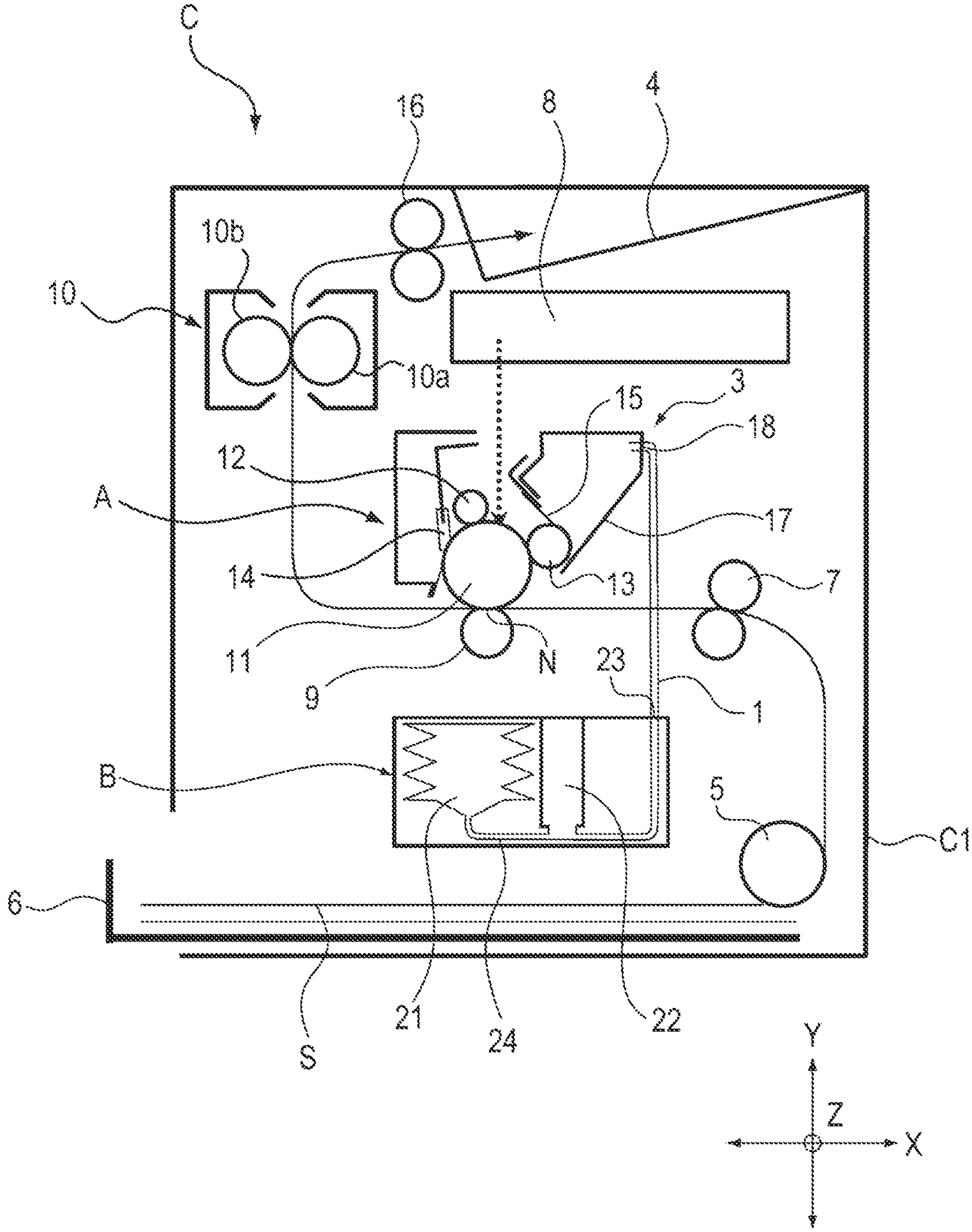
FIG. 1 is a sectional view showing a constitution of an image forming apparatus in an embodiment of the present invention.

A constitution of an image forming apparatus C and a process cartridge A will be described using FIG. 1. FIG. 1 is a sectional view showing a constitution of the image forming apparatus C of this embodiment. Incidentally, in the following description, description will be made, in some cases, using a coordinate system in which an up-down (vertical direction) of FIG. 1 is a Y axis direction, a horizontal direction of FIG. 1 is an X axis direction, and a depth direction of FIG. 1 is a Z axis direction. The image forming apparatus C shown in FIG. 1 is an image forming apparatus for forming an image on a recording material S such as paper by using an electrophotographic (image) forming process. At a central portion of the image forming apparatus C shown in FIG. 1, the process cartridge A detachably mountable to an apparatus main assembly 1C of the image forming apparatus C is provided.

<Process Cartridge>

The constitution of the process cartridge A will be described using FIG. 1. Here, the process cartridge A is one including a photosensitive drum 11 as an image bearing member, and various process means actable on the photosensitive drum 11. Here, as the process means, for example, there is a charging roller as a charging means for electrically charging a surface of the photosensitive drum 11 uniformly. Further, as the process means, there is a developing device 3 for developing an electrostatic latent image, formed on the surface of the photosensitive drum 11, as a toner image by supply toner as a developer to the electrostatic latent image. Further, as the process means, there is a cleaning blade 14 as a cleaning means for removing residual toner remaining on the surface of the photosensitive drum 11 after transfer.

The process cartridge A of this embodiment is provided with the charging roller 12 at a periphery of the photosensitive drum 11 rotating in the clockwise direction of FIG. 1 and includes the cleaning blade 14, having elasticity, as the cleaning means. Further, the developing device 3 includes a developing roller 13 provided opposed to the surface of the photosensitive drum 11, a developing blade 15, and a toner accommodating portion 17 for accommodating the toner. The toner accommodating portion 17 is provided with a receiving portion 18 for receiving the toner supplied, via a maximum acceleration(-side) path portion 1, from a toner cartridge B provided below the process cartridge A.

<Toner Cartridge>

Figure 2:
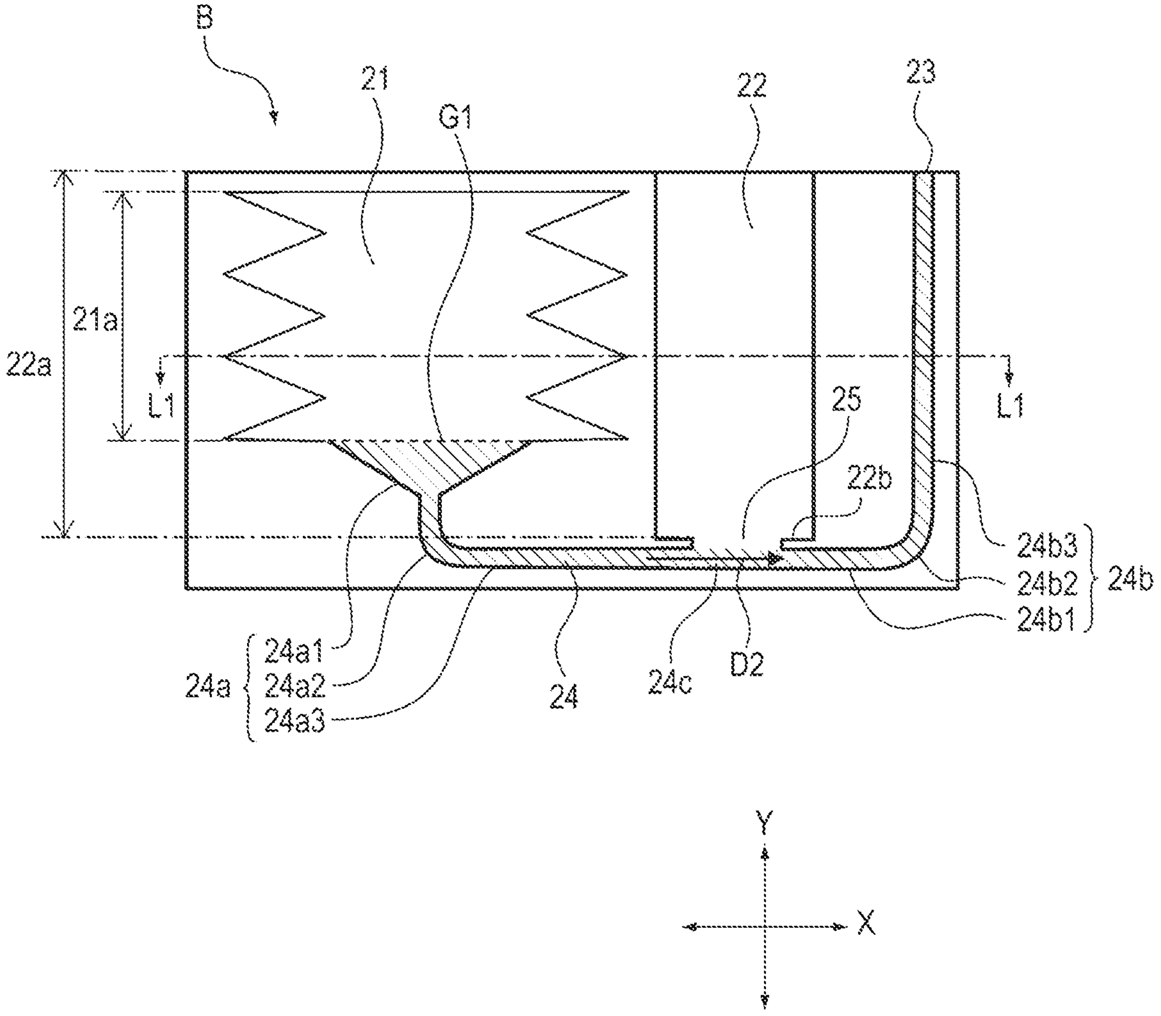
FIG. 2 is a sectional view showing a constitution of a toner cartridge of a first embodiment.

A constitution of the toner cartridge B as a developer supplying device used in the image forming apparatus C will be described using FIG. 1 and FIG. 2. FIG. 2 is a sectional view showing the constitution of the toner cartridge B of this embodiment. The toner cartridge B shown in FIG. 1 and FIG. 2 is provided such as to be detachably mountable to the apparatus main assembly C1 of the image forming apparatus C.

As shown in FIG. 1, the toner cartridge B includes a toner accommodating portion 22 as a developer accommodating portion for accommodating toner (developer) in an inside thereof. Further, the toner cartridge B includes a volume-variable pump portion 21 for creating a flow of air by a volume change. Further, the toner cartridge B includes a discharge opening 23 for permitting discharge of the toner from the toner accommodating portion 22 of the toner cartridge B to an outside. Further, the toner cartridge B includes a connection opening (boundary G1) connected to the pump portion 21 at one end and includes a feeding path portion 24 (hatching portion of FIG. 2) including to the discharge opening 23 at the other end. The toner cartridge B supplies the toner into the toner accommodating portion 17 of the process cartridge A via the main assembly path portion 1 provided in the apparatus main assembly C1 of the image forming apparatus C.

As shown in FIG. 2, the toner accommodating portion 22 is connected to an intermediate portion between one end (boundary G1) and the other end (discharge opening 23) of the feeding path portion 24. A volume change amount of the pump portion 21 is set so as to be larger than a total volume from the boundary G1 (connection opening) to the discharge opening 23 of the feeding path portion 24. The toner accommodating portion 22 and the feeding path portion 24 communicate with each other via a communication opening 25.

The process cartridge A and the toner cartridge B which are shown in FIG. 1 are mounted in the apparatus main assembly C1 of the image forming apparatus C and are used for image formation. At a lower portion of the image forming apparatus C, a feeding cassette 6 in which recording materials S such as paper are accommodated. The recording materials S accommodated in the feeding cassette 6 are fed and separated one by one by an unshown separating means, and the separated recording material S is fed. Thereafter, a leading end portion of the recording material S is abutted against a nip of registration rollers 7, so that oblique movement of the recording material S is corrected.

In synchronism with a feeding operation of the recording material S from the feeding cassette 6, the surface of the photosensitive drum 11 uniformly charged by the charging roller 12 is selectively exposed to light depending on image information, so that an electrostatic latent image is formed. On the other hand, the toner accommodated in the toner accommodating portion 17 is supplied to the developing roller 13, and the toner is carried in a thin layer state on a surface of the developing roller 13 by the developing blade 15. By applying a developing bias to the developing roller 13, the toner is supplied to the electrostatic latent image formed on the surface of the photosensitive drum 11, so that the electrostatic latent image is developed as a toner image.

In conformity to a timing when the toner image formed on the surface of the photosensitive drum 11 reaches a transfer nip N formed by the photosensitive drum 11 and a transfer roller 9, the recording material S is fed to the transfer nip N by the registration rollers 7. By applying a transfer bias voltage to the transfer roller 9, in the transfer nip N, the toner image formed on the surface of the photosensitive drum 11 is transferred onto the recording material S.

The recording material S on which the toner image is transferred is conveyed to a fixing device 10, and is heated and pressed by a heating unit 10*a* and a pressing roller 10*b* which are provided in the fixing device 10, so that the toner image is fixed on the recording material S. The recording material S on which the toner image is fixed is conveyed to discharging rollers 16 and is discharged onto a discharge portion 4 provided at an upper portion of the image forming apparatus C.

Figure 3:
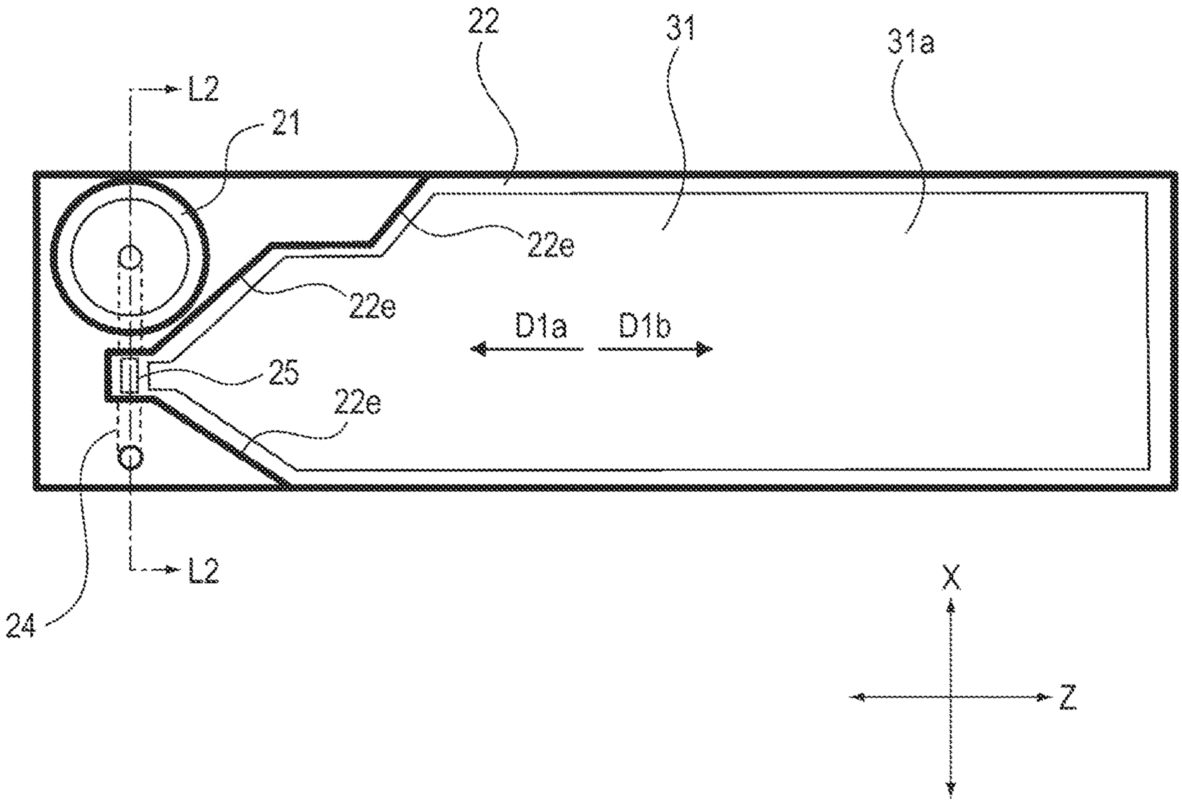
FIG. 3 is a sectional view viewed from above when the toner cartridge of the first embodiment is cut in a horizontal direction.

FIG. 3 is a sectional view of the toner cartridge B of this embodiment as seen from above when the toner cartridge B is cut in a horizontal direction. FIG. 2 is a sectional view of a cross section of the toner cartridge B of this embodiment, as seen in a rightward direction of FIG. 3, when the toner cartridge B is cut in a vertical direction along L2-L2 (line) of FIG. 3. On the other hand, FIG. 3 is a sectional view of a cross section of the toner cartridge B of this embodiment, as seen from above, when the toner cartridge B is cut in the horizontal direction along L1-L2 (line) of FIG. 2.

As shown in FIG. 3, the toner accommodating portion 22 accommodates the toner therein and includes a feeding portion 31 for feeding the toner accommodated in the toner accommodating portion 22. As the feeding portion 31 in this embodiment, the toner on a feeding plate 31*a* is fed by reciprocating the feeding plate 31*a* in arrow D1*a* and D1*b* direction of FIG. 3 along a bottom of an inside of the toner accommodating portion 22.

Here, maximum acceleration when the feeding plate 31*a* moves in the arrow D1*a* direction in which the feeding plate 31*a* approaches a communication opening 25 is set so as to become smaller than maximum acceleration when the feeding plate 31*a* moves in the arrow D1*b* direction in which the feeding plate 31*a* moves away from the communication opening 25. By this, the toner on the feeding plate 31*a* is fed in the arrow D1*a* direction in which the toner approaches the communication opening 25. By this, the toner on the feeding plate 31*a* is fed in the arrow D1*a* direction and is supplied into the feeding path portion 24 by a self-weight thereof from the communication opening 25.

Incidentally, as a constitution in which the toner accommodated in the toner accommodating portion 22 is fed, a constitution in which the toner is fed by the rotating an unshown flexible sheet in the toner accommodating portion 22 or a constitution in which the toner is fed by rotating an unshown screw in the toner accommodating portion 22 may be used. The bottom 22*b* of the toner accommodating portion 22 shown in FIG. 3 on one end side (arrow D1*a* direction side of FIG. 3) with respect to a longitudinal direction is provided with the communication opening 25 which is an opening downward opening and which is connected to the feeding path portion 24. As shown in FIG. 3, the communication opening 25 is constituted by a rectangle.

<Pump Portion>

Figure 4:
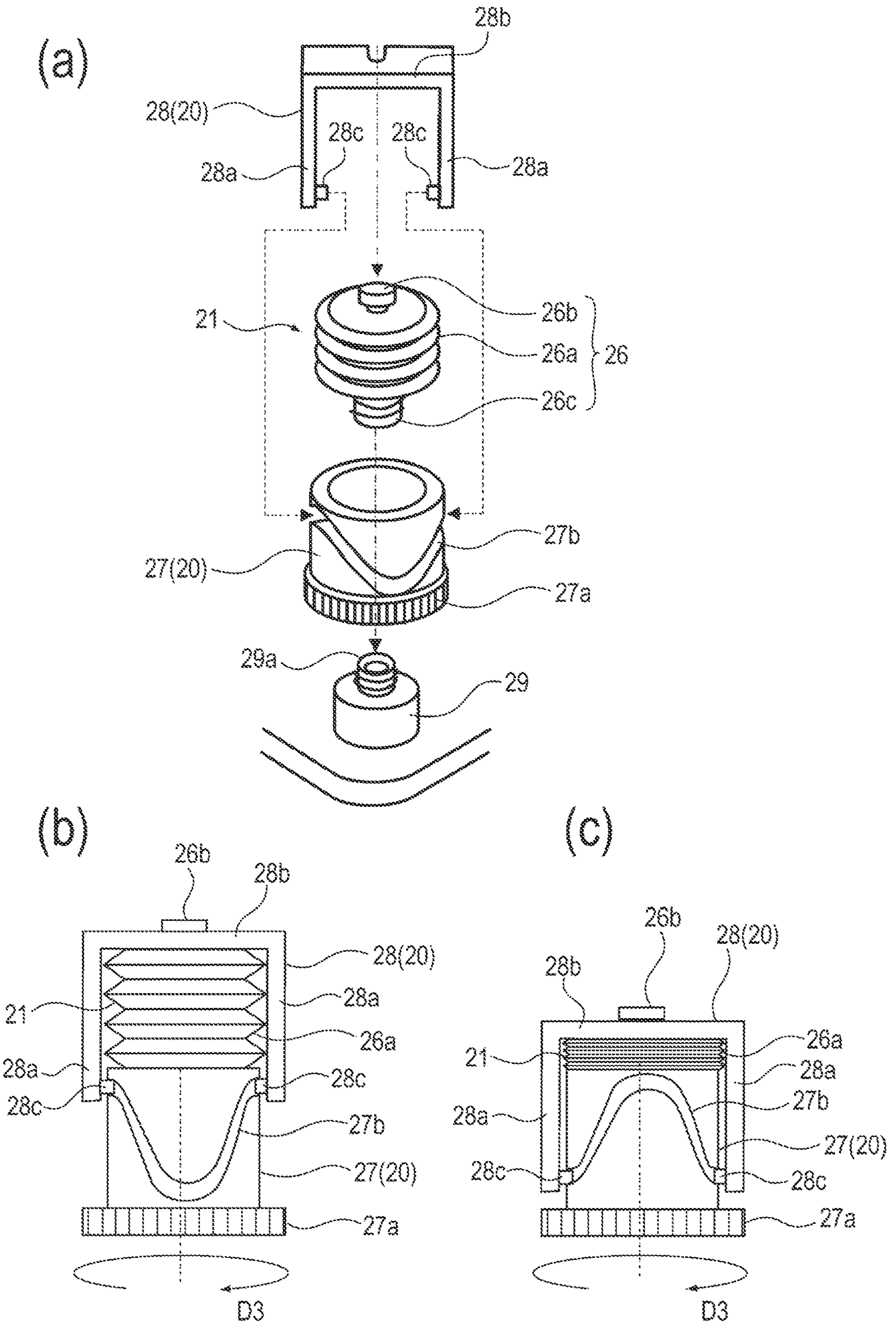
In FIG. 4, part (a) is an exploded perspective view showing a constitution of a driving portion for a pump portion of the first embodiment. Part (b) is a side view showing a state when the pump portion of the first embodiment is expanded. Part (c) is a side view showing a state when the pump portion of the first embodiment is contracted.
Figure 5:
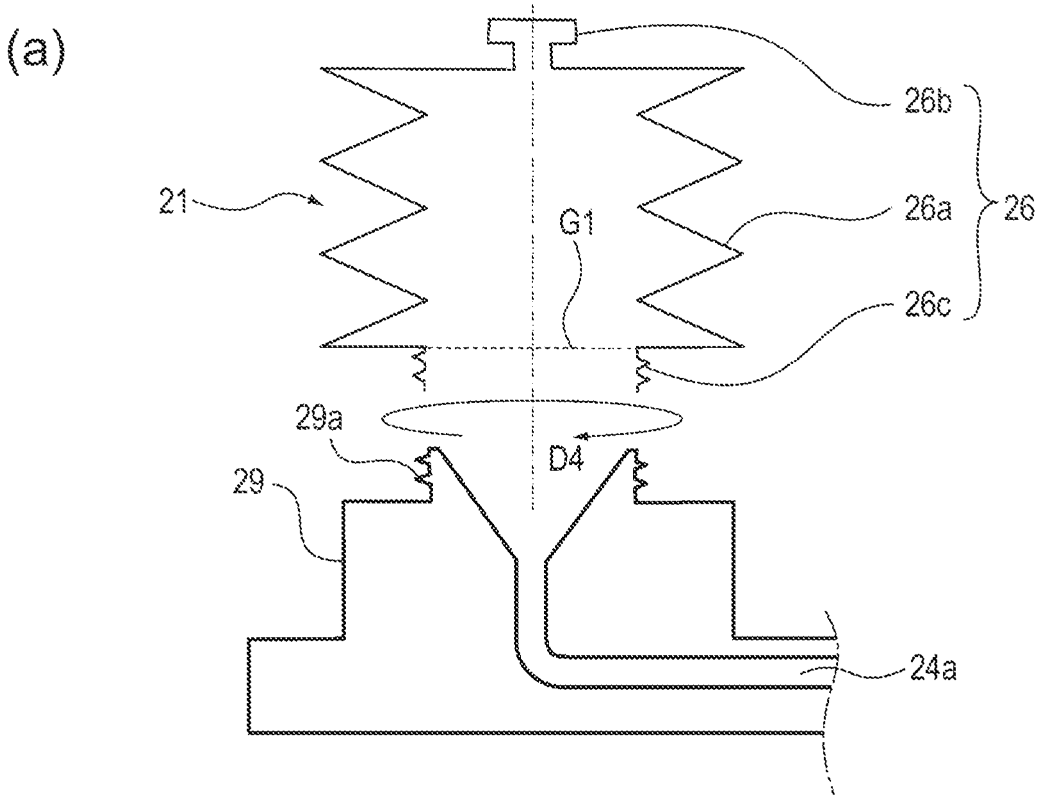
In FIG. 5, part (a) is a sectional view before the pump portion of the first embodiment is assembled. Part (b) is a sectional view after the pump portion of the first embodiment is assembled.
Figure 5:
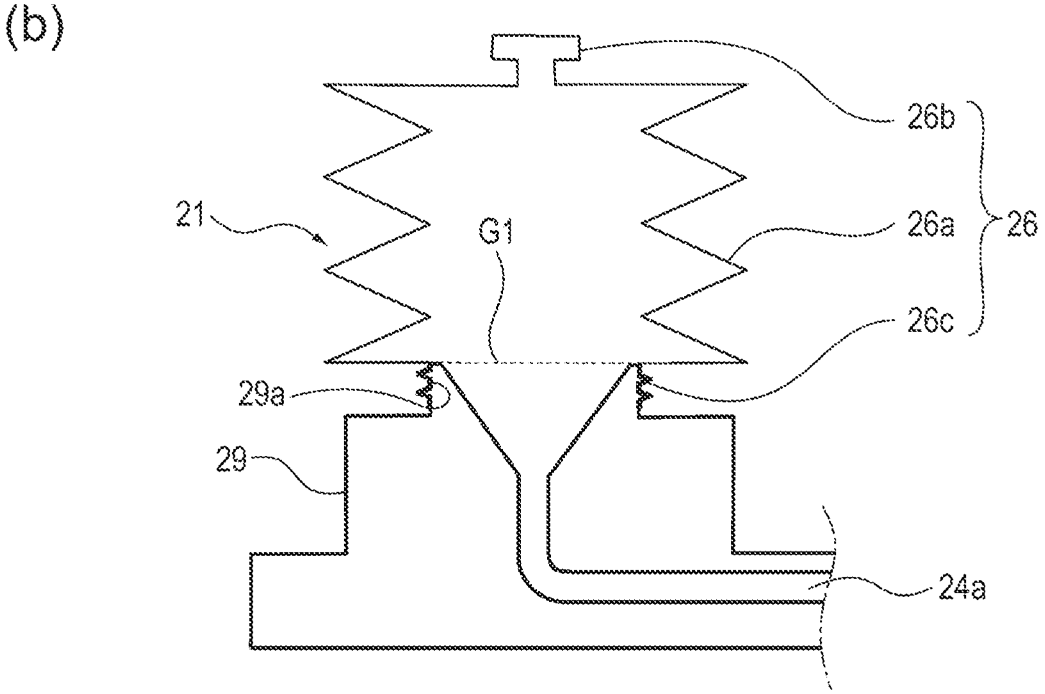

Next, a constitution of a pump portion 21 will be described using FIG. 4 and FIG. 5. Part (a) of FIG. 4 is an exploded perspective view showing a constitution of a driving portion 20 of the pump portion 21 in this embodiment. Part (b) of FIG. 4 is a side view showing a state in which the pump portion 21 in this embodiment is expanded. Part (c) of FIG. 4 is a side view showing a state in which the pump portion 21 in this embodiment is contracted. Part (a) of FIG. 5 is a sectional view before the pump portion 21 in this embodiment is assembled. Part (b) of FIG. 5 is a sectional view after the pump portion 21 in this embodiment is assembled.

<Driving Portion>

As shown in parts (a) to (c) of FIG. 4, the pump portion 21 changes in volume by being driven by the driving portion 20. The pump portion 21 is driven by the driving portion 20 so that a volume change amount of the pump portion 21 becomes larger than a total volume from the boundary G1 (connection opening) to the discharge opening 23. The driving portion is constituted by including a pump driving gear 27 and a reciprocating member 28. The pump portion 21 comprises in a downward direction via the pump driving gear 27 and the reciprocating member 28 as shown in part (c) of FIG. 4, and expands in an upward direction as shown in part (b) of FIG. 4. The pump driving gear 27 includes a gear portion 27*a* and a cam portion 27*b*, and is rotated in an arrow D3 direction of parts (b) and (c) of FIG. 4 by receiving a driving force inputted from the image forming apparatus C.

The pump driving gear 27 is constituted in a cylindrical shape, and is rotatably supported by a supporting member 29 constituted such that an outer peripheral surface is a circumferential surface. The gear portion 27*a* is formed over a full length of a lower end portion of the pump driving gear 27 with respect to a circumferential direction of the outer peripheral surface. At the outer peripheral surface of the pump driving gear 27 and at the upper portion of the gear portion 27*a*, the cam portion 27*b* consisting of a groove portion which causes continuous reciprocating displacement in an axial direction (up-down direction of FIG. 4) of the pump driving gear 27 is formed over the full length of the pump driving gear 27 with respect to the circumferential direction of the outer peripheral surface.

By rotation of the pump driving gear 27 in an arrow D3 direction of parts (b) and (c) of FIG. 4, the reciprocating member 28 engaged with the cam portion 27*b* is reciprocated in the up-down direction of parts (b) and (c) of FIG. 4. The reciprocating member 28 engages with an engaging portion 26*b* provided at an upper end portion of a bellow-shaped member 26 constituting a part of the pump portion 21. The reciprocating member 28 is constituted by including a pair of arm portions 28*a* and fixing portions 28*b* each connected to one end portion of each of the pair of arm portions 28*a*, and at the other end portion of each of the arm portions 28*a*, a projected portion 28*c* projecting toward an inside of each of the arm portions 28*a* is provided. The projected portion 28*c* of the reciprocating member 28 is slidably inserted into the groove portion of the cam portion 27*b* of the pump driving gear 27.

Figure 15:
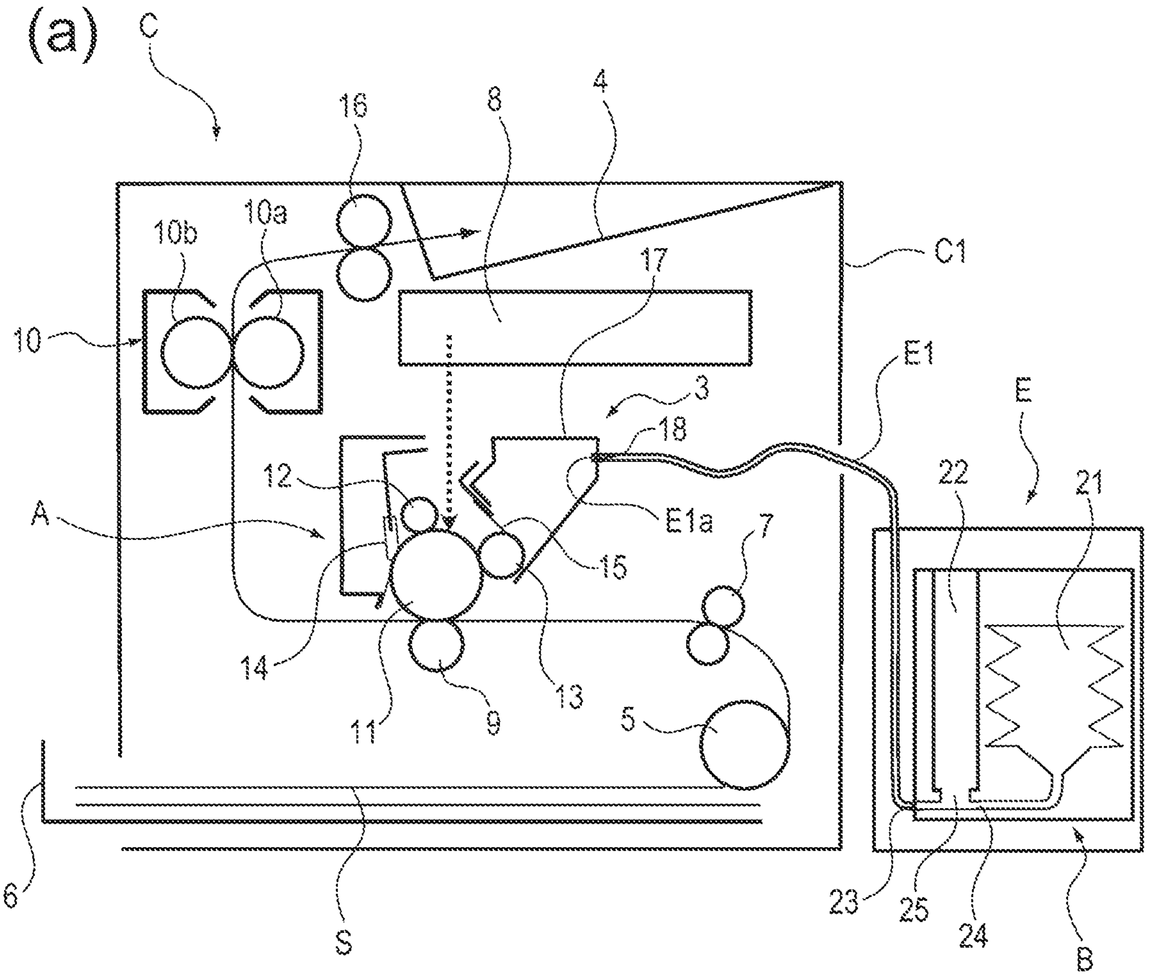
In FIG. 15, part (a) is a sectional view showing a constitution in which a toner supplying device is connected to an outside of an image forming apparatus of a fourth embodiment. Part (b) is a sectional view showing a constitution of the toner supplying device dismounted from an apparatus main assembly of the image forming apparatus.
Figure 15:
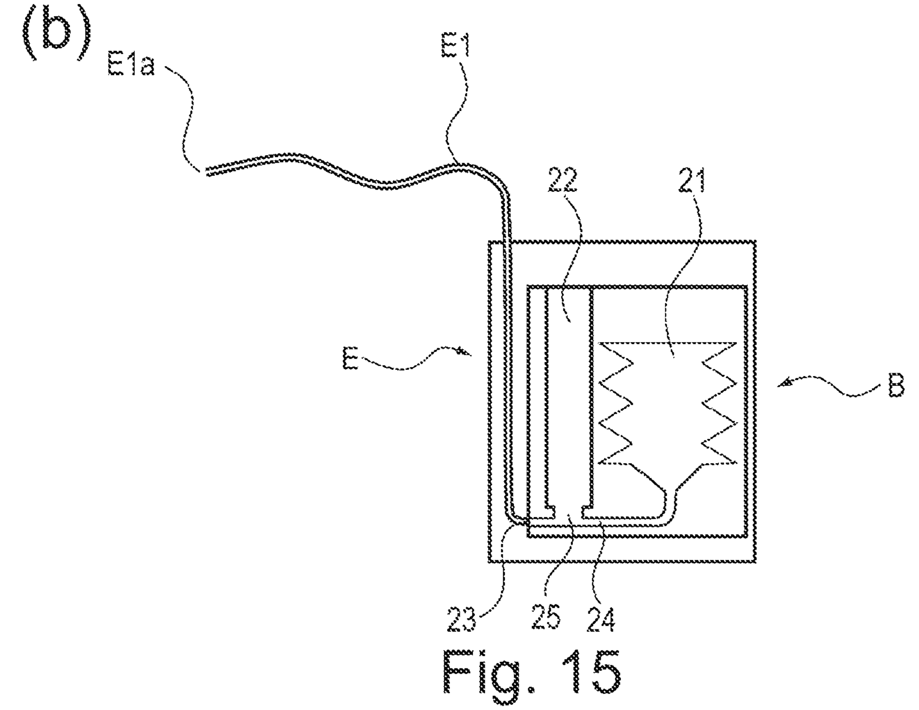

As shown in part (a) of FIG. 4, the pump portion 21 is constituted by a part of the bellow-shaped member 26 which is round in cross section when cut in a horizontal direction and which opens at a lower portion. Further, as shown in FIG. 15, the bellow-shaped member 26 includes a bellow portion 26*a* and an engaging portion 26*b* provided at an upper end portion of the bellow portion 26*a*. Further, the bellow-shaped member 26 is constituted by including a fixing portion 26*c* consisting of a cylindrical female-screw portion which is open at a lower end portion of the bellow portion 26*a*. The fixing portion 26*c* is threadably fastened to a cylindrical male-screw portion 28*a* which is open at an upper end portion of the supporting member 29. The engaging portion 26*b* is mounted in the fixing portion 28*b* of the reciprocating member 28.

As shown in part (a) of FIG. 5, the fixing portion 26*c* has a screw-like shape, and the female-screw portion is formed on an inner peripheral surface of the cylindrical portion. Further, the fixing portion 26*c* is rotated in an arrow D4 direction of part (a) of FIG. 5, and is threadably fastened and fixed to the male-screw portion 29*a* of the supporting member 29.

The pump driving gear 27 is rotated in the arrow D3 direction of parts (b) and (c) of FIG. 4 by the driving force inputted from the image forming apparatus C to the gear portion 27*a*. Then, the cam portion 27*b* is rotated integrally with the pump driving gear 27, so that the reciprocating member 28 reciprocates in the up-down direction of parts (b) and (c) of FIG. 4 via the projected portion 28*c* engaged with the groove portion of the cam portion 27*b*. By this, the pump portion 21 locked at an upper end portion to the fixing portion 28*b* of the reciprocating member via the engaging portion 26*b* repeats expansion and contraction as shown in parts (b) and (c) of FIG. 4.

As shown in parts (a) and (b) of FIG. 5, inside the supporting member 29, a first feeding path region 24*a* which is a part of the feeding path portion 24 is provided. Here, the pump portion 21 is a part of the bellow portion 26*a*. On the other hand, the fixing portion 26*c* which does not cause volume change is included in the feeding path portion 24, not the pump portion 21. Therefore, a boundary between the pump portion 21 and the feeding path portion 24 is the boundary G1 between the bellow portion 26*a* and the fixing portion 26*c* of the bellow-shaped member 26.

As shown in FIG. 2, the boundary G1 as the connection opening between the pump portion 21 and the feeding path portion 24 is disposed above a portion where the feeding path portion 24 communicates with the toner accommodating portion 22. Further, a direction in which the pump portion 21 is connected to the feeding path portion is a downward direction, the portion where the feeding path portion 24 communicates with the feeding path portion 24 is disposed below the toner accommodating portion 22.

Here while sandwiching the boundary G1 as shown in FIG. 2, a volume of the pump portion 21 is set so as to become larger than a volume of the feeding path portion 24 (hatched portion of FIG. 2). Further, as shown in FIGS. 1 and 2, the volume of the pump portion 21 is set so as to become larger than a volume of a sum of the volume of the feeding path portion 24 and a volume of the main assembly path portion 1. In this embodiment, the volume of the pump portion 21 is 10 cc, and the volume of the sum of the volumes of the feeding path portion 24 and the main assembly path portion 1 is 3 cc.

Further, the volume of the sum of the volumes of the feeding path portion 24 and the main assembly path portion 1 is smaller than the volume change amount of the pump portion 21. By this, even in a combination of a long feeding path portion 24 with the main assembly path portion 1 or in a combination of a bent feeding path portion 24 with the main assembly path portion 1, toner feeding can be made easy by an expansion/contraction operation of the pump portion 21.

Further, the boundary G1 of the pump portion 21 with the feeding path portion 24 is provided at a position higher with respect to a vertical direction than the communication opening 25 provided at the boundary between the toner accommodating portion 22 and the feeding path portion 24, further, when the pump portion 21 and the toner accommodating portion 22 shown in FIG. 2 are viewed in a horizontal direction (X axis direction), a range of the pump portion 21 in the vertical direction (Y axis direction) in FIG. 2 is a range 21*a*, and similarly a range of the toner accommodating portion 22 in the vertical direction (Y axis direction) in FIG. 2 is a range 22*a*. At this time, the range 21*a* and the range 22*a* are set in an overlapping range in the vertical direction. That is, the pump portion 21 is disposed at an overlapping position with the toner accommodating portion 22 in the vertical direction when viewed in the horizontal direction.

The pump portion 21 repeats the expansion/contraction operation. The toner supplied into the feeding path portion 24 is fed in the feeding path portion 24 by a flow of air in the arrow D2 generated during compression of the pump portion 21, and is supplied into the main assembly path portion 1 provided in the apparatus main assembly C1 of the image forming apparatus C through the discharge opening 23. Further, the toner is supplied into the toner accommodating portion 17 through the receiving portion 18, provided in the toner accommodating portion 17 of the process cartridge A, with which the other end portion of the main assembly path portion communicates. The main assembly path portion 1 shown in FIG. 1 is constituted by a hollow tube shape.

<Effect of Pump Portion>

The volume of the pump portion 21 is set so as to be larger than the volume of the sum of the volume of the feeding path portion 24 and the volume of the main assembly path portion 1. By this, the toner carried to the feeding path portion 24 through the communication opening 25 of the toner accommodating portion 22 by the extraction/contraction operation of the pump portion 21 can be fed from the feeding path portion 24 to an outside of the discharge opening 23. Further, the toner is fed through the main assembly path portion 1 to the receiving portion 18 provided in the toner accommodating portion 17, so that the toner can be supplied into the toner accommodating portion 17. In this embodiment, the volume of the pump portion 21 is about 10 cc, and the volume of the sum of the volumes of the feeding path portion 24 and the main assembly path portion 1 is about 3 cc. By this, the volume of the pump portion 21 is set so as to be twice or more the volume of the feeding path portion 24.

Incidentally, a relationship between the volume of the pump portion 21 and the volume of the sum of the volumes of the feeding path portion 24 and the main assembly path portion is not limited thereto, but may be appropriately set depending on a kind of the toner fed, or a higher or a distance in which the toner is fed. The volume of the pump portion 21 is made twice or more the volume of the feeding path portion 24, whereby the toner can be stably discharged by the expansion/contraction operation without leaving the toner in the feeding path portion 24.

Further, as shown in FIG. 2, a (toner) discharging direction of the pump portion 21 is disposed downward, whereby the toner can be made hard to enter the pump portion 21 during suction of air by the pump portion 21. Further, in the vertical direction shown in FIG. 2, the boundary G1 between the pump portion 21 and the feeding path portion 24 is provided at a position higher than the communication opening 25 of the toner accommodating portion 22. By this, it is possible to suppress that the toner accommodated in the toner accommodating portion 22 enters the pump portion 21 via the feeding path portion 24 during transportation or the like of the toner cartridge B. Further, when the pump portion 21 is viewed in the horizontal direction of FIG. 2, the pump portion 21 is disposed at an overlapping position with the toner accommodating portion 22 in the vertical direction of FIG. 2. By this, the toner cartridge B can be downsized in the vertical direction.

<Feeding Path Portion>

Figure 6:
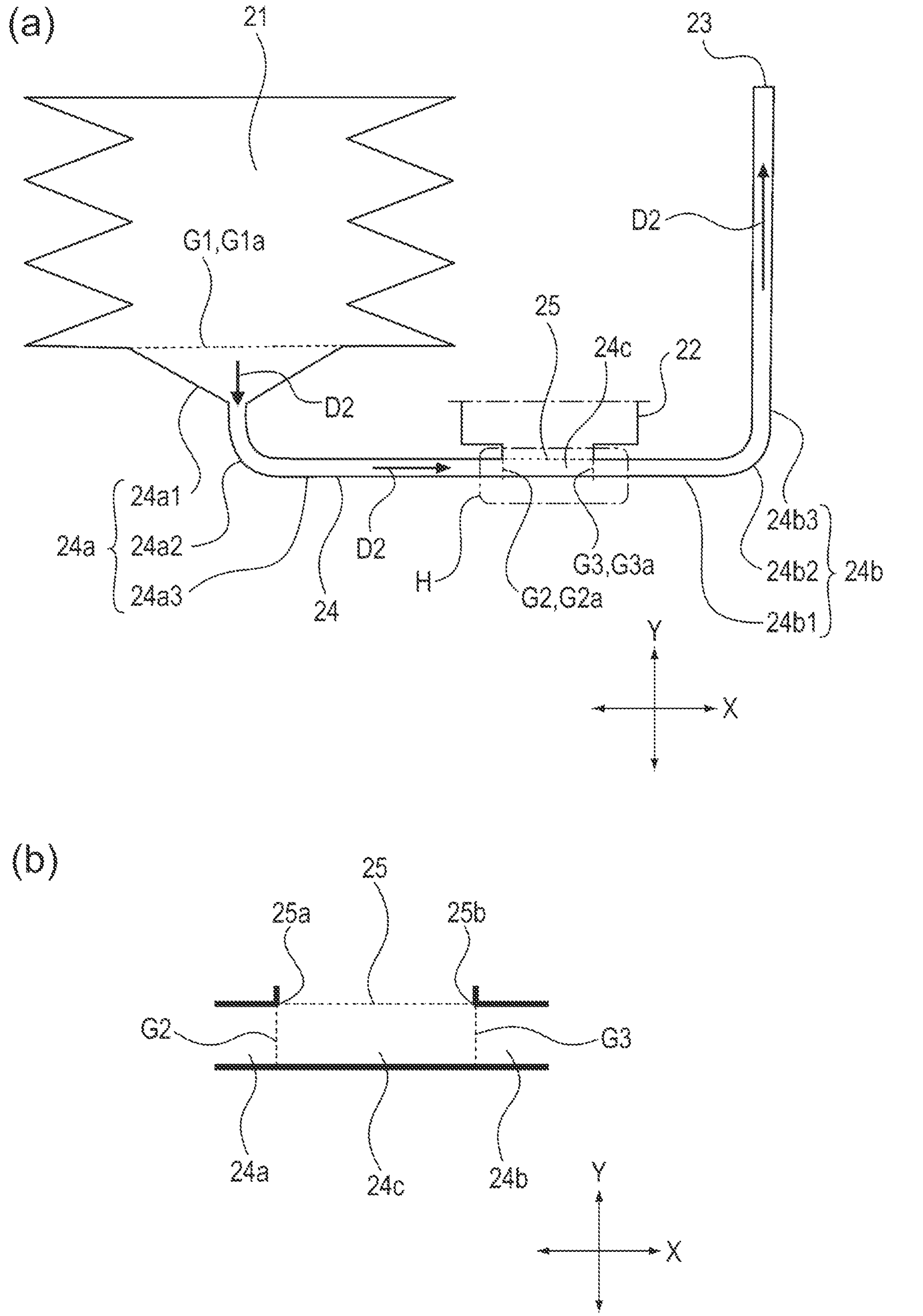
In FIG. 6, part (a) is a sectional view showing a constitution of the pump portion and a feeding path portion of the first embodiment. Part (b) is an enlarged view of an H portion of part (a).

Next, a constitution of the feeding path portion 24 will be described using FIGS. 2 and 6. Part (a) of FIG. 6 is a sectional view showing constitutions of the pump portion 21 and the feeding path portion 24 in this embodiment. Part (b) of FIG. 6 is an enlarged view of an H portion of part (a) of FIG. 6.

A range of the feeding path portion 24 indicated by a hatched portion of FIG. 2 is a range from the boundary G1 between the pump portion 21 and the feeding path portion 24 to the discharge opening 23 in the arrow D2 direction which is a direction in which the air generated during compression of the pump portion 21 flows. At an intermediary portion of the feeding path portion 24, the feeding path portion 24 communicates with the communication opening 25 of the toner accommodating portion 22.

As shown part (a) of FIG. 6, the feeding path portion 24 includes a first feeding path region **24*a* connected to the pump portion 21 and a second feeding path region 24*b* connected to the discharge opening 23. Further, the feeding path portion 24 includes a third feeding path region 24*c* connected to the first feeding path region 24*a*, the second feeding path region 24*b*, and the communication opening of the toner accommodating portion 22. As shown in part (b) of FIG. 6, the first feeding path region 24*a* and the third feeding path region 24*c* are sectioned by a boundary G2, and the second feeding path region 24*b* and the third feeding path region 24*c*** are sectioned by a boundary G3.

The boundary G2 is a cross section of the feeding path portion 24 including an end portion **25*a*, on the pump portion 21 side, of the communication opening 25 of the toner accommodating portion 22 contacting the feeding path portion 24. The boundary G3 is a cross section of the feeding path portion 24 including an end portion 25*b*, on the discharge opening 23 side, of the communication opening 25 of the toner accommodating portion 22 contacting the feeding path portion 24**.

The first feeding path region **24*a* is a region, on the pump portion 21 side, of the feeding path portion 24 from the boundary G1 to the boundary G2 shown in part (a) of FIG. 6. The second feeding path region 24*b* is a region, on the discharge opening 23 side, of the feeding path portion 24 from the boundary G3 to the discharge opening 23 shown in part (a) of FIG. 6. The second feeding path region 24*b* is a portion on the discharge opening 23 side (discharge opening side) than the boundary G3 which is a portion where the feeding path portion communicates with the toner accommodating portion 22**.

In the second feeding path region **24*b*, the boundary G3 which is one end on the side where the feeding path portion 24 communicates with the toner accommodating portion 22 is disposed at a position lower in the vertical direction them the discharge opening 23 which is the other end. The third feeding path region 24*c* is a region, from the boundary G2 to the boundary G3, other than the first feeding path region 24*a* and the second feeding path region 24*b* in the feeding path portion 24 shown in parts (a) and (b) of FIG. 6**.

<First Feeding Path Region>

A constitution of the first feeding path region **24*a* will be described using FIG. 6. The first feeding path region 24*a* shown in part (a) of FIG. 6 is constituted by including a funnel-shaped portion 24*a*1 connected to the pump portion 21, a tubular bent portion 24*a*2 connected to the funnel-shaped portion 24*a*2, and a tubular rectilinear portion 24*a*3 connected to the bent portion 24*a*2. These portions are smoothly connected to each other. In the case where a cross-sectional area of each of opposite end portions of the first feeding path region 24*a*** is considered, when the cross-sectional area of the boundary G1 is G1*a* and the cross-sectional area of the boundary G2 is G2*a*, the following relationship is satisfied.

$$G1a>G2a$$

The first feeding path region **24*a* shown in part (a) of FIG. 6 is a portion on the pump portion 21 side (pump portion side) than the portion where the feeding path portion 24 communicates with the toner accommodating portion 22. In the first feeding path region 24*a***, the cross-sectional area G1*a* of the boundary G1 (connection opening) is larger than the cross-sectional area G2*a* of the boundary G2 which is the portion where the feeding path portion 24 communicates with the toner accommodating portion 22. Further, in the first feeding path region 24, the boundary G2 as one end on the side where the feeding path portion 24 communicates with the toner accommodating portion 22 is disposed at the lowest position in the vertical direction.

<Effect of First Feeding Path Region>

As described above, the first feeding path region **24*a* is capable of freely disposing a position of the pump portion 21 by including the bent portion 24*a*2. Further, by including the bent portion 24*a*2, the boundary G1 which is the connection opening of the pump portion 21 can be disposed downward in the vertical direction. By this, the toner can be made hard to enter the pump portion 21**.

Further, the relationship between the cross-sectional areas of the opposite end portions of the first feeding path region 24*a* is made to satisfy G1*a*>G2*a*, so that a flow rate of air stream generated in the pump portion 21 can be made fast in the first feeding path region 24*a*. By this, the toner can be sent to a higher place or a more distant place by the extraction/contraction operation of the pump portion 21.

Further, in the first feeding path region 24*a*, the boundary G2 side is provided at the lowest position in the vertical direction. By this, the toner accommodated in the toner accommodating portion 22 becomes hard to enter a region of the first feeding path region 24 from the bent portion 24*a*2 to the funnel-shaped portion 24*a*1, and therefore, stability of a toner feeding amount can be realized.

<Second Feeding Path Region>

Next, a constitution of the second feeding path region 24*b* will be described using FIG. 6. The second feeding path region 24*b* shown in part (a) of FIG. 6 is constituted by including a tubular rectilinear portion 24*b*1 connected to the third feeding path region 24*c*, a tubular bent portion 24*b*2 connected to the rectilinear portion 24*b*1, and a tubular rectilinear portion 24*b*3 connected to the bent portion 24*b*2. The respective portions are smoothly connected to each other.

Incidentally, an inner diameter of each of the rectilinear portions 24*b*1 and 24*b*3 and the bent portion 24*b*2 is 4 mm. Further, the second feeding path region 24*b* extends upward in the vertical direction from the bent portion 24*b*2 over the rectilinear portion 24*b*3, and the discharge opening 23 provided at an end portion of the rectilinear portion 24*b*3 is disposed at a position higher than the third feeding path region 24*c* in the vertical direction.

Further, as shown in part (a) of FIG. 6, the second feeding path region 24*b* is a portion on the discharge opening 23 side (discharge opening side) than a portion of the feeding path portion 24 communicating with the toner accommodating portion 22. Further, in the second feeding path region 24, the boundary G3 is disposed at the lowest position with respect to the vertical direction. Further, the second feeding path region 24*b* feeds the air sent from the pump portion 21 and the toner supplied from the toner accommodating portion 22. For this reason, it is desirable that in the air flowing direction, an abutting change in cross-sectional area such as a stepped portion is small.

<Effect of Second Feeding Path Region>

As described above, the second feeding path region 24*b* includes the bent portion 24*b*2, so that a position of the discharge opening 23 can be freely disposed. Further, in the second feeding path region 24*b*, the boundary G3 side is provided at the lowest position in the vertical direction. By this, the toner in the toner accommodating portion 22 becomes hard to enter a region from the bent portion 24*b*2 to the rectilinear portion 24*b*3 of the second feeding path region 24*b*, and therefore, stabilization of the toner feeding amount can be realized.

<Third Feeding Path Region>

Figure 7:
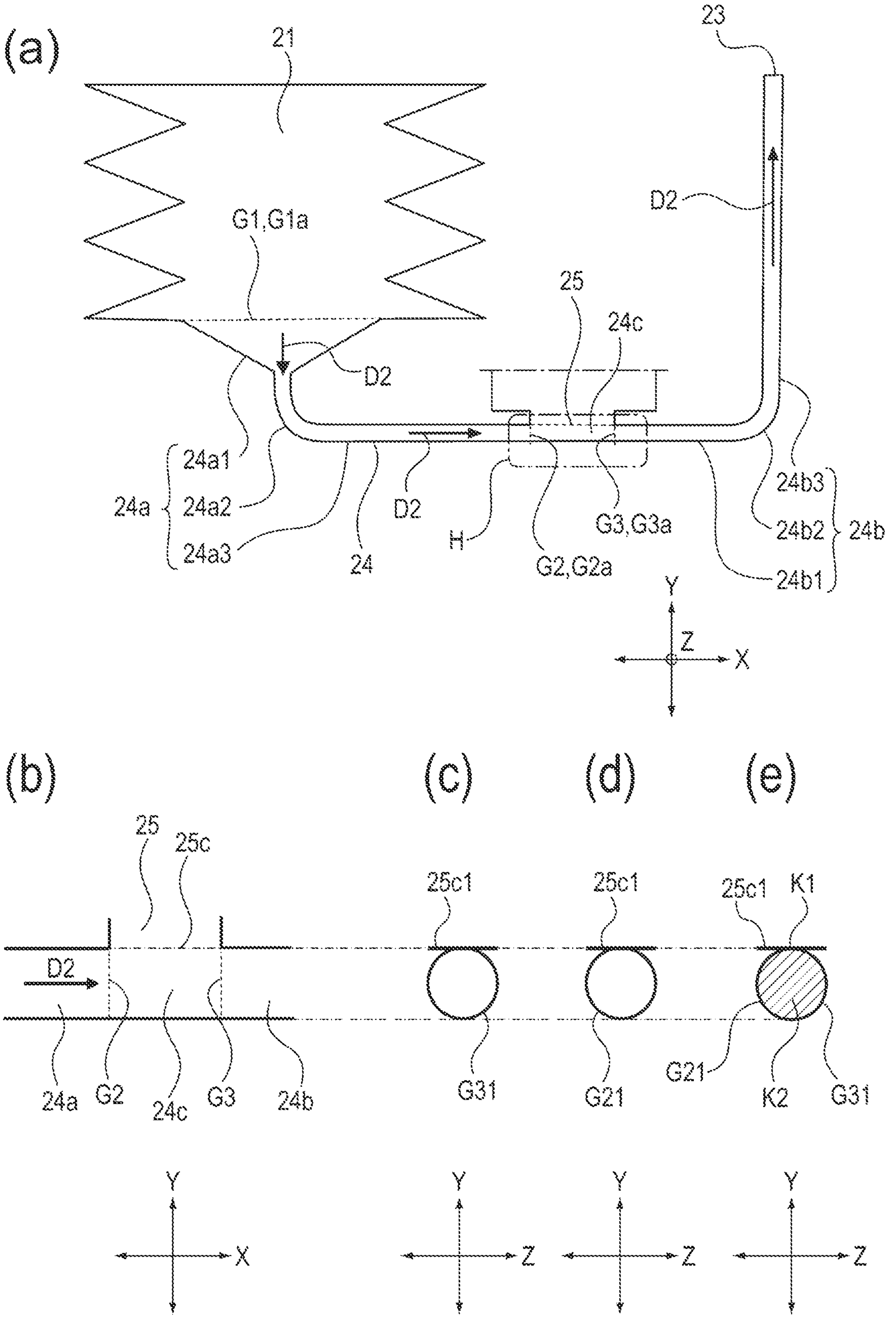
In FIG. 7, part (a) is a sectional view of the pump portion and the feeding path portion of the first embodiment which are viewed from a Z axis direction. Part (b) is an enlarged view of an H portion of part (a). Parts (c) to (e) are views showing an outer configuration when a communication opening is projected in an air flowing direction when the pump portion is compressed, an outer configuration when a boundary G3 is projected, and an outer configuration when a boundary G2 is projected.

Next, a constitution of the third feeding path region 24*c* will be described using FIGS. 2, 6 and 7. Part (a) of FIG. 7 is a sectional view of the pump portion 21 and the feeding path portion 24 in this embodiment as viewed in the Z axis direction. Part (b) of FIG. 7 in an enlarged view of an H portion of part (a) of FIG. 7. Part (c) of FIG. 7 is a schematic view showing an outer configuration 25*c*1 when a cross section 25*c* of the communication opening 25 on the feeding path portion 24 side is projected in a direction in which the air when the pump portion 21 is compressed flows, and showing an outer configuration G31 when the boundary G3 is projected in the direction.

Part (d) of FIG. 7 is a schematic view showing the outer configuration 25*c*1 and an outer configuration G21 when the boundary G2 is projected in the direction in which the air when the pump portion 21 is compressed flows. The arrow D2 direction is the direction in which the air when the pump portion 21 is compressed flows. A superposed view of these outer configurations consisting of the outer configuration 24*c*1, the outer configuration G31, and the outer configuration G21 is shown in part (e) of FIG. 7.

The third feeding path region 24*c* is a portion where the toner in the toner accommodating portion 22 is received in the feeding path portion 24 through the communication opening 25. The third feeding path region 24*c* is disposed below the toner accommodating portion 22 and at a lowermost portion in the feeding path portion 24 in the vertical direction. The volume of the third feeding path region 24*c* may be a volume in conformity to an amount of the toner intended to be fed, but in the neighborhoods of the boundary G2 and the boundary G3 shown in part (b) of FIG. 6, it is desirable that an abrupt change in cross section such as a stepped portion is small.

In this embodiment shown in FIG. 7, an example of the case where a cross-sectional area G2*a* of the boundary G2 between the first feeding path region 24*a* and the third feeding path region 24*c* and a cross-sectional area G3*a* of the boundary G3 between the second feeding path region 24*b* and the third feeding path region 24*c* are equal to each other is shown.

As shown in part (e) of FIG. 7, an area of the outer configuration 25*c*1 when the cross section 25*c* of the communication opening 52 on the feeding path portion 24 side is projected in the arrow D2 direction becomes substantially 0. On the other hand, an area of the outer configuration G21 when the boundary G2 is projected in the arrow D2 direction and an area of the outer configuration G 31 when the boundary G3 is projected in the arrow D2 direction are substantially equal to each other.

For this reason, an area K2 of a region indicated by a hatched line of part (e) of FIG. 7 in which the outer configuration G21 overlaps with the outer configuration G31 is larger than an area K1 (=0) of a region in which the outer configuration G21 overlaps with the outer configuration 25*c*1 (K1<K2).

That is, in the direction in which the air when the pump portion 21 is compressed flows, the outer configuration G21 and the outer configuration 25*c*1 shown in part (e) of FIG. 7 are compared with each other. Here, the outer configuration G21 is an outer configuration such that the cross section of the boundary G2 which is a position, on the pump portion 21 side, of the feeding path portion 24 at a portion with which toner accommodating portion 22 communicates is projected in the arrow D2 direction. Further, the outer configuration 25*c*1 is an outer configuration such that the cross section 25*c* of a portion, on the toner accommodating portion 22 side (developer accommodating portion side), of the feeding path portion 24 at a portion with which the toner accommodating portion 22 communicates is projected in the arrow D2 direction. At this time, as regards the outer configuration G21, the area K2 in which the opening G21 overlaps with the outer configuration G31 when the cross section of the boundary G3 as the portion, on the discharge opening 23 side, of the feeding path portion 24 at the portion with which the toner accommodating portion 22 communicates is larger than the outer configuration 25*c*1.

By this, the air flowing from the first feeding path region 24*a* when the pump portion 21 is compressed substantially does not flow toward the communication opening 25, but is easy to flow toward the second feeding path region 24*b* unilaterally. By this, stabilization of the feeding amount of the toner fed in the feeding path portion 24 can be realized.

According to this embodiment, the pump portion 21 and the discharge opening 23 are caused to communicate with each other by the feeding path portion 24. Further, then, the volume of the feeding path portion 24 is set so as to be smaller than the volume change amount of the pump portion 21. By this, even when a long feeding path portion 24 or a bent feeding path portion 24 is employed, a degree of freedom of a distance and a direction to a supply destination of the toner is improved.

First Modified Embodiment

Figure 8:
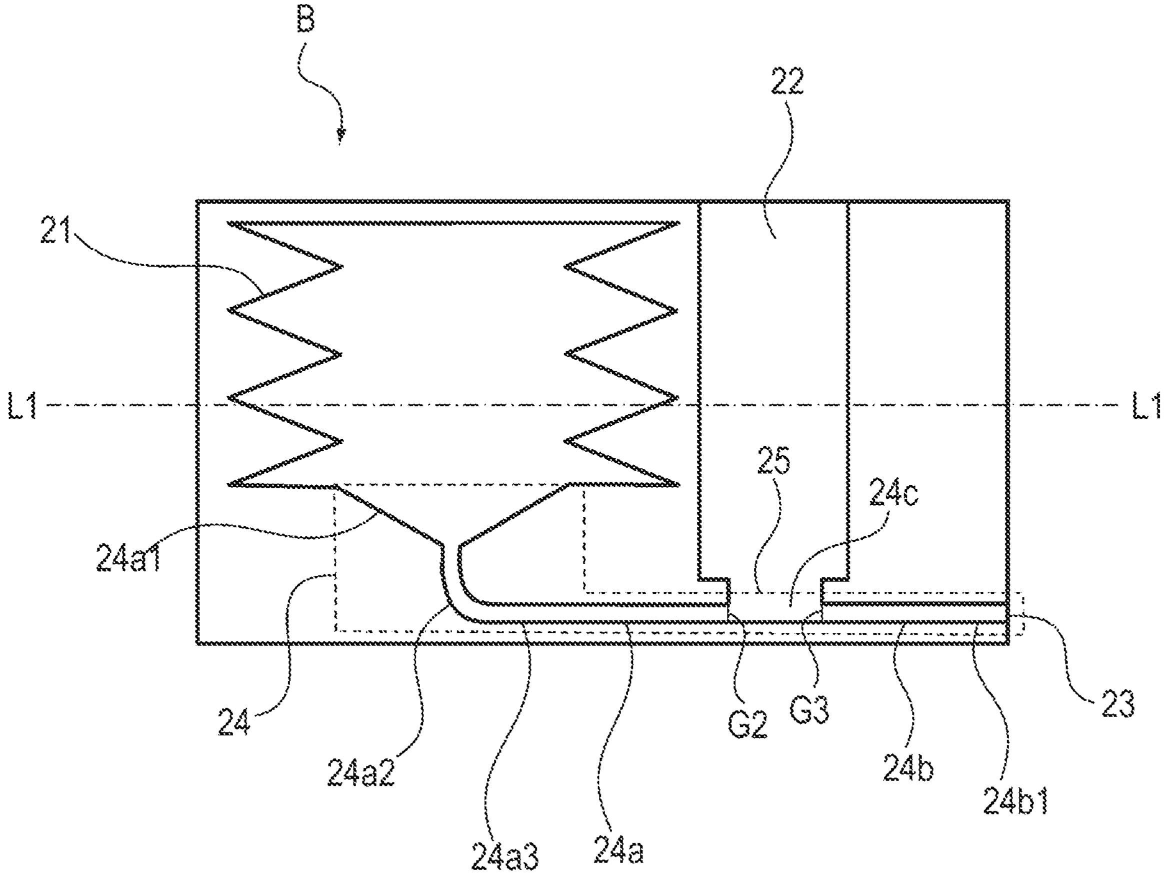
FIG. 8 is a sectional view showing a constitution of a pump portion and a feeding path portion of a first modified embodiment of the first embodiment.

Next, constitutions of a pump portion 21 and a feeding path portion 24 in a first modified embodiment of this embodiment will be described using FIG. 8. FIG. 8 is a sectional view showing the constitutions of the pump portion 21 and the feeding path portion 24 in the first modified embodiment of the first embodiment. A second feeding path region 24*b* of the toner cartridge B shown in FIG. 8 is provided with a discharge opening 23 at an end portion of a tubular rectilinear portion 24*b*1 connected to a third feeding path region 24*c*. Thus, the second feeding path region 24*b* extending from the third feeding path region 24*c* to the discharge opening 23 may be disposed in the horizontal direction.

In this modified embodiment, as shown in FIG. 8, in the second feeding path region 24*b* which is a portion on the discharge opening 23 side than a boundary G3, the boundary G3 which is one end is disposed at the same height (level) as the discharge opening 23 which is the other end in the vertical direction. Here, the boundary G3 is one end on a side of the feeding path portion 24 where the toner accommodating portion 22 communicates with the feeding path portion 24.

At this time, the discharge opening 23 is provided with an unshown shutter member on an outside of the toner cartridge B, the toner accommodated in the toner cartridge B is prevented from leaking out to the outside, by the shutter member.

Second Modified Embodiment

Figure 9:
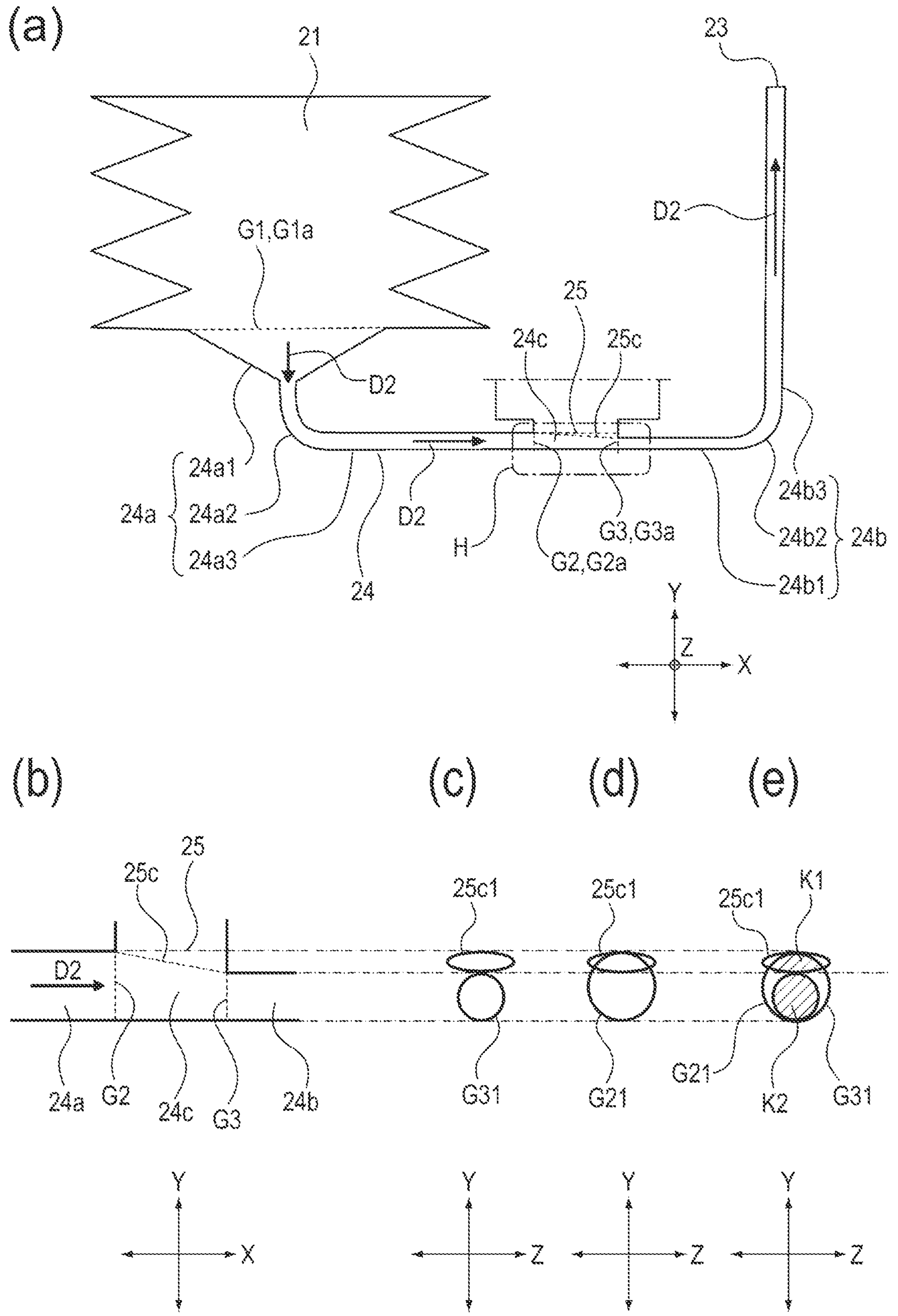
In FIG. 9, part (a) is a sectional view of a pump portion and a feeding path portion of a second modified embodiment of the first embodiment which are viewed from the Z axis direction. Part (b) is an enlarged view of an H portion of part (a). Parts (c) to (e) are views showing an outer configuration when a communication opening is projected in the air flowing direction when the pump portion is compressed, an outer configuration when a boundary G3 is projected, and an outer configuration when a boundary G2 is projected.

Next, constitutions of a pump portion 21 and a feeding path portion 24 in a second modified embodiment of this embodiment will be described using FIG. 9. Part (a) of FIG. 9 is a sectional view of the pump portion 21 and the feeding path portion 24 in the second modified embodiment of this embodiment as viewed in the Z axis direction. Part (b) of FIG. 9 is an enlarged view of an H portion of part (a) of FIG. 9. Part (c) of FIG. 9 is a schematic view showing an outer configuration 25*c*1 and an outer configuration G31. Part (d) of FIG. 9 is a schematic view showing the outer configuration 25*c*1 and an outer configuration G21. Part (e) of FIG. 9 is a schematic view in which three outer configurations consisting of the outer configuration 25*c*1, the outer configuration G31, and the outer configuration G21 are caused to overlap with each other.

In the axis direction embodiment with reference to FIG. 6, an example in which a cross-sectional area G2*a* of a boundary G2 and a cross-sectional area G3*a* of the boundary G3 are equal to each other was described. In this modified embodiment, as shown in parts (a) and (b) of FIG. 9, an example in the case where the cross-sectional area G2*a* of the boundary G2 and the cross-sectional area G3*a* of the boundary G2 are different from each other is employed. As shown in part (e) of FIG. 9, an area K2 of a region indicated by a hatched line of part (e) of FIG. 9 in which the outer configuration G21 overlaps with the outer configuration G31 is larger than an area K1 of a region indicated by a hatched line of part (e) of FIG. 9 in which the outer configuration G21 overlaps with the outer configuration 25 c1 (K1<K2).

The boundary G2 is a portion, on the pump portion 21 side, of the feeding path portion at a communicating portion of the communicating opening 25. The boundary G3 is a portion, on the discharge opening 23 side, of the feeding path portion 24 at the communicating portion of the communicating opening 25. As regards the outer configuration G21 when the cross section of the boundary G2 is projected in a direction in which the air when the pump portion 21 is compressed flows, the area K2 in which the outer configuration G21 overlaps with the outer configuration G31 when the cross section of the boundary G3 is projected in the direction in which the air when the pump portion 21 is compressed flows than an area in which the outer configuration G21 overlaps with the outer configuration 25*c*1. By this, the air flowing from the first feeding path region 24*a* when the pump portion 21 is compressed is easy to flow toward the second feeding path region 24*b* in a large amount.

Second Comparison Example

Figure 10:
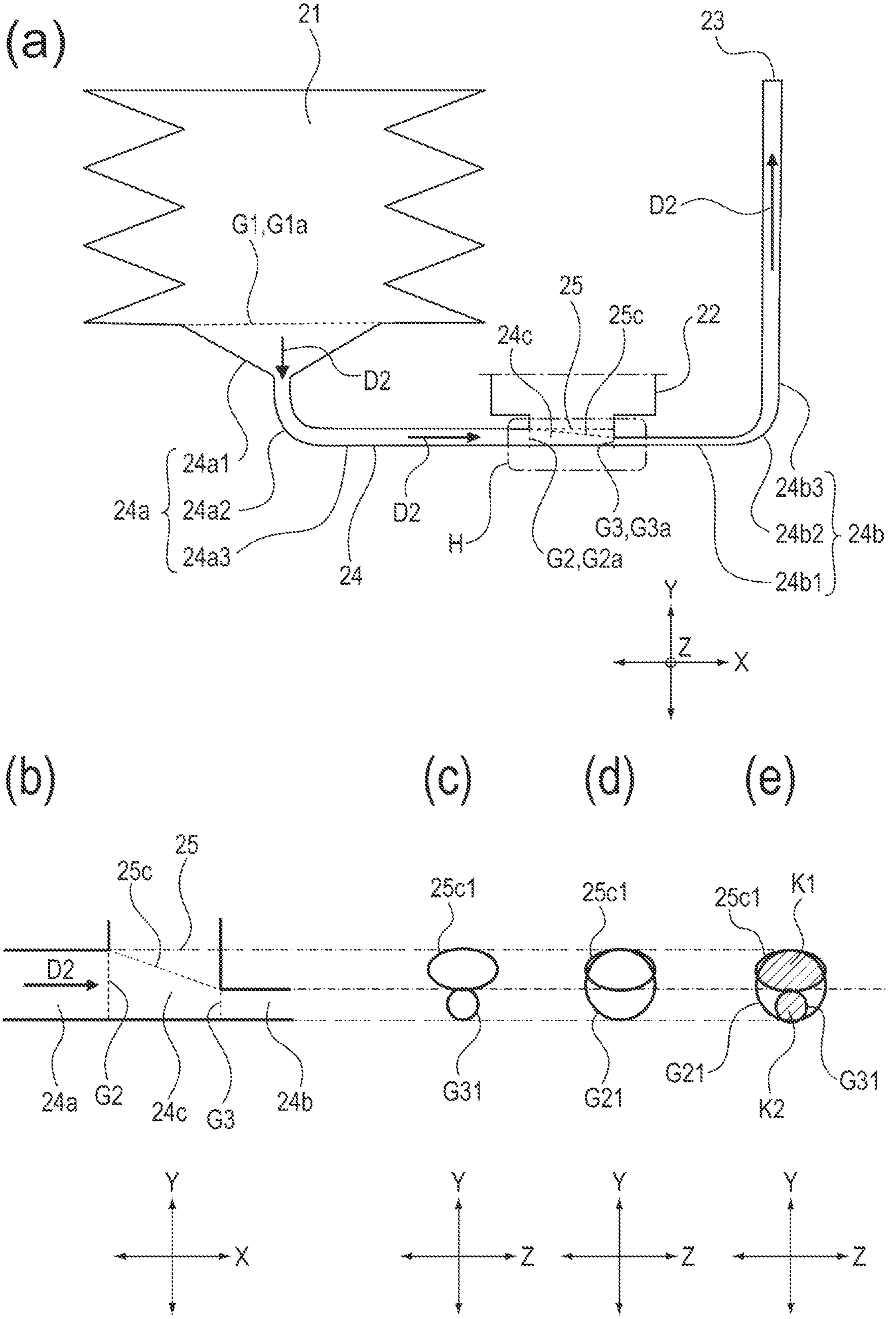
In FIG. 10, part (a) is a sectional view of a pump portion and a feeding path portion of a second comparison example which are viewed from the Z axis direction. Part (b) is an enlarged view of an H portion of part (a). Parts (c) to (e) are views showing an outer configuration when a communication opening is projected in the air flowing direction when the pump portion is compressed, an outer configuration wen a boundary G3 is projected, and an outer configuration when a boundary G2 is projected.

Next, constitutions of a pump portion 21 and a feeding path portion 24 in a second comparison example will be described using FIG. 10. Part (a) of FIG. 10 is a sectional view of the pump portion 21 and the feeding path portion 24 in this comparison example as viewed in the Z axis direction. Part (b) of FIG. 10 is an enlarged view of an H portion of part (a) of FIG. 10. Part (c) of FIG. 10 is a schematic view showing an outer configuration 25*c*1 and an outer configuration G31. Part (d) of FIG. 10 is a schematic view showing an outer configuration 25*c*1 and an outer configuration 421. Part (e) of FIG. 10 is a schematic view in which three outer configurations consisting of the outer configurations 25*c*1, G31 and G21 are caused to overlap with each other.

In this comparison example, as shown in part (b) of FIG. 10, an example of the case where a difference between a cross-sectional area G2*a* of a boundary G2 and a cross-sectional area G3*a* of a boundary G3 is further larger than the difference in the axis direction second modified embodiment shown in part (b) of FIG. 9 will be described.

As shown in part (e) of FIG. 10, an area K2 of a region indicated by a hatched line of part (e) of FIG. 10 in which the outer configuration G21 overlaps with the outer configuration G31 is smaller than an area K1 of a region indicated by a hatched line of part (e) of FIG. 10 in which the outer configuration G21 overlaps with the outer configuration 25*c*1 (K1>K2). By this, the air flowing from the first feeding path region 24*a* when the pump portion 21 is compressed flows toward the second feeding path region 24*b* in a large amount.

In order to prevent this, setting is made so that the area K2 of the region in which the outer configuration G21 overlaps with the outer configuration G31 becomes larger than the area K1 of the region in which the outer configuration G21 overlaps with the outer configuration 25*c*1. By this, the air flowing from the first feeding path region 24*a* is easier to flow toward the second feeding path region 24*b* than toward the communication opening 25, so that stabilization of the feeding amount of the toner fed in the feeding path portion 24 can be realized. For this reason, as shown in FIG. 7, it is desirable that the area K2 in which the outer configuration G31 and the outer configuration G21 overlap with each other is increased.

Effect of Third Feeding Path Region

As described above, the third feeding path region 24*c* is provided below the toner accommodating portion 22. For this reason, the toner in the toner accommodating portion 22 can be fed into the third feeding path portion 24*c* by utilizing gravitation of the toner. Further, the third feeding path region 24*c* is disposed at the lowest position of the feeding path portion 24 in the vertical direction. For this reason, as described above, the toner supplied into the third feeding path region 24*c* from the inside of the toner accommodating portion 22 by gravitation can be prevented from entering the first feeding path region 24*a* and the second feeding path region 24*b* move than necessary. By this, stabilization of the feeding amount of the toner fed in the feeding path portion 24 can be realized.

Further, as shown in part (e) of FIG. 7 and part (e) of FIG. 9, setting is made so that the area K2 of the region in which the outer configuration G21 overlaps with the outer configuration G31 is larger than the area K1 of the region in which the outer configuration G21 overlaps with the outer configuration 25*c*1 (K1<K2).

By this, the toner existing in the third feeding path region 24*c* can be sent to the second feeding path region 24*b* than being blown back to the communication opening 25, by the expansion/contraction operation of the pump portion 21. By this, stabilization of the feeding amount of the toner fed in the feeding path portion 24 can be realized.

<Toner Feeding from Toner Cartridge to Process Cartridge>

Next, a toner feeding operation from the toner cartridge B to the process cartridge A will be described using FIG. 1 to FIG. 3. First, by using FIG. 2 and FIG. 3, the toner feeding operation in the toner cartridge B will be described. As shown in FIG. 3, the toner cartridge B is provided with the feeding portion 31.

The feeding portion 31 includes the feeding plate 31*a* provided on the bottom of the toner accommodating portion 22 so as to be capable of being reciprocated and moved in arrow D1*a* and D1*b* directions of FIG. 3. The toner accommodated in the toner accommodating portion 22 is placed on the feeding plate 31*a*. The feeding plates 31*a* reciprocates and moves in the arrow D1*a* and D1*a* directions of FIG. 3. At this time, maximum acceleration at which the feeding plate 31*a* in the arrow D1*b* direction of FIG. 3 is made larger than maximum acceleration at which the feeding plate 31*a* in the arrow D1*a* direction of FIG. 3. By this, the toner on the feeding plate 31*a* is fed in the arrow D1*a* direction of FIG. 3.

The toner fed in the arrow D1*a* direction of FIG. 3 is guided by an inclined surface 22*a* provided at an inner surface of the toner accommodating portion 22 and is collected to the communication opening 25. The toner sent to the communication opening 25 passes, as shown in FIG. 2, through the communication opening 25 by gravitation since the communication opening 25 faces below the toner accommodating portion 22, and is sent into the feeding path portion 24. The toner carried into the feeding path portion 24 is sent to the discharge opening 23 by the flow of the air generated when the pump portion 21 is compressed.

As shown in FIG. 1, in a state the toner cartridge B and the process cartridge A are mounted in the image forming apparatus C, the discharge opening 23 of the feeding path portion 24 and one end portion of the main assembly path portion 1 provided on the apparatus main assembly C1 side of the image forming apparatus C communicate with each other. Further, the other end portion of the main assembly path portion 1 and the receiving portion 18 of the toner accommodating portion 17 of the process cartridge A communicate with each other.

The toner sent from the discharge opening 23 of the toner cartridge B passes through the main assembly path portion 1 provided in the image forming apparatus C and is fed into the toner accommodating portion 17 through the receiving portion 18 of the process cartridge A. As described above, the toner is fed from the toner cartridge B to the process cartridge A. In this embodiment, the toner can be discharged upward from the toner cartridge B disposed below the process cartridge A. Further, the toner can be discharged to a distant place.

Second Embodiment

Figure 11:
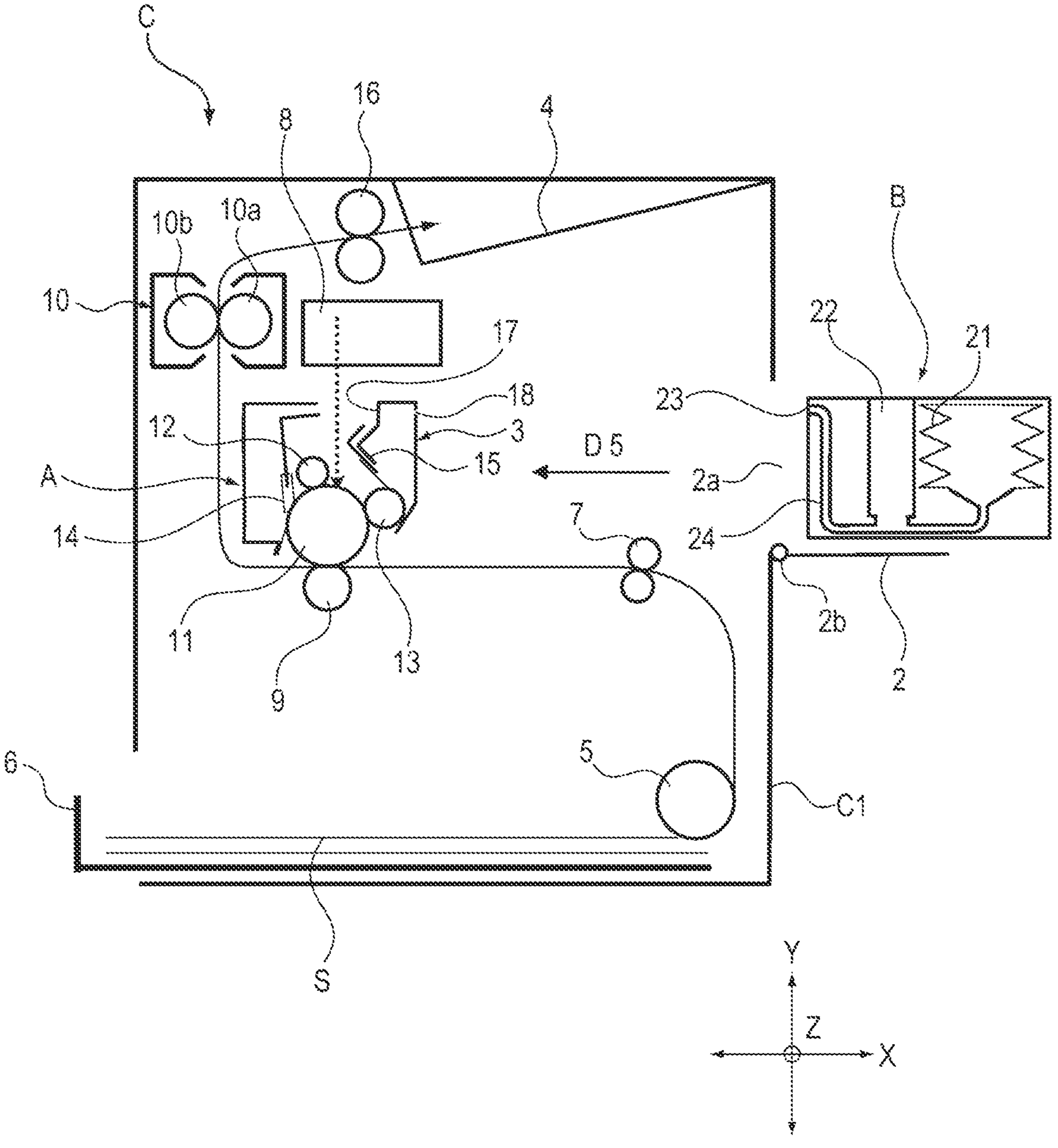
FIG. 11 is a sectional view showing a state in which a toner cartridge is being mounted in an apparatus main assembly in an image forming apparatus of a second embodiment.
Figure 12:
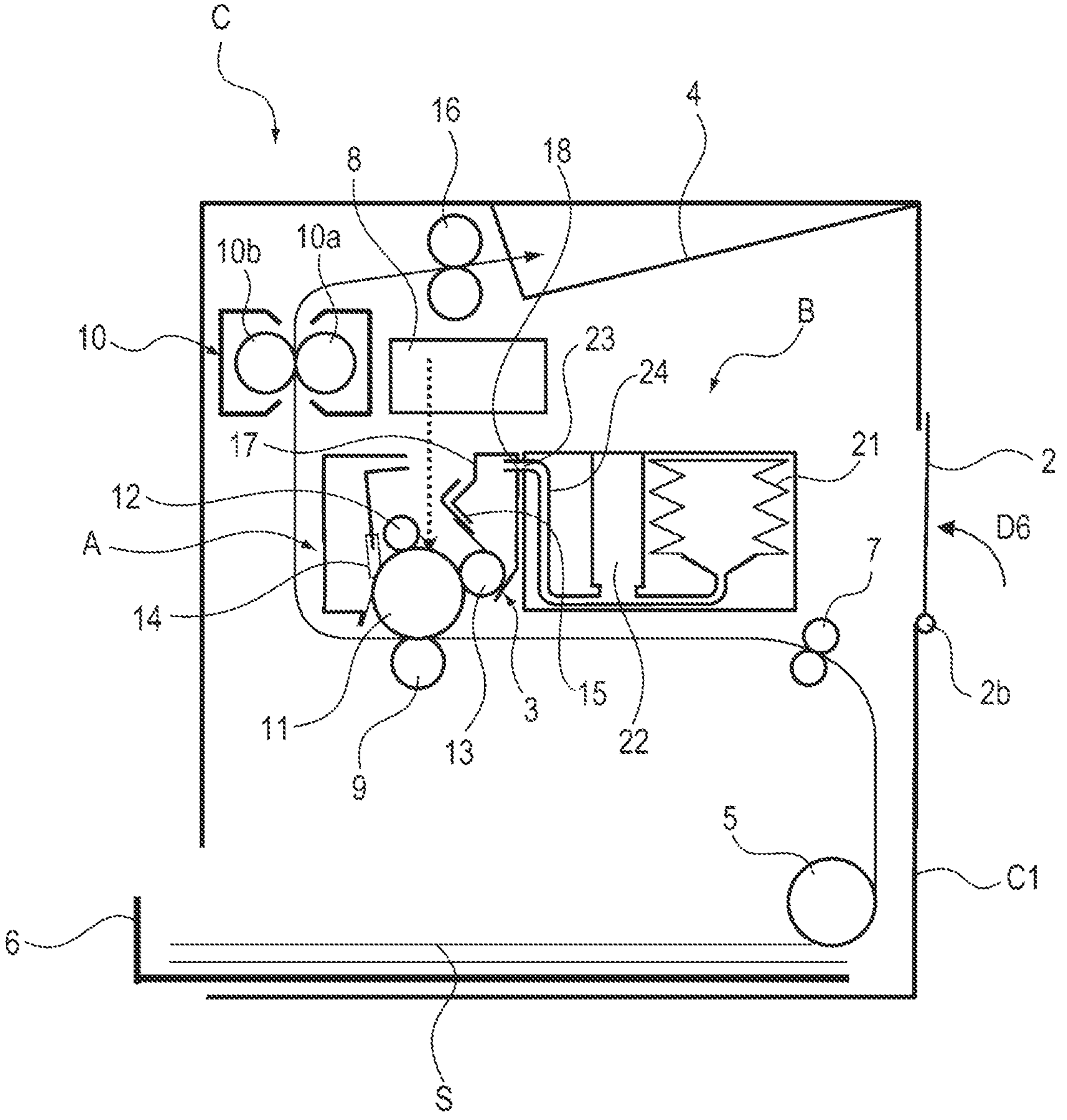
FIG. 12 is a sectional view showing a state in which the toner cartridge was mounted in the apparatus main assembly of the image forming apparatus of the second embodiment.

Next, constitutions of a developer supplying device and an image forming apparatus according to the present invention in a second embodiment will be described using FIG. 11 to FIG. 13. Incidentally, members (portions) constituted similarly as those in the axis direction first embodiment will be omitted from description by adding the same reference numerals or symbols or by adding the same member (portion) names even when the reference numerals or symbols are different. FIG. 11 is a sectional view showing a state in which the toner cartridge B is being mounted into the apparatus main assembly C1 in the image forming apparatus C of this embodiment. FIG. 12 is a sectional view showing a state in which the toner cartridge B was mounted in the apparatus main assembly 1C in the image forming apparatus of this embodiment.

In the first embodiment, as shown in FIG. 1, an example of the case where the toner is fed from the toner cartridge B to the process cartridge A by way of the main assembly path portion 1 provided in the image forming apparatus C was described. In this embodiment, a constitution in which the toner is fed from the toner cartridge B to the process cartridge A without by way of the main assembly path portion 1 provided in the image forming apparatus C will be described. Incidentally, the image forming process and the constitutions of the process cartridge A and the toner cartridge B in the image forming apparatus C are similar to those in the axis direction first embodiment, and therefore, will be omitted from overlapping description.

A mounting operation of the toner cartridge B into the image forming apparatus C in this embodiment will be described using FIG. 11 and FIG. 12. As shown in FIG. 11, the apparatus main assembly C1 of the image forming apparatus C is provided with the door 2 rotatable about the rotation shaft 2*b*. When the toner cartridge B is mounted into the apparatus main assembly C1, in a state in which the door 2 of the image forming apparatus C is opened, the toner cartridge B is inserted in an arrow D5 direction of FIG. 11. Then, as shown in FIG. 12, when the toner cartridge B is inserted to a mounting position thereof and the door 2 is closed in an arrow D6 direction, the mounting of the toner cartridge B is completed. With the mounting of the toner supply device (cartridge) B, the apparatus is such that as seen in a rotational axis direction of the developing roller 13, the toner supplying device B is provided at the same position as a part of the developing device 3 in a direction perpendicular to a direction of gravitation and the rotational axis direction.

As shown in FIG. 12, in a state in which the toner cartridge B is mounted in the apparatus main assembly C1, the discharge opening 23 of the toner cartridge B and the receiving portion 18 of the process cartridge A communicate with each other. During the toner feeding, the toner is fed into the toner accommodating portion 17 of the process cartridge A from the toner accommodating portion 22 via the feeding path portion 24 by the flow of the air generated by the pump 21 of the toner cartridge B. In this embodiment, there is no need to provide the main assembly path portion 1 in the image forming apparatus C, and therefore, a degree of freedom in design of the image forming apparatus C.

First Modified Embodiment

Next, using FIG. 3, constitutions of a toner cartridge B and a process cartridge A of a first modified embodiment of this embodiment will be described. Part (a) of FIG. 13 is an exploded perspective view showing a state in which the toner cartridge B and the process cartridge A of the first modified embodiment of this embodiment are separated from each other. Part (b) of FIG. 13 is a sectional view showing a state in which the toner cartridge B and the process cartridge A of the first modified embodiment of this embodiment are connected to each other.

Inside the toner accommodating portion 17 of the process cartridge A, a feeding member 19 using a blade is provided, a feeding path portion 124 is communicated to an inside of the toner accommodating portion 17. The feeding path portion 124 is a tubular one provided in the developing device 3 and connected from the receiving portion 18 to the toner accommodating portion 17. Part (b) of FIG. 13 shows the state in which the toner cartridge B and the process cartridge A are connected to each other. In the state shown in part (b) of FIG. 13, the discharge opening 23 of the toner cartridge B and the receiving portion 18 of the process cartridge communicate with each other.

As regards the toner feeding in this embodiment, the toner in the toner accommodating portion 22 is fed from the communication opening 25 to the feeding path portion 24 by the flow of the air generated by the pump 21 of the toner cartridge B. Then, the toner is fed from the discharge opening 23 of the feeding path portion 24 to the feeding path portion 124 via the receiving portion 18 of the feeding path portion 124 of the process cartridge A communicated with the discharge opening 23. Then, the toner passes through the feeding path portion 124 and is fed into the toner accommodating portion 17.

Figure 13:
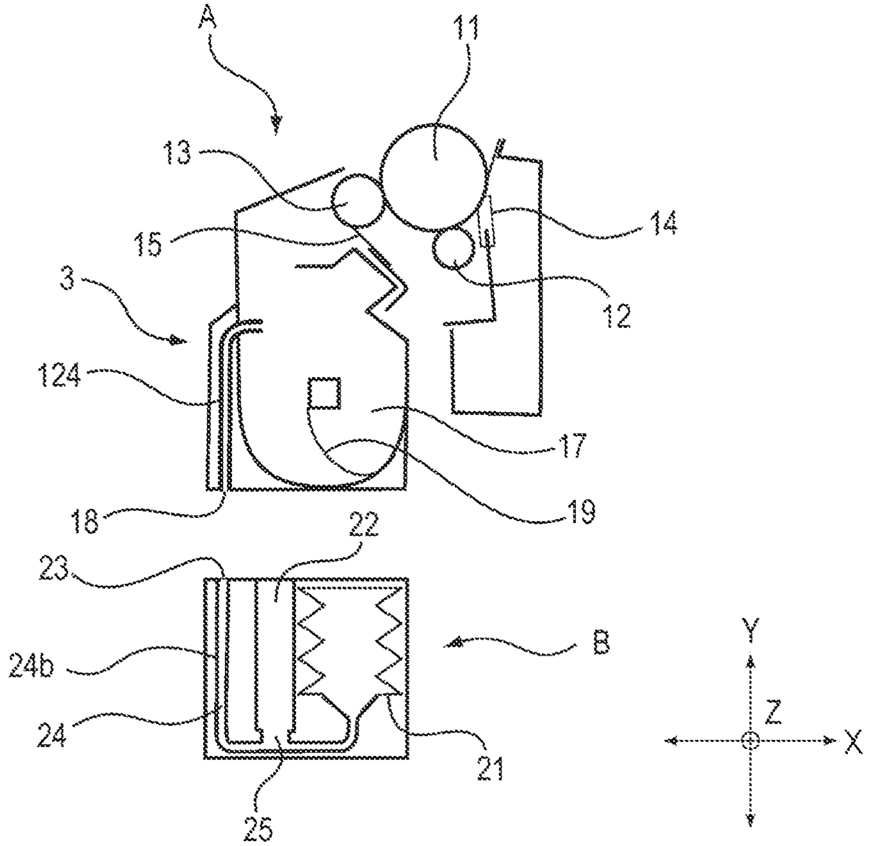
In FIG. 13, part (a) is an exploded perspective view showing a state in which a toner cartridge and a process cartridge of a first modified embodiment of the second embodiment are separated from each other. Part (b) is a sectional view showing a state in which the toner cartridge and the process cartridge of the first modified embodiment of the second embodiment are connected to each other.
Figure 13:
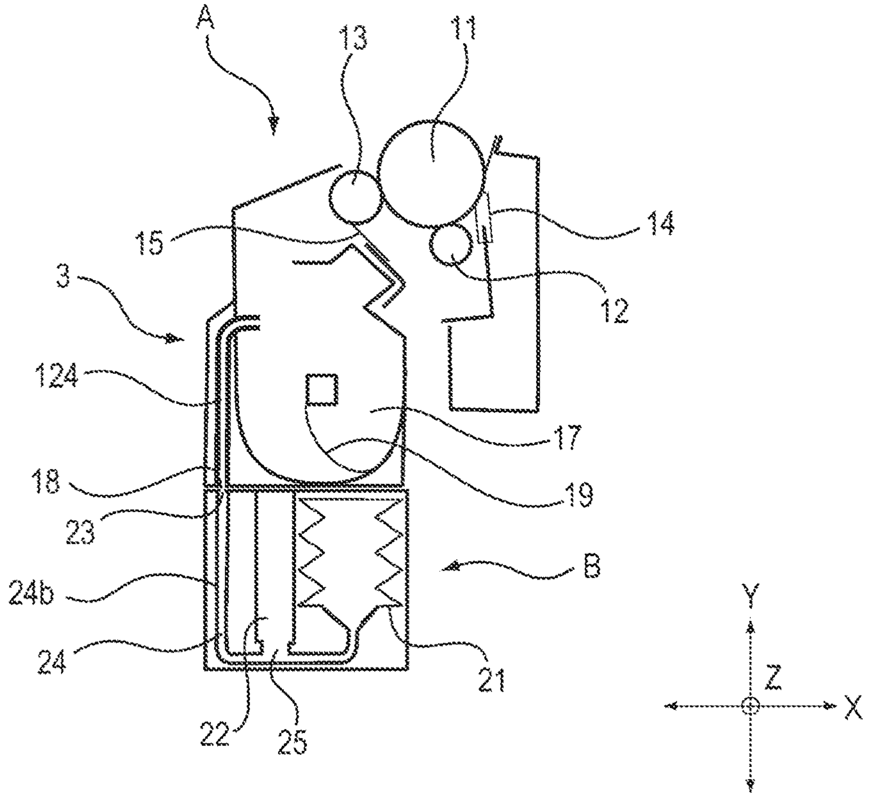

As regards an arrangement of the process cartridge A and the toner cartridge B, as shown in part (b) of FIG. 13, the process cartridge A can be disposed on the toner cartridge B. Or, as shown in FIG. 12, the process cartridge A and the toner cartridge B can also be disposed side by side in the horizontal direction. That is, the arrangement of the process cartridge A and the toner cartridge B may be in the up-down direction or in the horizontal direction. Other constitutions are constituted similarly as in the axis direction first embodiment, and a similar effect can be obtained.

Third Embodiment

Figure 14:
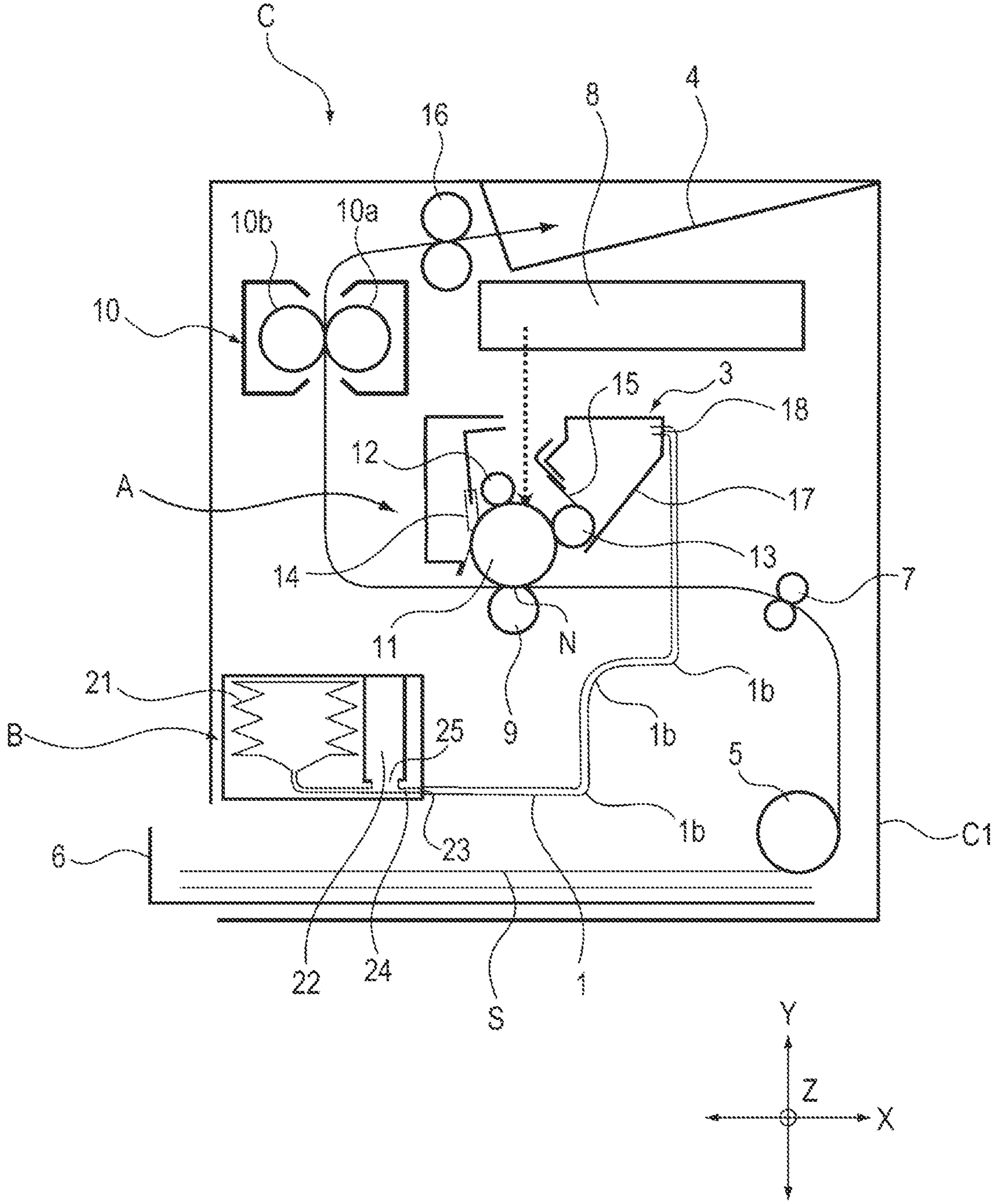
FIG. 14 is a sectional view showing a constitution of an image forming apparatus of a third embodiment.

Next, constitutions of a developer supplying device and an image forming apparatus according to the present invention in a third embodiment will be described using FIG. 14. Incidentally, members (portions) constituted similarly as in the axis direction embodiments will be omitted from description by adding the same symbols or by adding the same member names even when the symbols are different, and a similar effect can be obtained. FIG. 14 is a sectional view showing a constitution of the image forming apparatus C of this embodiment.

The toner cartridge B shown in FIG. 1 and part (b) of FIG. 13 is an example thereof disposed just under the process cartridge A in the image forming apparatus C, and the toner cartridge B shown in FIG. 12 is an example thereof disposed just beside the process cartridge A in the image forming apparatus C. The toner cartridge B in this embodiment is an example thereof disposed obliquely below the process cartridge A in the image forming apparatus C. Incidentally, an image forming process of the image forming apparatus C and constitutions of the process cartridge A and the toner cartridge B are similar to those in the axis direction first embodiment, and therefore, overlapping description will be omitted.

As shown in FIG. 14, the toner cartridge B in this embodiment is disposed in a place below the process cartridge A and away in the horizontal direction. The discharge opening 23 provided at an end portion of the feeding to path portion 24 of the toner cartridge B shown in FIG. 14 communicates with one end portion of the main assembly path portion 1 provided inside the image forming apparatus C. Further, the receiving portion 18 provided in the toner accommodating portion 17 of the process cartridge A also communicates with the other end portion of the main assembly path portion 1. The main assembly path portion 1 may only be required to be a hollow tubular one, and even when the main assembly path portion 1 includes a bent portion 1*b* as a part thereof, the toner is feedable.

As regards the toner feeding in this embodiment, the toner in the toner accommodating portion 22 is fed from the communication opening 25 to the discharge opening 23 via the feeding path portion 24 by the flow of the air generated by the pump 21 of the toner cartridge B. Further, the toner passes from the discharge opening 23 through the receiving portion 18 of the toner accommodating portion 17 of the process cartridge A via the main assembly path portion 1 provided in the image forming apparatus C, and is fed into the toner accommodating portion 17.

By constituting the main assembly path portion 1 in a hollow tubular shape, even when the main assembly path portion 1 includes a bent portion 1*b*, the toner can be fed by the main assembly path portion. For this reason, the toner cartridge B and the main assembly path portion 1 can be disposed at desired positions in the apparatus main assembly C1 of the image forming apparatus C. Other constitutions are constituted similarly as in the axis direction embodiments, and a similar effect can be obtained.

Fourth Embodiment

Next, constitutions of a developer supplying device and an image forming apparatus according to the present invention in a third embodiment will be described using FIG. 15. Incidentally, members (portions) constituted similarly as in the axis direction embodiments will be omitted from description by adding the same symbols or by adding the same member names even when the symbols are different, and a similar effect can be obtained. Part (a) of FIG. 15 is a sectional view showing a constitution in which a toner supplying device E is connected to an outside of the image forming apparatus C of this embodiment. Part (b) of FIG. 15 is a sectional view showing a constitution of the toner supplying device E dismounted from the apparatus main assembly C1 of the image forming apparatus C.

Incidentally, an image forming process of the image forming apparatus C and constitutions of the process cartridge A and the toner cartridge B are similar to those in the axis direction first embodiment, and therefore, overlapping description will be omitted. The image forming apparatus C of this embodiment includes the process cartridge A inside the apparatus main assembly C1. The process cartridge A of this embodiment is detachably mountable to the apparatus main assembly C1 of the image forming apparatus C. Although not illustrated, the process cartridge A may also be constituted by being integrally assembled with the image forming apparatus C.

The toner supplying device E of this embodiment is disposed at a position away from the apparatus main assembly C1 of the image forming apparatus C. Although not illustrated, the toner supplying device E may also be constituted by being integrally assembled with the apparatus main assembly C1 on an outside of the image forming apparatus C. Inside, the toner supplying device E, the toner cartridge B is provided. The toner cartridge B of this embodiment is provided detachably mountable to the toner supplying device E (cartridge) for use with the image forming apparatus C. Incidentally, although not illustrated, the toner cartridge B may also be constituted by being integrally assembled with the toner supplying device E.

The toner supplying device E includes a path portion E1 provided at an end portion of the feeding path portion 24 of the toner cartridge B and communicated with the discharge opening 23. The path portion E1 of the toner supplying device E is constituted in a flexible hollow tubular shape. As shown in part (a) of FIG. 15, in a state in which the toner supplying device E is connected to the image forming apparatus C, a discharge portion Ela at one end of the path portion E1 communicates with the receiving portion 18 of the toner accommodating portion 17.

As regards the toner feeding in this embodiment, the toner in the toner accommodating portion 22 is fed from the communication opening 25 to the feeding path portion 24 by the flow of the air generated by the pump 21 of the toner cartridge B. Thereafter, the toner passes from the discharge opening 23, provided at an end portion of the feeding path portion 24, through the supplying device E and is fed into the toner accommodating portion 17 from the receiving portion 18 provided in the toner accommodating portion 17 of the process cartridge A.

Thus, the toner can be fed from the toner cartridge B into the toner accommodating portion 17 of the process cartridge A via the path portion E1 of the toner supplying device E disposed at a position away from the apparatus main assembly C1 of the image forming apparatus C. By this, the toner supplying device E can be disposed at a desired place of an outside of the apparatus main assembly C1 of the image forming apparatus C. Other constitutions are constituted similarly as in the axis direction embodiments, and a similar effect can be obtained.

Fifth Embodiment

Figure 16:
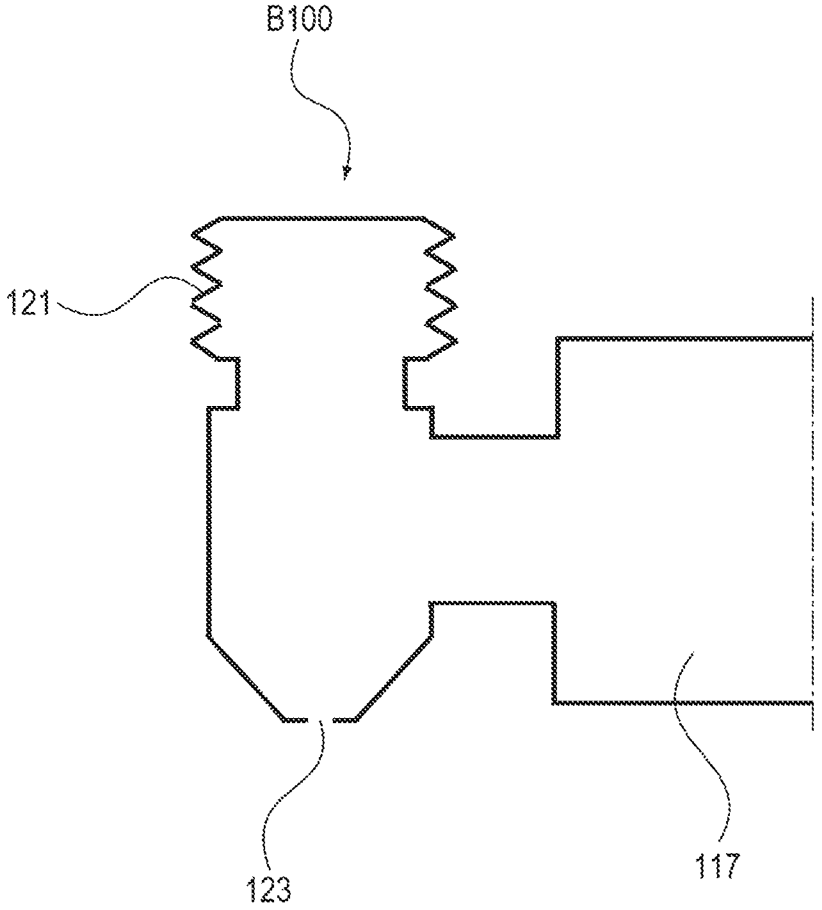
FIG. 16 is a sectional view showing a connection of a toner cartridge of a first comparison example.

In the toner cartridge B100, shown in FIG. 16, of JP-A 2010-256894, there was a possibility that the air generated by the contraction operation of the pump portion 121 blows toward the toner accommodating portion 117.

A fifth embodiment and a sixth embodiment described later show a constitution in which back-flow, into the toner accommodating portion, of the air generated by the contraction operation of the pump portion can be further suppressed.

First, a constitution of a fifth embodiment of the developer supplying device and the image forming apparatus according to the present invention will be specifically described using FIG. 1 and FIG. 17 to FIG. 30.

<Image Forming Apparatus>

A constitution of an image forming apparatus C and a process cartridge A will be described using FIG. 1. FIG. 1 is a sectional view showing a constitution of the image forming apparatus C of this embodiment. Incidentally, in the following description, description will be made, in some cases, using a coordinate system in which an up-down (vertical direction) of FIG. 1 is a Y axis direction, a horizontal direction of FIG. 1 is an X axis direction, and a depth direction of FIG. 1 is a Z axis direction. The image forming apparatus C shown in FIG. 1 is an image forming apparatus for forming an image on a recording material S such as paper by using an electrophotographic (image) forming process. At a central portion of the image forming apparatus C shown in FIG. 1, the process cartridge A detachably mountable to an apparatus main assembly 1C of the image forming apparatus C is provided.

<Process Cartridge>

The constitution of the process cartridge A will be described using FIG. 1. Here, the process cartridge A is one including a photosensitive drum 11 as an image bearing member, and various process means actable on the photosensitive drum 11. Here, as the process means, for example, there is a charging roller as a charging means for electrically charging a surface of the photosensitive drum 11 uniformly. Further, as the process means, there is a developing device 3 for developing an electrostatic latent image, formed on the surface of the photosensitive drum 11, as a toner image by supply toner as a developer to the electrostatic latent image. Further, as the process means, there is a cleaning blade 14 as a cleaning means for removing residual toner remaining on the surface of the photosensitive drum 11 after transfer.

The process cartridge A of this embodiment is provided with the charging roller 12 at a periphery of the photosensitive drum 11 rotating in the clockwise direction of FIG. 1 and includes the cleaning blade 14, having elasticity, as the cleaning means. Further, the developing device 3 includes a developing roller 13 provided opposed to the surface of the photosensitive drum 11, a developing blade 15, and a toner accommodating portion 17 for accommodating the toner. The toner accommodating portion 17 is provided with a receiving portion 18 for receiving the toner supplied, via a maximum acceleration(-side) path portion 1, from a toner cartridge B provided below the process cartridge A.

<Toner Cartridge>

Figure 17:
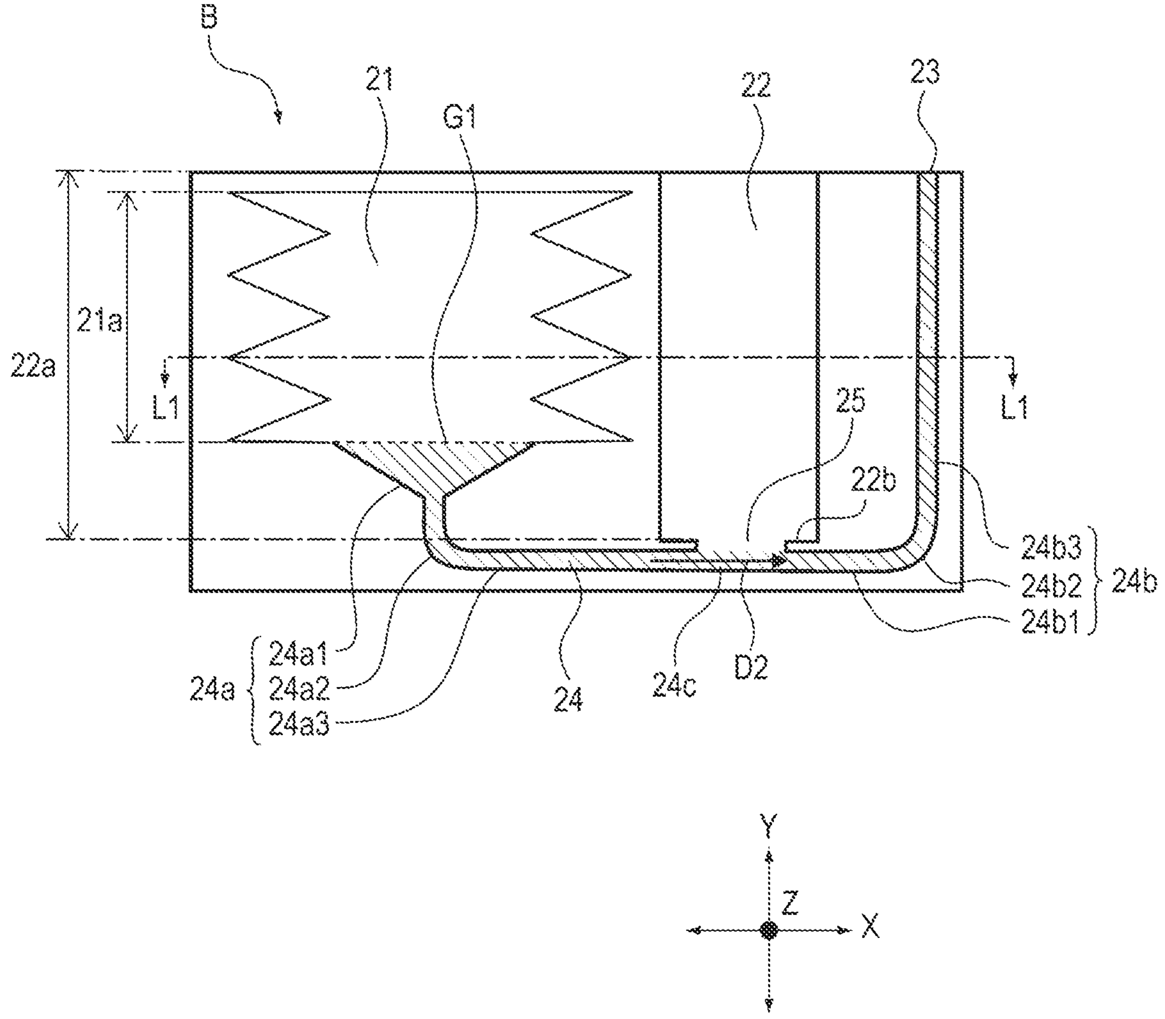
FIG. 17 is a sectional view showing a constitution of a toner cartridge of a fifth embodiment.

A constitution of the toner cartridge B as a developer supplying device used in the image forming apparatus C will be described using FIG. 1 and FIG. 17. FIG. 17 is a sectional view showing the constitution of the toner cartridge B of this embodiment. The toner cartridge B shown in FIG. 1 and FIG. 17 is provided such as to be detachably mountable to the apparatus main assembly C1 of the image forming apparatus C.

As shown in FIG. 1, the toner cartridge B includes a toner accommodating portion 22 as a developer accommodating portion for accommodating toner (developer) in an inside thereof. Further, the toner cartridge B includes a volume-variable pump portion 21 for creating a flow of air by a volume change. Further, the toner cartridge B includes a discharge opening 23 for permitting discharge of the toner from the toner accommodating portion 22 of the toner cartridge B to an outside. Further, the toner cartridge B includes a connection opening (boundary G1) connected to the pump portion 21 at one end and includes a feeding path portion 24 (hatching portion of FIG. 17) including the discharge opening 23 at the other end. The toner cartridge B supplies the toner into the toner accommodating portion 17 of the process cartridge A via the main assembly path portion 1 provided in the apparatus main assembly C1 of the image forming apparatus C.

As shown in FIG. 17, the toner accommodating portion 22 includes a communication opening 25 as a communication opening. The toner accommodating portion 22 is connected to an intermediate portion between one end (boundary G1) and the other end (discharge opening 23) of the feeding path portion 24 via the communication opening 25. In the toner accommodating portion 22, the toner as the developer is accommodated. A volume change amount of the pump portion 21 is set so as to be larger than a total volume from the boundary G1 (connection opening) to the discharge opening 23 of the feeding path portion 24.

The process cartridge A and the toner cartridge B which are shown in FIG. 1 are mounted in the apparatus main assembly C1 of the image forming apparatus C and are used for image formation. At a lower portion of the image forming apparatus C, a feeding cassette 6 in which recording materials S such as paper are accommodated. The recording materials S accommodated in the feeding cassette 6 are fed and separated one by one by an unshown separating means, and the separated recording material S is fed. Thereafter, a leading end portion of the recording material S is abutted against a nip of registration rollers 7, so that oblique movement of the recording material S is corrected.

In synchronism with a feeding operation of the recording material S from the feeding cassette 6, the surface of the photosensitive drum 11 uniformly charged by the charging roller 12 is selectively exposed to light depending on image information, so that an electrostatic latent image is formed. On the other hand, the toner accommodated in the toner accommodating portion 17 is supplied to the developing roller 13, and the toner is carried in a thin layer state on a surface of the developing roller 13 by the developing blade 15. By applying a developing bias to the developing roller 13, the toner is supplied to the electrostatic latent image formed on the surface of the photosensitive drum 11, so that the electrostatic latent image is developed as a toner image.

In conformity to a timing when the toner image formed on the surface of the photosensitive drum 11 reaches a transfer nip N formed by the photosensitive drum 11 and a transfer roller 9, the recording material S is fed to the transfer nip N by the registration rollers 7. By applying a transfer bias voltage to the transfer roller 9, in the transfer nip N, the toner image formed on the surface of the photosensitive drum 11 is transferred onto the recording material S.

The recording material S on which the toner image is transferred is conveyed to a fixing device 10, and is heated and pressed by a heating unit 10*a* and a pressing roller 10*b* which are provided in the fixing device 10, so that the toner image is fixed on the recording material S. The recording material S on which the toner image is fixed is conveyed to discharging rollers 16 and is discharged onto a discharge portion 4 provided at an upper portion of the image forming apparatus C.

Figure 18:
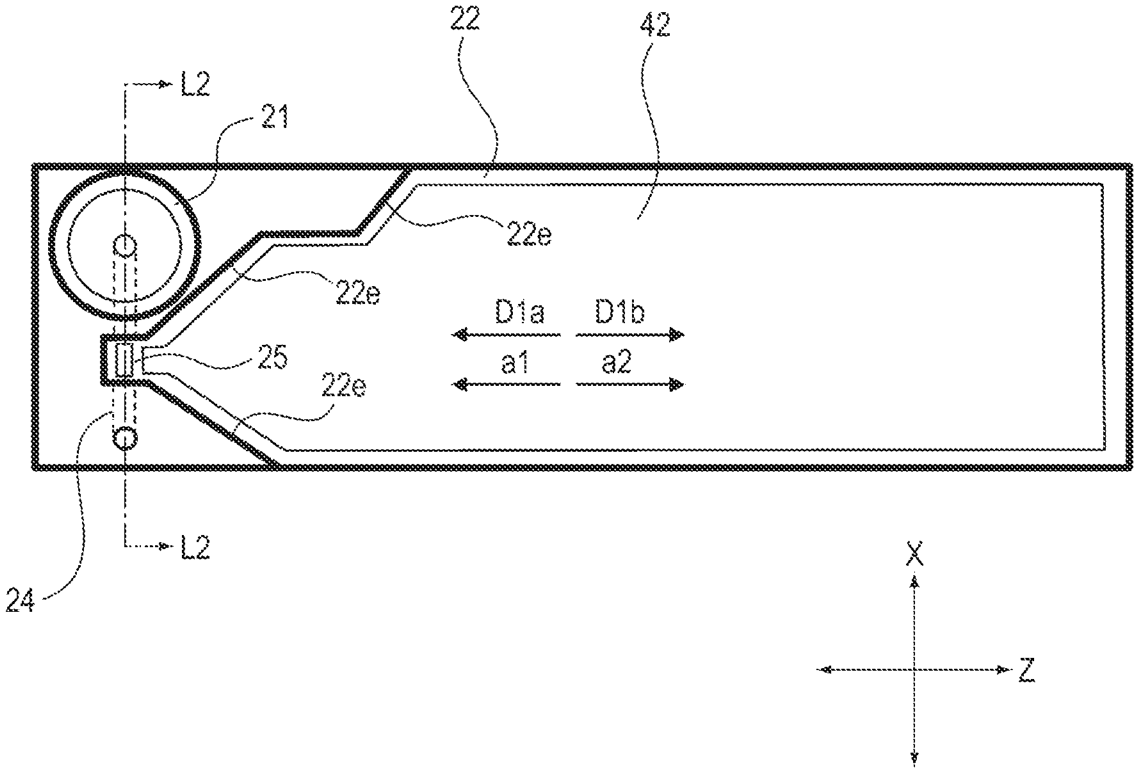
FIG. 18 is a sectional view viewed from above when the toner cartridge of the fifth embodiment is cut in the horizontal direction.

FIG. 18 is a sectional view of the toner cartridge B of this embodiment as seen from above when the toner cartridge B is cut in a horizontal direction. FIG. 17 is a sectional view of a cross section of the toner cartridge B of this embodiment, as seen in a rightward direction of FIG. 18, when the toner cartridge B is cut in a vertical direction along L2-L2 (line) of FIG. 18. On the other hand, FIG. 18 is a sectional view of a cross section of the toner cartridge B of this embodiment, as seen from above, when the toner cartridge B is cut in the horizontal direction along L1-L2 (line) of FIG. 17.

As shown in FIG. 18, the toner accommodating portion 22 accommodates the toner therein and includes a plate-like member 42 for feeding the toner accommodated in the toner accommodating portion 22. In this embodiment, the toner of the plate-like member 42 is fed by reciprocating the plate-like member 42 in in arrow D1*a* and D1*b* direction of FIG. 18 along a bottom of an inside of the toner accommodating portion 22.

Here, maximum acceleration a1 when the plate-like member 42 moves in the arrow D1*a* direction in which the plate-like member 42 approaches a communication opening 25 is set so as to become smaller than maximum acceleration a2 when the plate-like member 42 moves in the arrow D1*b* direction in which the plate-like member 42 moves away from the communication opening 25. By this, the toner on the plate-like member 42 is fed in the arrow D1*a* direction in which the toner approaches the communication opening 25.

By this, the toner on the plate-like member 42 is fed in the arrow D1*a* direction and is supplied into the feeding path portion 24 by a self-weight thereof from the communication opening 25. The bottom 22*b* of the toner accommodating portion 22 shown in FIG. 18 on one end side (arrow D1*a* direction side of FIG. 3) with respect to a longitudinal direction is provided with the communication opening 25 which is an opening downward opening and which is connected to the feeding path portion 24. As shown in FIG. 18, the communication opening 25 is constituted by a rectangle.

<Pump Portion>

Figure 19:
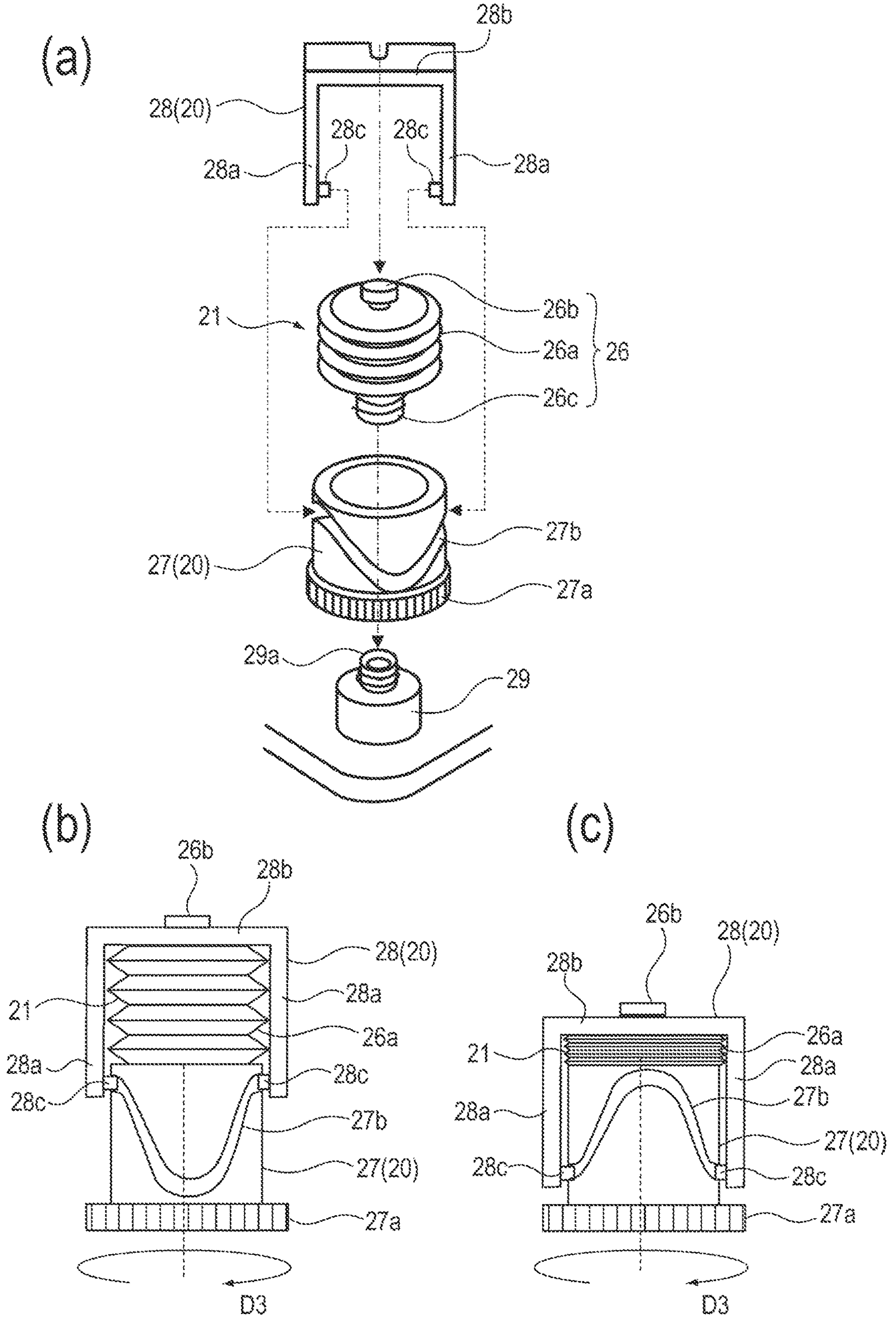
In FIG. 19, part (a) is an exploded perspective view showing a constitution of a driving portion for a pump portion of the fifth embodiment. Part (b) is a side view showing a state in which the pump portion of the fifth embodiment is expanded. Part (c) is a side view showing a state in which the pump portion of the fifth embodiment is contracted.
Figure 20:
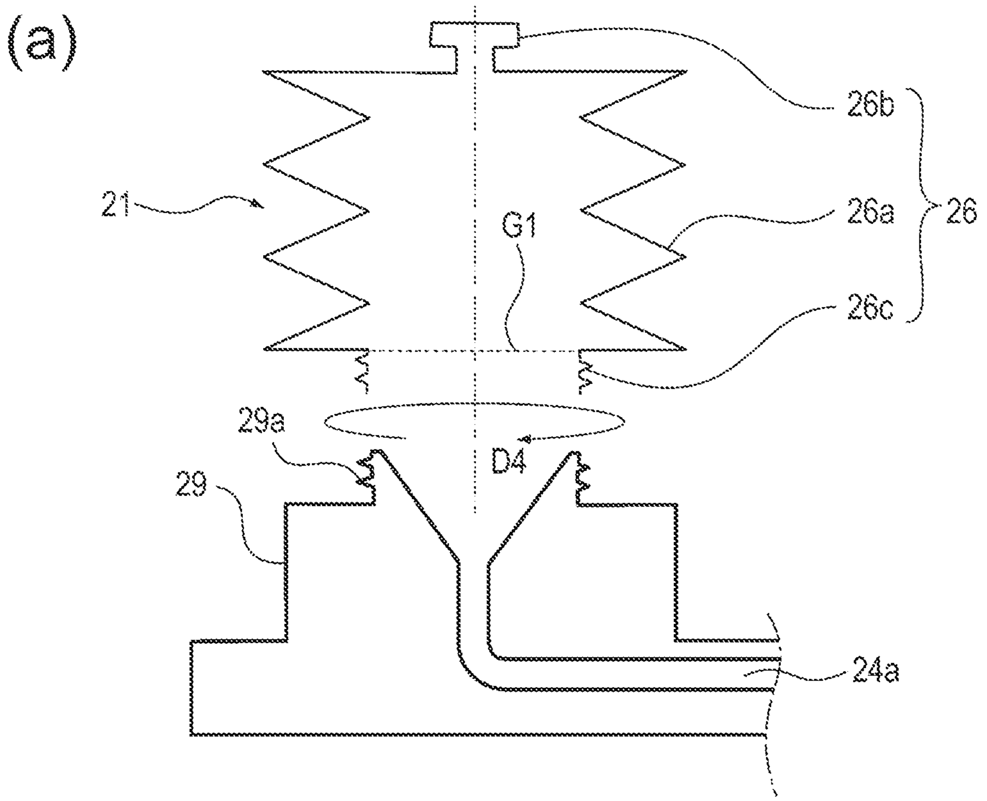
In FIG. 20, part (a) is a sectional view before the pump portion of the fifth embodiment is assembled. Part (b) is a sectional view after the pump portion of the fifth embodiment is assembled.
Figure 20:
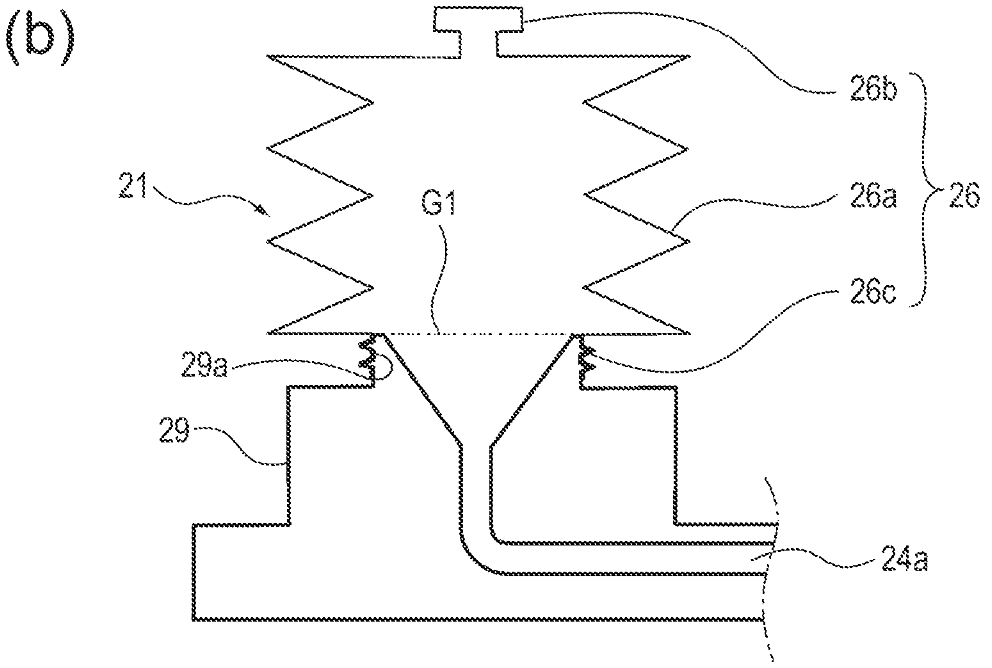

Next, a constitution of a pump portion 21 will be described using FIG. 19 and FIG. 20. Part (a) of FIG. 19 is an exploded perspective view showing a constitution of a driving portion 20 of the pump portion 21 in this embodiment. Part (b) of FIG. 19 is a side view showing a state in which the pump portion 21 in this embodiment is expanded. Part (c) of FIG. 19 is a side view showing a state in which the pump portion 21 in this embodiment is contracted. Part (a) of FIG. 20 is a sectional view before the pump portion 21 in this embodiment is assembled. Part (b) of FIG. 20 is a sectional view after the pump portion 21 in this embodiment is assembled.

<Driving Portion>

As shown in parts (a) to (c) of FIG. 19, the pump portion 21 changes in volume by being driven by the driving portion 20. The pump portion 21 is driven by the driving portion 20 so that a volume change amount of the pump portion 21 becomes larger than a total volume from the boundary G1 (connection opening) to the discharge opening 23. The driving portion is constituted by including a pump driving gear 27 and a reciprocating member 28. The pump portion 21 comprises in a downward direction via the pump driving gear 27 and the reciprocating member 28 as shown in part (c) of FIG. 19, and expands in an upward direction as shown in part (b) of FIG. 19. The pump driving gear 27 includes a gear portion 27*a* and a cam portion 27*b*, and is rotated in an arrow D3 direction of parts (b) and (c) of FIG. 19 by receiving a driving force inputted from the image forming apparatus C.

The pump driving gear 27 is constituted in a cylindrical shape, and is rotatably supported by a supporting member 29 constituted such that an outer peripheral surface is a circumferential surface. The gear portion 27*a* is formed over a full length of a lower end portion of the pump driving gear 27 with respect to a circumferential direction of the outer peripheral surface. At the outer peripheral surface of the pump driving gear 27 and at the upper portion of the gear portion 27*a*, the cam portion 27*b* consisting of a groove portion which causes continuous reciprocating displacement in an axial direction (up-down direction of FIG. 19) of the pump driving gear 27 is formed over the full length of the pump driving gear 27 with respect to the circumferential direction of the outer peripheral surface.

By rotation of the pump driving gear 27 in an arrow D3 direction of parts (b) and (c) of FIG. 19, the reciprocating member 28 engaged with the cam portion 27*b* is reciprocated in the up-down direction of parts (b) and (c) of FIG. 19. The reciprocating member 28 engages with an engaging portion 26*b* provided at an upper end portion of a bellow-shaped member 26 constituting a part of the pump portion 21. The reciprocating member 28 is constituted by including a pair of arm portions 28*a* and fixing portions 28*b* each connected to one end portion of each of the pair of arm portions 28*a*, and at the other end portion of each of the arm portions 28*a*, a projected portion 28*c* projecting toward an inside of each of the arm portions 28*a* is provided. The projected portion 28*c* of the reciprocating member 28 is slidably inserted into the groove portion of the cam portion 27*b* of the pump driving gear 27.

As shown in part (a) of FIG. 19, the pump portion 21 is constituted by a part of the bellow-shaped member 26 which is round in cross section when cut in a horizontal direction and which opens at a lower portion. Further, as shown in FIG. 20, the bellow-shaped member 26 includes a bellow portion 26*a* and an engaging portion 26*b* provided at an upper end portion of the bellow portion 26*a*. Further, the bellow-shaped member 26 is constituted by including a fixing portion 26*c* consisting of a cylindrical female-screw portion which is open at a lower end portion of the bellow portion 26*a*.

The fixing portion 26*c* is threadably fastened to a cylindrical male-screw portion 28*a* which is open at an upper end portion of the supporting member 29. The engaging portion 26*b* is mounted in the fixing portion 28*b* of the reciprocating member 28. As shown in part (a) of FIG. 20, the fixing portion 26*c* has a screw-like shape, and the female-screw portion is formed on an inner peripheral surface of the cylindrical portion. Further, the fixing portion 26*c* is rotated in an arrow D4 direction of part (a) of FIG. 20, and is threadably fastened and fixed to the male-screw portion 29*a* of the supporting member 29.

The pump driving gear 27 is rotated in the arrow D3 direction of parts (b) and (c) of FIG. 19 by the driving force inputted from the image forming apparatus C to the gear portion 27*a*. Then, the cam portion 27*b* is rotated integrally with the pump driving gear 27, so that the reciprocating member 28 reciprocates in the up-down direction of parts (b) and (c) of FIG. 19 via the projected portion 28*c* engaged with the groove portion of the cam portion 27*b*. By this, the pump portion 21 locked at an upper end portion to the fixing portion 28*b* of the reciprocating member via the engaging portion 26*b* repeats expansion and contraction as shown in parts (b) and (c) of FIG. 19.

As shown in parts (a) and (b) of FIG. 20, inside the supporting member 29, a first feeding path region 24*a* which is a part of the feeding path portion 24 is provided. Here, the pump portion 21 is a part of the bellow portion 26*a*. On the other hand, the fixing portion 26*c* which does not cause volume change is included in the feeding path portion 24, not the pump portion 21. Therefore, a boundary between the pump portion 21 and the feeding path portion 24 is the boundary G1 between the bellow portion 26*a* and the fixing portion 26*c* of the bellow-shaped member 26.

As shown in FIG. 17, the boundary G1 as the connection opening between the pump portion 21 and the feeding path portion 24 is disposed above a portion where the feeding path portion 24 communicates with the toner accommodating portion 22. Further, a direction in which the pump portion 21 is connected to the feeding path portion is a downward direction, the portion where the feeding path portion 24 communicates with the feeding path portion 24 is disposed below the toner accommodating portion 22.

Here while sandwiching the boundary G1 as shown in FIG. 17, a volume of the pump portion 21 is set so as to become larger than a volume of the feeding path portion 24 (hatched portion of FIG. 17). Further, as shown in FIGS. 1 and 17, the volume of the pump portion 21 is set so as to become larger than a volume of a sum of the volume of the feeding path portion 24 and a volume of the main assembly path portion 1. In this embodiment, the volume of the pump portion 21 is 10 cc, and the volume of the sum of the volumes of the feeding path portion 24 and the main assembly path portion 1 is 3 cc.

Further, the volume of the sum of the volumes of the feeding path portion 24 and the main assembly path portion 1 is smaller than the volume change amount of the pump portion 21. By this, even in a combination of a long feeding path portion 24 with the main assembly path portion 1 or in a combination of a bent feeding path portion 24 with the main assembly path portion 1, toner feeding can be made easy by an expansion/contraction operation of the pump portion 21.

Further, the boundary G1 of the pump portion 21 with the feeding path portion 24 is provided at a position higher with respect to a vertical direction than the communication opening 25 provided at the boundary between the toner accommodating portion 22 and the feeding path portion 24, further, when the pump portion 21 and the toner accommodating portion 22 shown in FIG. 17 are viewed in a horizontal direction (X axis direction), a range of the pump portion 21 in the vertical direction (Y axis direction) in FIG. 17 is a range 21*a*, and similarly a range of the toner accommodating portion 22 in the vertical direction (Y axis direction) in FIG. 2 is a range 22*a*. At this time, the range 21*a* and the range 22*a* are set in an overlapping range in the vertical direction. That is, the pump portion 21 is disposed at an overlapping position with the toner accommodating portion 22 in the vertical direction when viewed in the horizontal direction.

The pump portion 21 repeats the expansion/contraction operation. The toner supplied into the feeding path portion 24 is fed in the feeding path portion 24 by a flow of air in the arrow D2 generated during compression of the pump portion 21, and is supplied into the main assembly path portion 1 provided in the apparatus main assembly C1 of the image forming apparatus C through the discharge opening 23. Further, the toner is supplied into the toner accommodating portion 17 through the receiving portion 18, provided in the toner accommodating portion 17 of the process cartridge A, with which the other end portion of the main assembly path portion communicates. The main assembly path portion 1 shown in FIG. 1 is constituted by a hollow tube shape.

<Effect of Pump Portion>

The volume of the pump portion 21 is set so as to be larger than the volume of the sum of the volume of the feeding path portion 24 and the volume of the main assembly path portion 1. By this, the toner carried to the feeding path portion 24 through the communication opening 25 of the toner accommodating portion 22 by the extraction/contraction operation of the pump portion 21 can be fed from the feeding path portion 24 to an outside of the discharge opening 23. Further, the toner is fed through the main assembly path portion 1 to the receiving portion 18 provided in the toner accommodating portion 17, so that the toner can be supplied into the toner accommodating portion 17. In this embodiment, the volume of the pump portion 21 is about 10 cc, and the volume of the sum of the volumes of the feeding path portion 24 and the main assembly path portion 1 is about 3 cc. By this, the volume of the pump portion 21 is set so as to be twice or more the volume of the feeding path portion 24.

Incidentally, a relationship between the volume of the pump portion 21 and the volume of the sum of the volumes of the feeding path portion 24 and the main assembly path portion is not limited thereto, but may be appropriately set depending on a kind of the toner fed, or a higher or a distance in which the toner is fed. The volume of the pump portion 21 is made twice or more the volume of the feeding path portion 24, whereby the toner can be stably discharged by the expansion/contraction operation without leaving the toner in the feeding path portion 24.

Further, as shown in FIG. 17, a (toner) discharging direction of the pump portion 21 is disposed downward, whereby the toner can be made hard to enter the pump portion 21 during suction of air by the pump portion 21. Further, in the vertical direction shown in FIG. 17, the boundary G1 between the pump portion 21 and the feeding path portion 24 is provided at a position higher than the communication opening 25 of the toner accommodating portion 22. By this, it is possible to suppress that the toner accommodated in the toner accommodating portion 17 enters the pump portion 21 via the feeding path portion 24 during transportation or the like of the toner cartridge B. Further, when the pump portion 21 is viewed in the horizontal direction of FIG. 17, the pump portion 21 is disposed at an overlapping position with the toner accommodating portion 22 in the vertical direction of FIG. 17. By this, the toner cartridge B can be downsized in the vertical direction.

<Feeding Path Portion>

Figure 21:
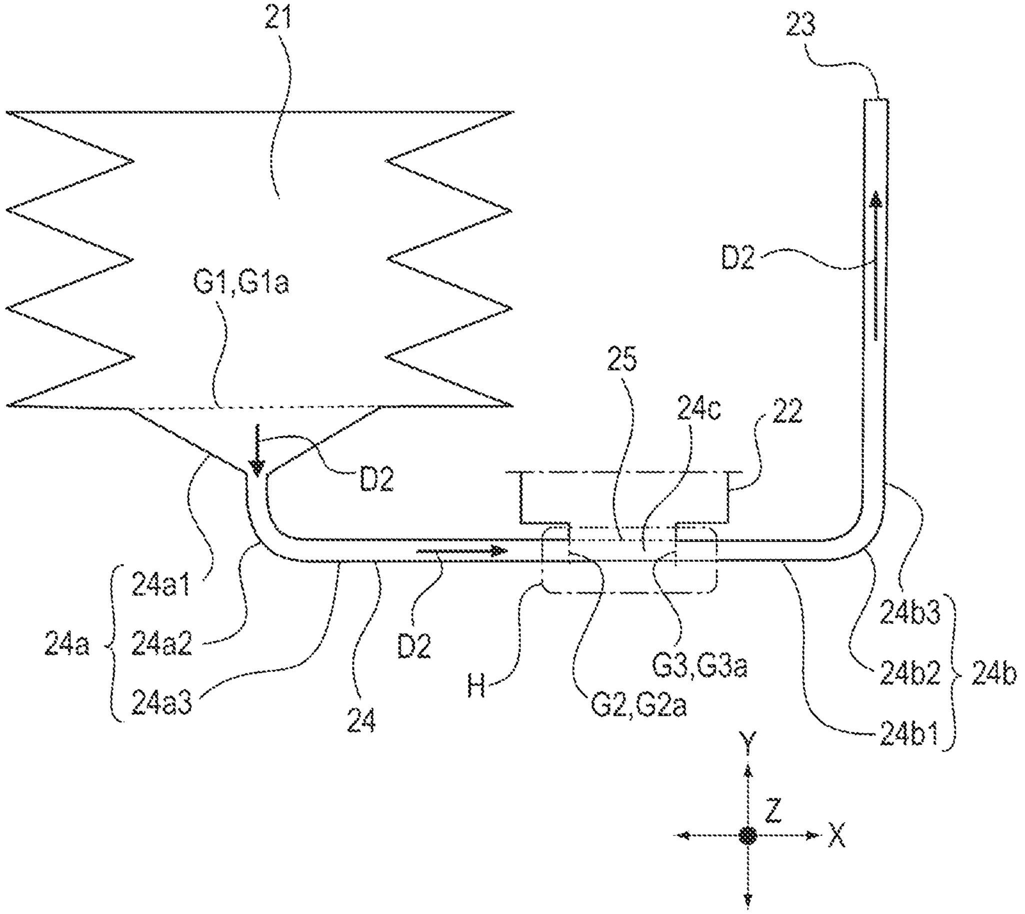
In FIG. 21, part (a) is a sectional view showing a constitution of the pump portion and a feeding path portion of the fifth embodiment. Part (b) is an enlarged view of an H portion of part (a).
Figure 21:
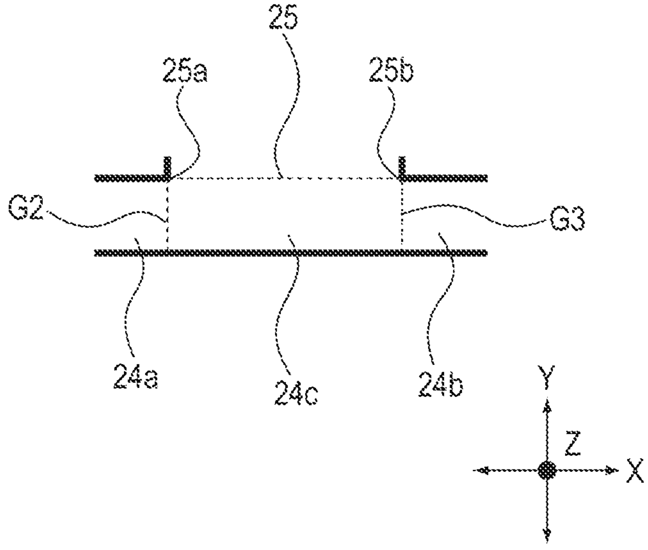

Next, a constitution of the feeding path portion 24 will be described using FIGS. 17 and 21. Part (a) of FIG. 21 is a sectional view showing constitutions of the pump portion 21 and the feeding path portion 24 in this embodiment. Part (b) of FIG. 21 is an enlarged view of an H portion of part (a) of FIG. 21. A range of the feeding path portion 24 indicated by a hatched portion of FIG. 17 is a range from the boundary G1 between the pump portion 21 and the feeding path portion 24 to the discharge opening 23 in the arrow D2 direction which is a direction in which the air generated during compression of the pump portion 21 flows. At an intermediary portion of the feeding path portion 24, the feeding path portion 24 communicates with the communication opening 25 of the toner accommodating portion 22.

As shown part (a) of FIG. 21, the feeding path portion 24 includes a first feeding path region 24*a* connected to the pump portion 21 and a second feeding path region 24*b* connected to the discharge opening 23. Further, the feeding path portion 24 includes a third feeding path region 24*c* connected to the first feeding path region 24*a*, the second feeding path region 24*b*, and the communication opening of the toner accommodating portion 22. As shown in part (b) of FIG. 21, the first feeding path region 24*a* and the third feeding path region 24*c* are sectioned by a boundary G2, and the second feeding path region 24*b* and the third feeding path region 24*c* are sectioned by a boundary G3. The boundary G2 is a cross section of the feeding path portion 24 including an end portion 25*a*, on the pump portion 21 side, of the communication opening 25 of the toner accommodating portion 22 contacting the feeding path portion 24. The boundary G3 is a cross section of the feeding path portion 24 including an end portion 25*b*, on the discharge opening 23 side, of the communication opening 25 of the toner accommodating portion 22 contacting the feeding path portion 24.

The first feeding path region 24*a* is a region, on the pump portion 21 side, of the feeding path portion 24 from the boundary G1 to the boundary G2 shown in part (a) of FIG. 21. The second feeding path region 24*b* is a region, on the discharge opening 23 side, of the feeding path portion 24 from the boundary G3 to the discharge opening 23 shown in part (a) of FIG. 21. The second feeding path region 24*b* is a portion on the discharge opening 23 side than the boundary G3 which is a portion where the feeding path portion communicates with the toner accommodating portion 22.

In the second feeding path region 24*b*, the boundary G3 which is one end on the side where the feeding path portion 24 communicates with the toner accommodating portion 22 is disposed at a position lower in the vertical direction them the discharge opening 23 which is the other end. The third feeding path region 24*c* is a region, from the boundary G2 to the boundary G3, other than the first feeding path region 24*a* and the second feeding path region 24*b* in the feeding path portion 24 shown in parts (a) and (b) of FIG. 21.

<First Feeding Path Region>

A constitution of the first feeding path region 24*a* will be described using FIG. 21. The first feeding path region 24*a* shown in part (a) of FIG. 21 is constituted by including a funnel-shaped portion 24*a*1 connected to the pump portion 21, a tubular bent portion 24*a*2 connected to the funnel-shaped portion 24*a*2, and a tubular rectilinear portion 24*a*3 connected to the bent portion 24*a*2. These portions are smoothly connected to each other. In the case where a cross-sectional area of each of opposite end portions of the first feeding path region 24*a* is considered, when the cross-sectional area of the boundary G1 is G1*a* and the cross-sectional area of the boundary G2 is G2*a*, the following relationship is satisfied.

$$G1a>G2a$$

The first feeding path region 24*a* shown in part (a) of FIG. 21 is a portion on the pump portion 21 side than the portion where the feeding path portion 24 communicates with the toner accommodating portion 22. In the first feeding path region 24*a*, the cross-sectional area G1*a* of the boundary G1 (connection opening) is larger than the cross-sectional area G2*a* of the boundary G2 which is the portion where the feeding path portion 24 communicates with the toner accommodating portion 22. Further, in the first feeding path region 24, the boundary G2 as one end on the side where the feeding path portion 24 communicates with the toner accommodating portion 22 is disposed at the lowest position in the vertical direction.

<Effect of First Feeding Path Region>

As described above, the first feeding path region 24*a* is capable of freely disposing a position of the pump portion 21 by including the bent portion 24*a*2. Further, by including the bent portion 24*a*2, the boundary G1 which is the connection opening of the pump portion 21 can be disposed downward in the vertical direction. By this, the toner can be made hard to enter the pump portion 21.

Further, the relationship between the cross-sectional areas of the opposite end portions of the first feeding path region 24*a* is made to satisfy G1*a*>G2*a*, so that a flow rate of air stream generated in the pump portion 21 can be made fast in the first feeding path region 24*a*. By this, the toner can be sent to a higher place or a more distant place by the extraction/contraction operation of the pump portion 21.

Further, in the first feeding path region 24*a*, the boundary G2 side is provided at the lowest position in the vertical direction. By this, the toner accommodated in the toner accommodating portion 22 becomes hard to enter a region of the first feeding path region 24 from the bent portion 24*a*2 to the funnel-shaped portion 24*a*1, and therefore, stability of a toner feeding amount can be realized.

<Second Feeding Path Region>

Next, a constitution of the second feeding path region 24*b* will be described using FIG. 21. The second feeding path region 24*b* shown in part (a) of FIG. 21 is constituted by including a tubular rectilinear portion 24*b*1 connected to the third feeding path region 24*c*, a tubular bent portion 24*b*2 connected to the rectilinear portion 24*b*1, and a tubular rectilinear portion 24*b*3 connected to the bent portion 24*b*2. The respective portions are smoothly connected to each other.

Incidentally, an inner diameter of each of the rectilinear portions 24*b*1 and 24*b*3 and the bent portion 24*b*2 is 4 mm. Further, the second feeding path region 24*b* extends upward in the vertical direction from the bent portion 24*b*2 over the rectilinear portion 24*b*3, and the discharge opening 23 provided at an end portion of the rectilinear portion 24*b*3 is disposed at a position higher than the third feeding path region 24*c* in the vertical direction.

Further, as shown in part (a) of FIG. 21, the second feeding path region 24*b* is a portion on the discharge opening 23 side (discharge opening side) than a portion of the feeding path portion 24 communicating with the toner accommodating portion 22. Further, in the second feeding path region 24*b*, the boundary G3 is disposed at the lowest position with respect to the vertical direction. Further, the second feeding path region 24*b* feeds the air sent from the pump portion 21 and the toner supplied from the toner accommodating portion 22. For this reason, it is desirable that in the air flowing direction, an abutting change in cross-sectional area such as a stepped portion is small.

<Effect of Second Feeding Path Region>

As described above, the second feeding path region 24*b* includes the bent portion 24*b*2, so that a position of the discharge opening 23 can be freely disposed. Further, in the second feeding path region 24*b*, the boundary G3 side is provided at the lowest position in the vertical direction. By this, the toner in the toner accommodating portion 22 becomes hard to enter a region from the bent portion 24*b*2 to the rectilinear portion 24*b*3 of the second feeding path region 24*b*, and therefore, stabilization of the toner feeding amount can be realized.

<Third Feeding Path Region>

Figure 22:
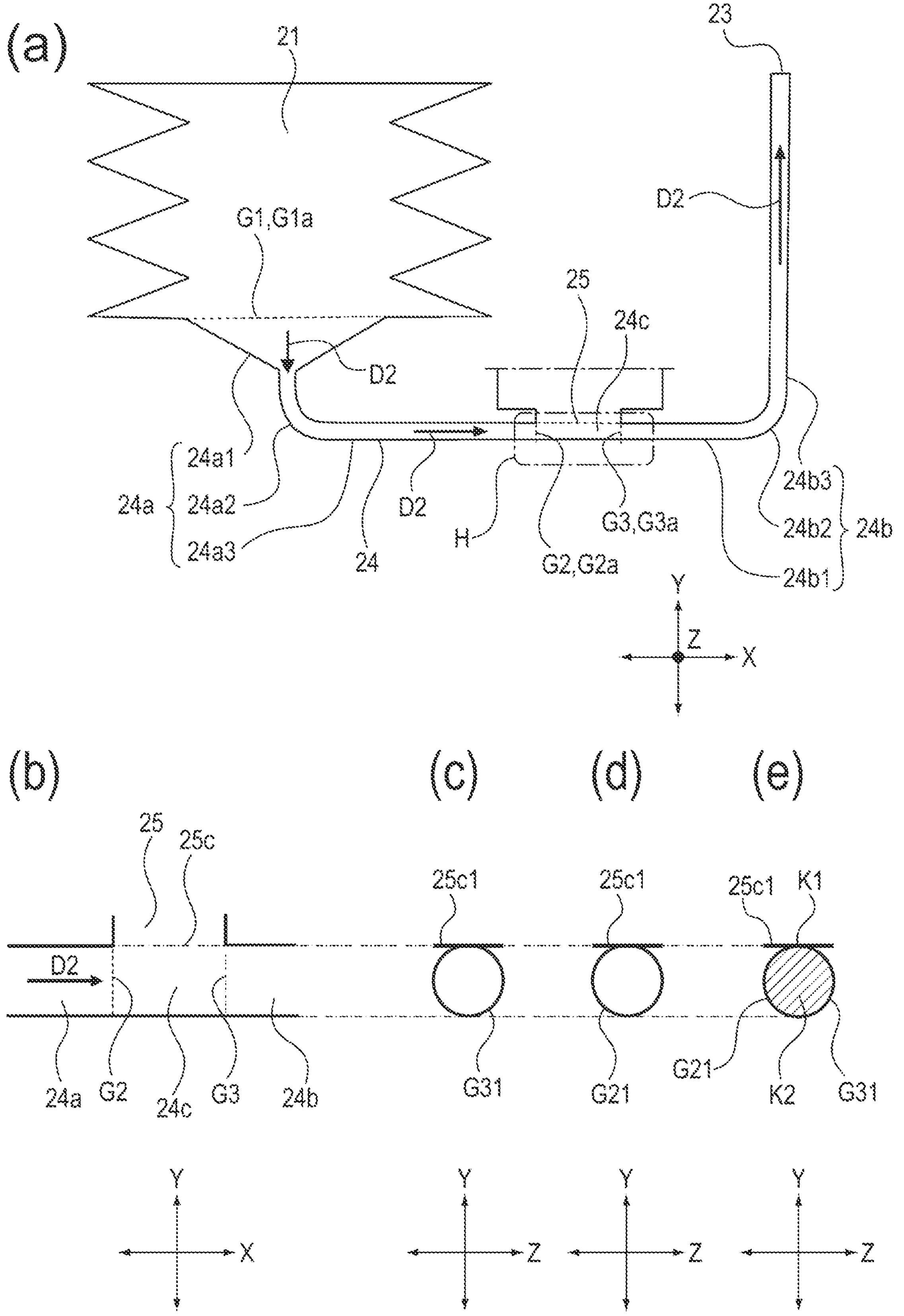
In FIG. 22, part (a) is a sectional view of the pump portion and the feeding path portion of the fifth embodiment which are viewed from the Z axis direction. Part (b) is an enlarged view of an H portion. Parts (c) to (e) are views showing an outer configuration when a communication opening is projected in the air flowing direction when the pump portion is compressed, an outer configuration when a boundary G3 is projected, and an outer configuration when a boundary G2 is projected.

Next, a constitution of the third feeding path region 24*c* will be described using FIGS. 17, 21 and 22. Part (a) of FIG. 22 is a sectional view of the pump portion 21 and the feeding path portion 24 in this embodiment as viewed in the Z axis direction. Part (b) of FIG. 22 in an enlarged view of an H portion of part (a) of FIG. 22. Part (c) of FIG. 22 is a schematic view showing an outer configuration 25*c*1 when a cross section 25*c* of the communication opening 25 on the feeding path portion 24 side is projected in a direction in which the air when the pump portion 21 is compressed flows, and showing an outer configuration G31 when the boundary G3 is projected in the direction.

Part (d) of FIG. 22 is a schematic view showing the outer configuration 25*c*1 and an outer configuration G21 when the boundary G2 is projected in the direction in which the air when the pump portion 21 is compressed flows. The arrow D2 direction is the direction in which the air when the pump portion 21 is compressed flows. A superposed view of these outer configurations consisting of the outer configuration 24*c*1, the outer configuration G31, and the outer configuration G21 is shown in part (e) of FIG. 22.

The third feeding path region 24*c* is a portion where the toner in the toner accommodating portion 22 is received in the feeding path portion 24 through the communication opening 25. The third feeding path region 24*c* is disposed below the toner accommodating portion 22 and at a lowermost portion in the feeding path portion 24 in the vertical direction. The volume of the third feeding path region 24*c* may be a volume in conformity to an amount of the toner intended to be fed, but in the neighborhoods of the boundary G2 and the boundary G3 shown in part (b) of FIG. 21, it is desirable that an abrupt change in cross section such as a stepped portion is small.

In this embodiment shown in FIG. 22, an example of the case where a cross-sectional area G2*a* of the boundary G2 between the first feeding path region 24*a* and the third feeding path region 24*c* and a cross-sectional area G3*a* of the boundary G3 between the second feeding path region 24*b* and the third feeding path region 24*c* are equal to each other is shown. As shown in part (e) of FIG. 22, an area of the outer configuration 25*c*1 when the cross section 25*c* of the communication opening 52 on the feeding path portion 24 side is projected in the arrow D2 direction becomes substantially 0.

On the other hand, an area of the outer configuration G21 when the boundary G2 is projected in the arrow D2 direction and an area of the outer configuration G 31 when the boundary G3 is projected in the arrow D2 direction are substantially equal to each other. For this reason, an area K2 of a region indicated by a hatched line of part (e) of FIG. 22 in which the outer configuration G21 overlaps with the outer configuration G31 is larger than an area K1 (=0) of a region in which the outer configuration G21 overlaps with the outer configuration 25*c*1 (K1<K2).

That is, in the direction in which the air when the pump portion 21 is compressed flows, the outer configuration G21 and the outer configuration 25*c*1 shown in part (e) of FIG. 22 are compared with each other. Here, the outer configuration G21 is an outer configuration such that the cross section of the boundary G2 which is a position, on the pump portion 21 side, of the feeding path portion 24 at a portion with which toner accommodating portion 22 communicates is projected in the arrow D2 direction. Further, the outer configuration 25*c*1 is an outer configuration such that the cross section 25*c* of a portion, on the toner accommodating portion 22 side of the feeding path portion 24 at a portion with which the toner accommodating portion 22 communicates is projected in the arrow D2 direction. At this time, as regards the outer configuration G21, the area K2 in which the opening G21 overlaps with the outer configuration G31 when the cross section of the boundary G3 as the portion, on the discharge opening 23 side, of the feeding path portion 24 at the portion with which the toner accommodating portion 22 communicates is larger than the outer configuration 25*c*1.

By this, the air flowing from the first feeding path region 24*a* when the pump portion 21 is compressed substantially does not flow toward the communication opening 25, but is easy to flow toward the second feeding path region 24*b* unilaterally. By this, stabilization of the feeding amount of the toner fed in the feeding path portion 24 can be realized.

According to this embodiment, the pump portion 21 and the discharge opening 23 are caused to communicate with each other by the feeding path portion 24. Further, then, the volume of the feeding path portion 24 is set so as to be smaller than the volume change amount of the pump portion 21. By this, even when a long feeding path portion 24 or a bent feeding path portion 24 is employed, a degree of freedom of a distance and a direction to a supply destination of the toner is improved.

<Toner Accommodating Portion>

Figure 23:
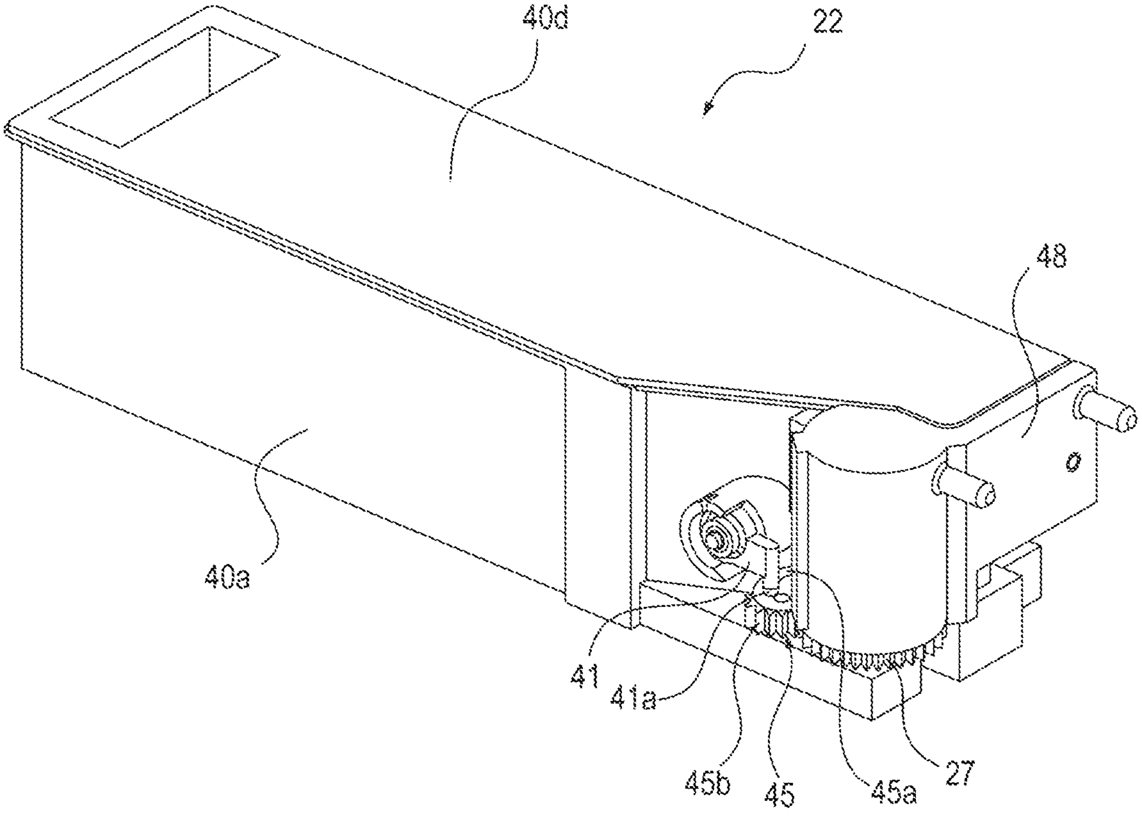
FIG. 23 is a perspective view showing a constitution of a toner accommodating portion of the fifth embodiment.
Figure 24:
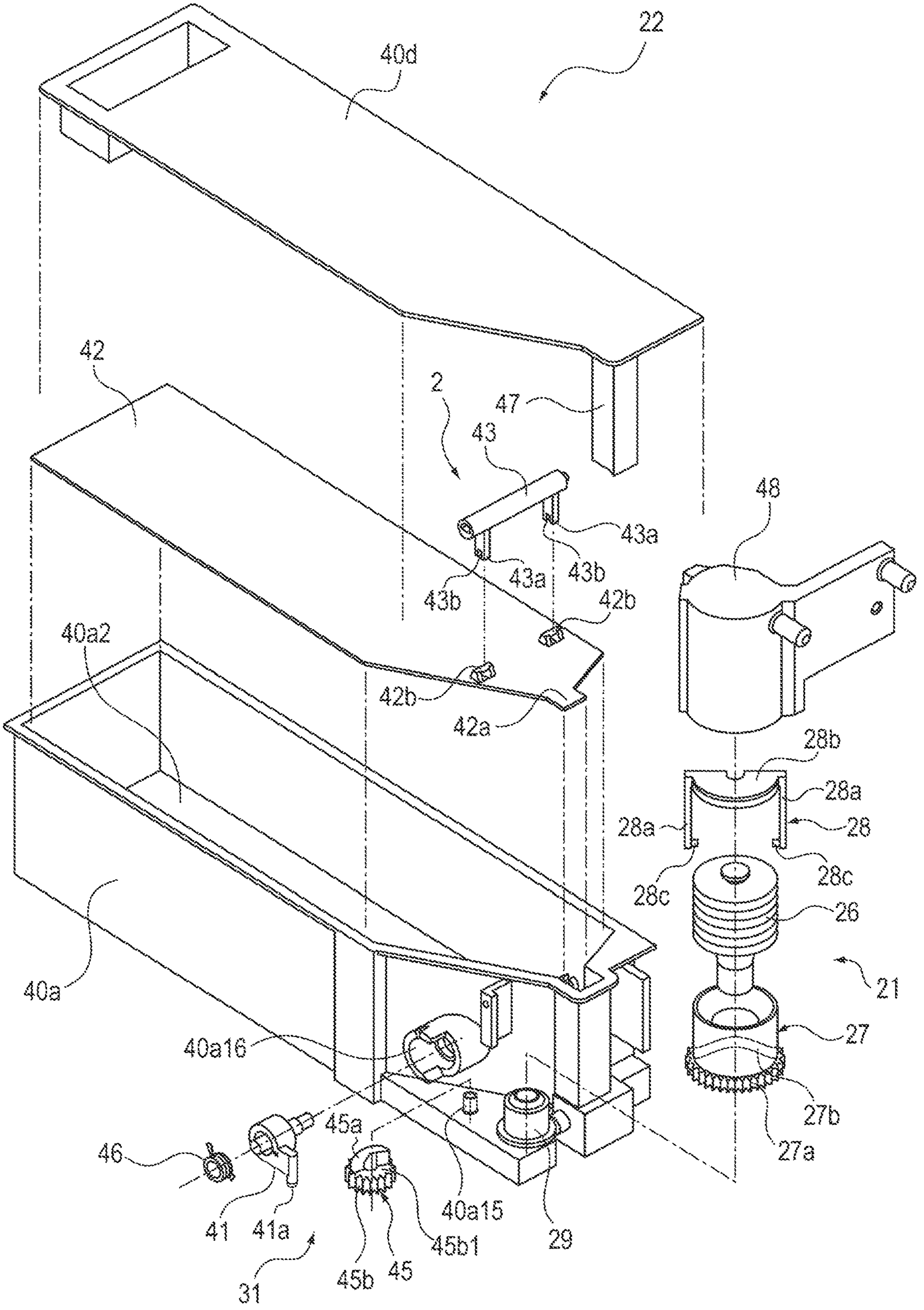
FIG. 24 is an exploded perspective view showing the constitution of the toner accommodating portion of the fifth embodiment.

Next, using FIG. 23 and FIG. 24, a constitution of the toner accommodating portion 22 will be described. FIG. 23 is a perspective view showing the constitution of the toner accommodating portion 22 of this embodiment. FIG. 24 is an exploded perspective view showing the constitution of the toner accommodating portion 22 of this embodiment. As shown in FIG. 23, an outer portion of the toner accommodating portion 22 is formed by a frame 40*a*, a cap portion 40*d*, and a pump cover 48.

As shown in FIG. 24, the toner accommodating portion 22 is constituted by including the plate-like member 42, a feeding shaft 43, a swingable member 41, an urging member 46, a rotatable member 45, the pump portion 21, and the pump cover 48. The pump portion 21 is constituted by including the bellow-shaped member 26, the pump driving gear 27, and the reciprocating member 28.

<Feeding Portion>

Figure 25:
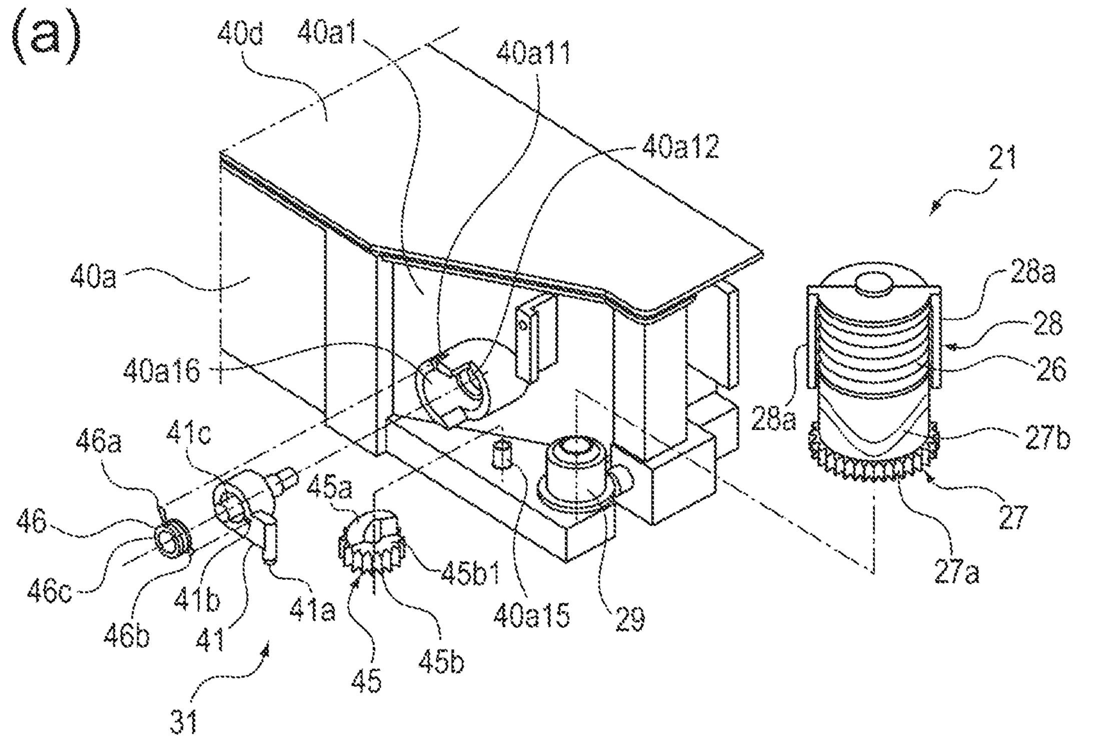
In FIG. 25, part (a) is an exploded perspective view showing a constitution of a driving portion for driving a plate-like member of the fifth embodiment. Part (b) of FIG. 25 is a perspective view showing a constitution of a feeding portion for driving the plate-like member of the fifth embodiment.
Figure 25:
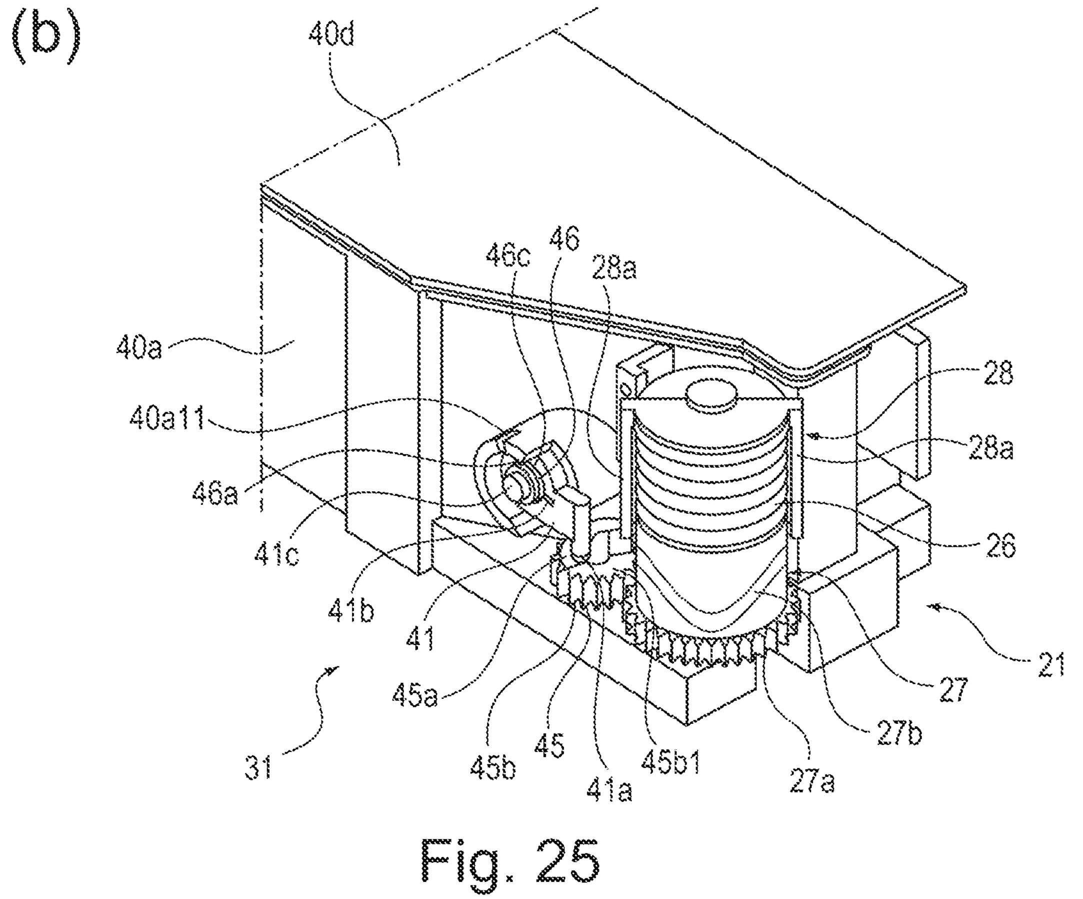
Figure 26:
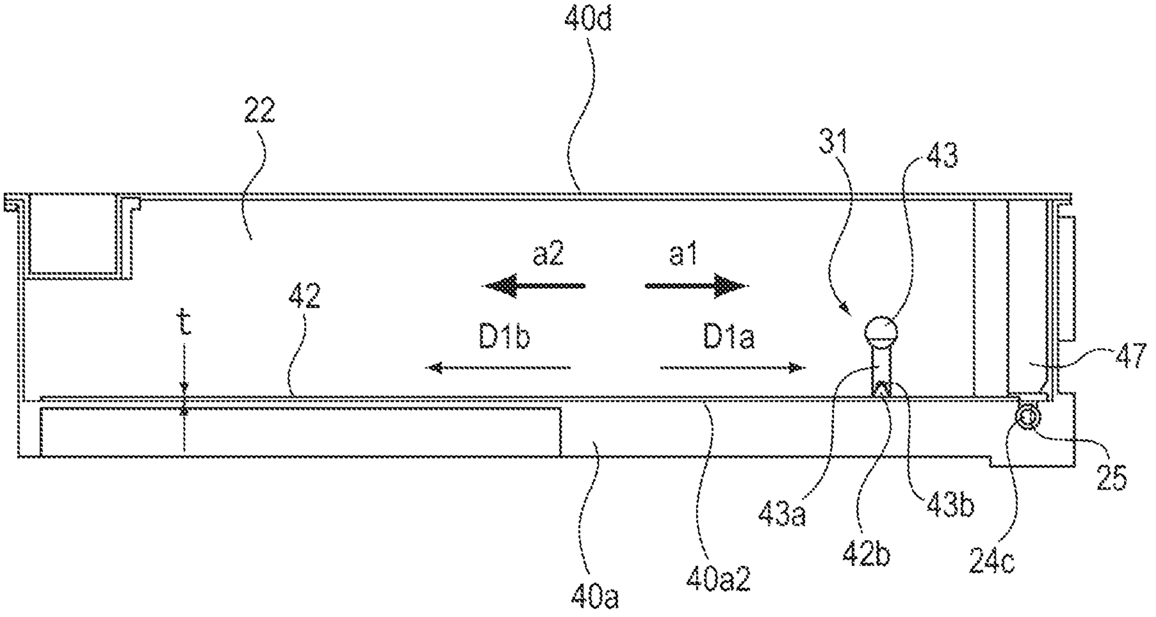
FIG. 26 is a sectional view showing a constitution of the toner accommodating portion of the fifth embodiment.

Next, using FIG. 24 to FIG. 26, a constitution of the feeding portion 31 will be described. Part (a) of FIG. 25 is an exploded perspective view showing a constitution of a driving portion for driving the plate-like member 42 of this embodiment. Part (b) of FIG. 25 is a perspective view showing the driving portion for driving the plate-like member 42 of this embodiment. FIG. 26 is a sectional view showing a constitution of the toner accommodating portion 22 of this embodiment. As shown in FIG. 24, the feeding portion 31 is constituted by including the plate-like member 42, the feeding shaft 43, the swingable member 41, the urging member 46, the rotatable member 45, and the pump driving gear 27.

<Rotatable Member>

The rotatable member 45 is provided with a gear portion 45*b* rotated by receiving a driving force from the pump driving gear 27 in engagement with the pump driving gear 27. On a side surface 45*b*1 of the gear portion 45*b*, an inclined surface 45*a* where a height of the gear portion 45*b* is continuously displaced in the rotational axis direction is provided.

<Swingable Member>

The swingable member 41 is provided with a projected portion 41*a* contactable to and swingable with the inclined surface 45*a* of the rotatable member 45. The swingable member 41 is urged by the urging member consisting of a torsion coil spring in a direction in which the projected portion 41*a* is press-contacted to the inclined surface 45*a*. As shown in FIG. 26, in the frame 40*a* of the toner accommodating portion 22, the feeding shaft 43 to which the plate-like member 42 is connected is disposed. As shown in part (a) of FIG. 25, the frame 40*a* is provided with a supporting portion 40*a* 15 rotatable supporting the rotatable member 45, a supporting portion 40*a*16 swingably (rotatably) supporting the swingable member 41, and a communication opening which is a hole for permitting engagement between the swingable member 41 and the feeding shaft 43.

The swingable member 41 is constituted so that a part of the swingable member 41 engages with the feeding shaft 43, provided in the toner accommodating portion 22, through the communication opening 40*a*12. Further, as shown in part (b) of FIG. 25, a constitution in which the gear portion 27*a* of the pump driving gear 27 and the gear portion 45*b* of the rotatable member 45 engage with each other and in which the rotatable member 45 is rotated by rotation of the pump driving gear 27 is employed. Further, the swingable member 41 is provided with the projected portion 41*a* contacting the inclined surface 45*a* of the rotatable member 45 described later.

The urging member 46 is constituted by the torsion coil spring, and two arm portions consisting of a fixed arm 46*a* and a movable arm 46*b* are provided at terminal portions, respectively, of a cylindrical portion 46*c*. Further, as shown in parts (a) and (b) of FIG. 25, the fixed arm 46*a* is fixed to a fixing portion 40*a*11 provided on a wall 40*a*1 of the toner accommodating portion 22, the cylindrical portion 46*c* is supported by a supporting portion 41*c* provided on the swingable member 41, and the movable arm 46*b* is engaged by an engaging to portion 41*b*.

By this, a direction in which an urging force of the urging member 46 is generated is set at a substantially rotational direction of the swingable member 41 and the feeding shaft 43. Further, as shown in FIG. 26, the plate-like member 42 is disposed so as to extend along a bottom 40*a*2 of the frame 40*a* of the toner accommodating portion 22 disposed on a lower side with respect to the direction of gravitation.

<Plate-Like Member>

Next, using FIG. 24, FIG. 26 and FIG. 28, a constitution of the plate-like member 42 will be described. As shown in FIG. 24, on the bottom 40*a*2 of the toner accommodating portion 22, the plate-like member 42 for feeding the toner is provided so as to be movable. The plate-like member 42 reciprocates between a first position shown in part (a) of FIG. 28 and a second position shown in part (b) of FIG. 28. At a leading end portion of the plate-like member 42 on the communication opening 25 side, a shutter portion 42*a* as a movable member is provided. The plate-like member 42 is constituted by a member of 1 mm in thickness t as shown in FIG. 26, and swingably connects the feeding shaft 43 connected to the swingable member 41 and a part of the plate-like member 42.

Further, an arrangement such that the plate-like member 42 passes through between the feeding shaft 43 and the bottom 40*a*2 of the toner accommodating portion 22 so that a lower surface of the plate-like member 42 extends along the bottom 40*a*2 of the toner accommodating portion 22 is employed. Incidentally, as a material of the plate-like member 42 of this embodiment, polystyrene (PS) was used.

<Rotatable Member and Swingable Member>

Figure 27:
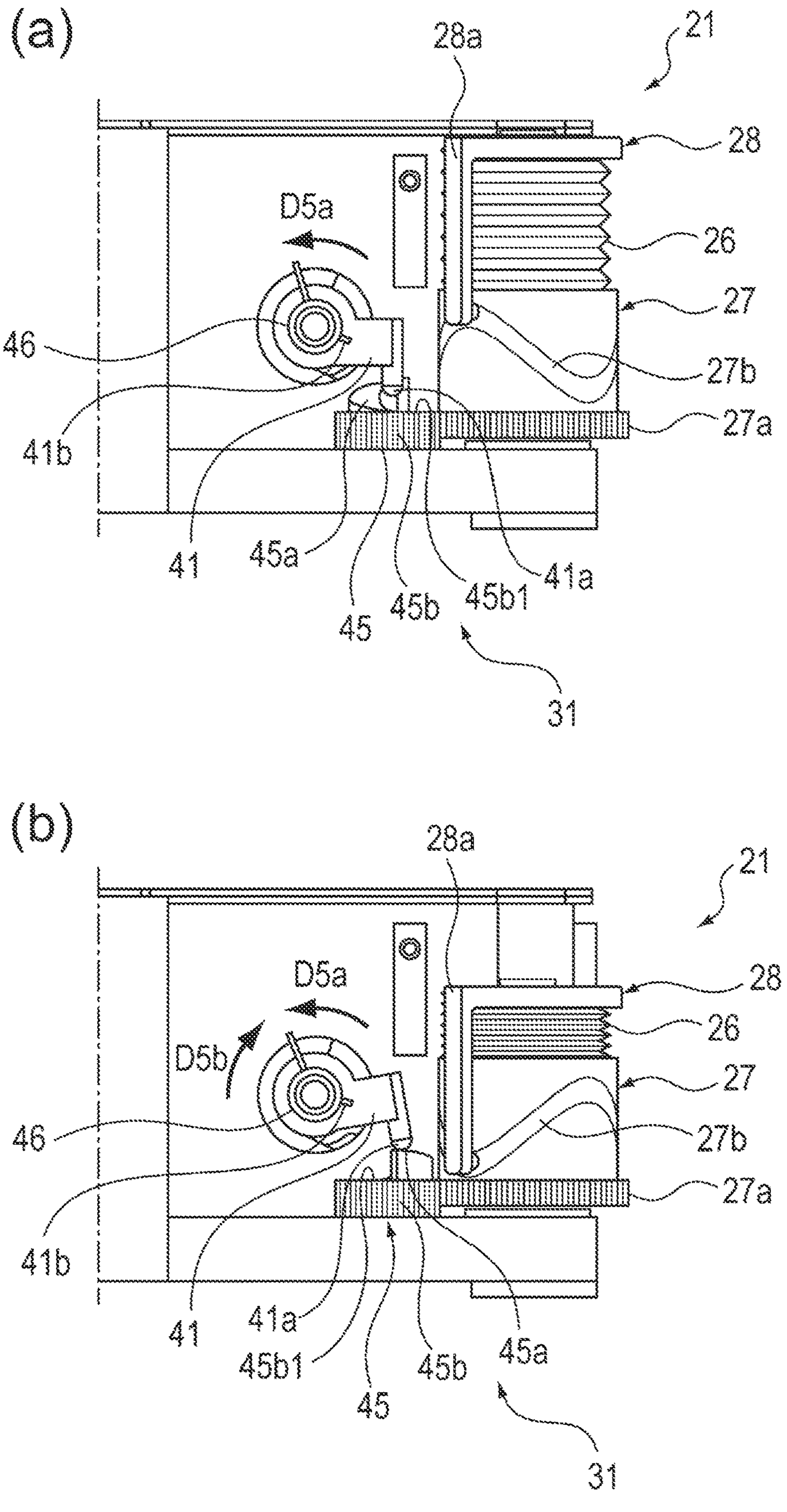
In FIG. 27, parts (a) and (b) are views for illustrating an operation of the feeding portion for driving the plate-like member of the fifth embodiment.

Next, using FIG. 25 and FIG. 27, constitutions of the rotatable member 45 and the swingable member 41 will be described. Parts (a) and (b) of FIG. 27 are schematic views for illustrating an operation of the feeding portion 31 for driving the plate-like member 42 of this embodiment. As shown in part (a) of FIG. 25, the rotatable member 45 includes the gear portion 45*b* for receiving the driving force via the gear portion 27*a* of the pump driving gear 27. Further, the rotatable member 45 includes the inclined surface 45*a* which is provided on the side surface 45*b*1 of the gear portion 45*b* and on which a height of the gear portion 45*b* with respect to the rotational axis direction is continuously displaced. The rotatable member 45 is constituted by a stepped gear. As shown in part (b) of FIG. 27, the swingable member 41 is provided with the projected portion 41*a* at a position where the swingable member 41 contacts the inclined surface 45*a* when the rotatable member 45 is rotated.

<Operation of Pump Portion and Phase of Swingable Member>

Next, using FIG. 27, an operation of the pump portion 21 and a phase of the swingable member 41 will be described. A constitution in which when the pump driving gear 27 rotates 180°, the reciprocating member 28 and the bellow-shaped member 26 reciprocates once and the rotatable member 45 is rotated once is employed. When the pump driving gear 27 is rotated 90° from a state shown in part (a) of FIG. 27 to a state shown in part (b) of FIG. 27, the bellow-shaped member 26 performs a contraction operation a contracting direction, so that the swingable member 41 is rotated in an arrow D5*a* direction shown in part (a) of FIG. 27. Specifically, when the feeding portion 31 changes in state from the state shown in part (a) of FIG. 27 to the state shown in part (b) of FIG. 27, the projected portion 41*a* provided on the swingable member 41 contacts the inclined surface 45*a* of the rotatable member 45, so that the swingable member 41 is rotated in the arrow D5*a* direction.

Then, when the pump driving gear 27 is further rotated 90°, the state of the pump driving gear 27 is changed from the state shown in part (b) of FIG. 27 to the state shown in part (a) of FIG. 27. At this time, a constitution in which the bellow-shaped member 26 performs an expansion operation an expanding direction and the swingable member 41 is rotated in an arrow D5*b* direction of part (b) of FIG. 27 by the urging force of the urging member 46 is employed. Specifically, when the feeding portion 31 changes in state from the state shown in part (b) of FIG. 27 to the state shown in part (a) of FIG. 27, the projected portion 41*a* of the swingable member 41 is separated from the inclined surface of the rotatable member 45, so that the swingable member 41 is rotated in the arrow D5*b* direction by the urging force of the urging member 46.

<Operation of Plate-Like Member>

Next, using FIG. 28, operation of the plate-like member 42 during drive input will be described. Parts (a) and (b) of FIG. 28 are sectional views for illustrating movement of the plate-like member 42 of this embodiment. When the plate-like member 42 changes in state from the state shown in part (a) of FIG. 28 to the state shown in part (b) of FIG. 28, with rotation in the arrow D5*a* direction of the feeding shaft 43 engaging with the swingable member 41, the plate-like member 42 connected to the feeding shaft 43 is moved in the arrow D1*a* direction as a toner feeding direction. Further, when the plate-like member 42 is moved in the arrow D1*a* direction, the shutter portion 42*a* provided at the leading end portion of the plate-like member 42 operates so that the communication opening 25 provided in the bottom 40*a* and the toner accommodating portion 22 are made in non-communication with each other.

Figure 28:
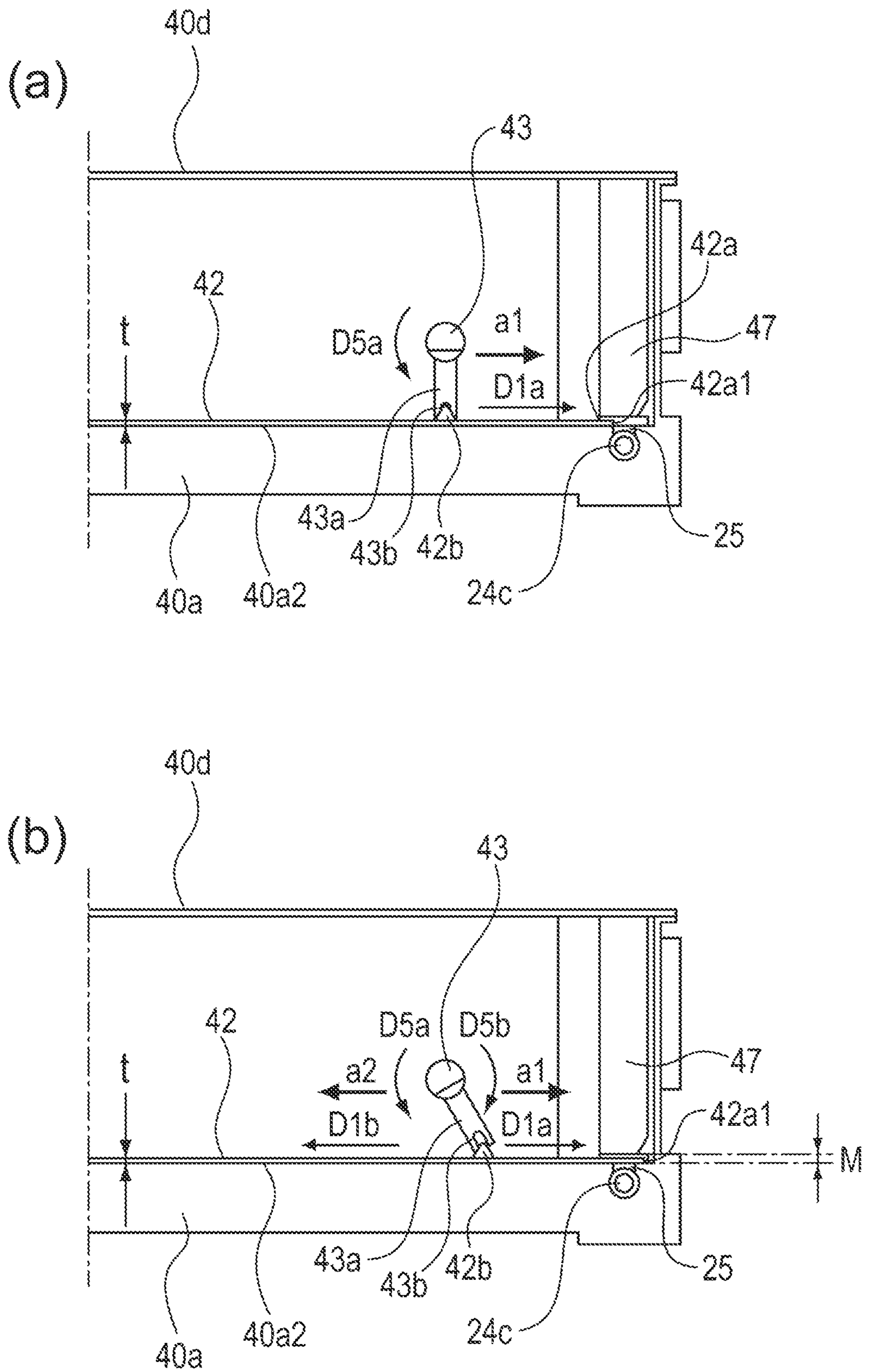
In FIG. 28, parts (a) and (b) are sectional views for illustrating movement of the plate-like member of the fifth embodiment.

Further, the plate-like member 42 is urged by the urging force of the urging member 46, whereby the feeding shaft 43 engaging with the swingable member 41 is rotated in the arrow D5*a* direction as shown in part (b) of FIG. 28, so that the plate-like member 42 is moved in the arrow D1*b* direction and the state thereof returns to the state shown in part (a) of FIG. 28. When the plate-like member 42 is moved in the arrow D1*b* direction, the shutter portion 42*a* provided on the plate-like member 42 operates so that the communication opening 25 and the toner accommodating portion 22 communicate with each other.

That is, the shutter portion 42*a* is movable to the first position shown in part (b) of FIG. 28 in which at least a part of the communication opening 25 is shielded depending on a cycle of a volume change of the pump portion 21. Further, the shutter portion 42*a* is movable to the second position shown in part (a) of FIG. 28 in which a shielding area of the communication opening 25 becomes smaller than the shielding area in the first position.

Further, when the pump portion 21 is driven so that a volume thereof becomes small, the pump portion 21 is driven so that the shutter portion 42*a* is moved from the second position shown in part (a) of FIG. 28 to the first position shown in part (b) of FIG. 28. Further, when the pump portion 21 is driven so that the volume thereof becomes large, the pump portion 21 is driven so that the shutter portion 42*a* is moved from the first position shown in part (b) of FIG. 28 to the second position shown in part (a) of FIG. 28.

<Restricting Portion>

Next, using FIG. 24 and FIG. 28, a constitution of a restricting portion 47 will be described. As shown in FIG. 24, the cap portion 40*d* of the toner accommodating portion 22 is provided with the restricting portion 47 dropping toward the communication opening 25. The restricting portion 47 restricts movement of the plate-like member 42 in a thickness direction of the plate-like member 42.

As shown in parts (a) and (b) of FIG. 28, when the plate-like member 42 is moved in the arrow D1*a* direction, the restricting portion 47 is provided at a position opposing the communication opening 25 while sandwiching the plate-like member 42 therebetween. The restricting portion 47 restricts floating of the shutter portion 42*a* due to atmospheric pressure generated by the contraction operation of the pump portion 21.

In this embodiment, as shown in part (b) of FIG. 28, a minimum gap M between the restricting portion 47 and the bottom 40*a*2 of the toner accommodating portion 22 is constituted by 1.2 mm, so that the plate-like member 42 of 1 mm in thickness t is constituted so as to be capable of smoothly performing reciprocating motion between the restricting portion 47 and the bottom 40*a*2. Further, in this embodiment, the restricting portion 47 is provided integrally with the cap portion 40*d* of the toner accommodating portion 22, but the constitution thereof is not limited to this constitution, and the restricting portion 47 may also be provided at a part of the frame 40*a*. By the axis direction constitution, the plate-like member 42 is disposed so as to be capable of being reciprocated along the arrow D1*a* and D1*b* directions in the toner accommodating portion 22.

<Operation of Feeding Portion>

Figure 29:
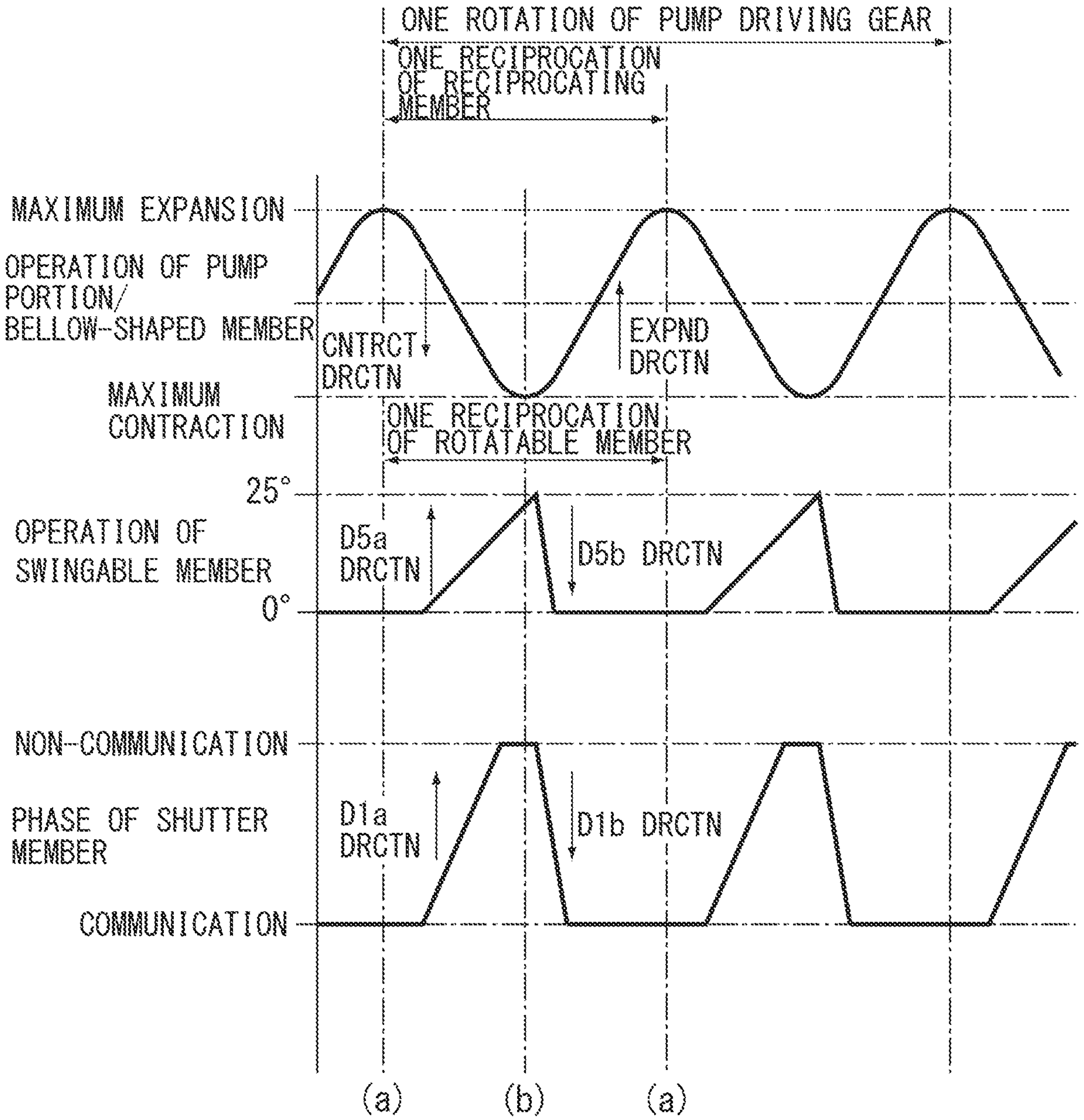
FIG. 29 is a diagram for illustrating an operation of the pump portion, an operation of a swingable member, and a phase of a shutter portion of the plate-like member in the fifth embodiment.

Next, using FIG. 27 to FIG. 29, an operation of the feeding portion 31 will be described. FIG. 29 is a view for illustrating an operation of the pump portion 21, an operation of the swingable member 41, and a phase of the shutter portion 42*a* provided on the plate-like member 42 in this embodiment. First, an initial state of the feeding portion 31 is states shown in part (a) of FIG. 27 and part (a) of FIG. 28. At this time, the state is a state in which the bellow-shaped member 26 is most expanded and is a state in which the shutter portion 42*a* provided on the plate-like member 42 establishes communication between the communication opening 25, provided in the bottom 40*a*2 of the toner accommodating portion 22, and the toner accommodating portion 22.

When the pump driving gear 27 is rotated 90° by the driving force from the driving source such as unshown motor provided in the apparatus main assembly C1 of the image forming apparatus C, the feeding portion 31 changes in state from a sectional view shown in part (a) of FIG. 27 to a state shown in part (b) of FIG. 28. At this time, the bellow-shaped member 26 is caused to perform the contraction operation by the operation of the reciprocating member 28 engaged with the cam portion 27*b* of the pump driving gear 27.

The cam portion 27*b* is constituted by a groove portion which is disposed continuously in the rotational axis direction of the pump driving gear 27. Further, the projected portion 28*c* provided on the arm portion 28*a* of the reciprocating member 28 slides along the cam portion 27*c*, so that the bellow-shaped member 26 fixed at one end portion thereof to the fixing portion 28*b* of the reciprocating member 28 performs the contraction operation.

Further, the rotatable member 45 is rotated with rotation of the pump driving gear 27, so that the swingable member 41 is rotated in the arrow D5*a* direction of part (b) of FIG. 27. By the rotation of the swingable member 41, the feeding shaft 43 engaged with the swingable member 41 is rotated, so that the position of the plate-like member 42 is changed from the state shown in part (a) of FIG. 28 to the state shown in part (b) of FIG. 28.

That is, by rotation of the gear portion 45*b* engaging with the recording material driving gear 27, the projected portion 41*a* of the swingable member 41 contacts and slides with the inclined surface 45*a* of the rotatable member 45, so that the swingable member 41 is rotated in the arrow D5*a* direction as a first rotational direction. Then, the shutter portion 42*a* is moved in the arrow D1*a* direction as a first direction.

<Converting Portion>

As shown in FIG. 24, as a part of the feeding portion 31, a converting portion 2 for converting swing of the swingable member 41 into movement of the shutter portion 42*a* is provided. The converting portion 2*d* is constituted by a triangular-shaped projected portion 42*b* provided at an upper surface of the plate-like member 42 and a recessed portion 43*b* provided at a free end portion of an arm portion 43*a* provided so as to project from an outer peripheral surface of the feeding shaft 43 in a radial direction. The projected portion 42*b* of the plate-like member 42 is engaged in the recessed portion 43*b* of the arm portion 43*a* of the feeding shaft 43. Further, as shown in parts (a) and (b) of FIG. 28, with rotation of the feeding shaft 43, the plate-like member 42 is moved in the arrow D1*a* and D1*b* directions while maintaining a state in which the recessed portion 43*b* of the arm portion 43*a* of the feeding shaft 43 and the projected portion 42*b* of the plate-like member 42 engaged with each other.

Further, when the pump driving gear 27 is further rotated 90° by the driving force from the driving source such as the unshown motor provided in the apparatus main assembly C1, the feeding portion 31 returns from the state shown in part (b) of FIG. 27 to the state shown in part (a) of FIG. 27. At this time, the bellow-shaped member 26 is caused to perform the expansion operation by the operation of the reciprocating member 28 engaged with the cam portion 27*b* of the pump driving gear 27.

Further, the rotatable member 45 is rotated with the rotation of the pump driving gear 27, so that the swingable member 41 is rotated in the arrow D5*b* direction of part (b) of FIG. 27. By the rotation of the swingable member 41, the feeding shaft 43 engaged with the swingable member 41 is rotated, so that the position of the plate-like member 42 returns from the position shown in part (b) of FIG. 28 to the position of part (a) of FIG. 28.

That is, the projected portion 41*a* of the swingable member 41 passes through a highest position of the inclined surface 45*a* of the rotatable member 45. Then, by the urging force of the urging member 46, the projected portion 41*a* of the swingable member 41 is landed on a side surface 45*b*1 of the gear portion 45*b*. At this time, the swingable member 41 is rotated in the arrow D5*b* direction as a second rotational direction. Then, the shutter portion 42*a* is moved in the arrow D1*b* direction as a second direction. Here, the arrow D5*b* direction is an opposite direction to the arrow D5*a* direction, and the arrow D1*b* direction is an opposite direction to the arrow D1*a* direction.

FIG. 29 shows a relationship between the expansion/contraction operation of the pump portion 21, the rotation operation of the swingable member 41, and the phase of the shutter portion 42*a* with the movement of the plate-like member 42. Further, FIG. 29 shows the reciprocating operation of the reciprocating member 28 and the rotation operation of the rotatable member 45 during one rotation of the pump driving gear 27. Further, FIG. 29 shows the expansion/contraction operation of the pump portion 21 and the rotation operation of the swingable member 41 such that state thereof change from the states shown in part (a) of FIG. 27 and part (a) of FIG. 28 to the states shown in part (b) of FIG. 27 and part (b) of FIG. 28, and further return to the states shown in part (a) of FIG. 27 and part (b) of FIG. 28.

<Toner Feeding by Plate-Like Member>

Next, using FIG. 28, a toner feeding action by the reciprocating operation of the plate-like member 42 will be described. By the driving force from the driving source such as the unshown motor provided in the apparatus main assembly C1 of the image forming apparatus C, the pump driving gear 27 shown in part (a) of FIG. 27 is rotated, and the swingable member 41 is rotated via the rotatable member 45 in the arrow D5*a* direction shown in part (a) of FIG. 28. By this, the plate-like member 42 is moved from the position of part (a) of FIG. 28 in the arrow D1*a* direction, and reaches the position shown in part (b) of FIG. 28. At this time, acceleration is imparted to the plate-like member 42 in a direction along the arrow D1*a* direction. A maximum (value) of the acceleration at this time is defined as a1. At this time, at least a part of the toner on the plate-like member 42 moves in synchronism with the plate-like member 42 without sliding on the plate-like member 42.

Thereafter, the plate-like member 42 moves from the position shown in part (b) of FIG. 28 in the arrow D1*b* direction, and returns to the position shown in part (a) of FIG. 28. That is, acceleration is imparted to the plate-like member 42 in the arrow D1*b* direction by the urging force of the urging member 46. A maximum of the acceleration at this time is defined as a2. At this time, the toner on the plate-like member 42 slides on the plate-like member 42.

The maximum acceleration a2 when the plate-like member 42 is moved from the second position shown in part (a) of FIG. 28 to the first position shown in part (b) of FIG. 28 is larger than the maximum acceleration a1 when the plate-like member 42 is moved from the first position to the second position. Here, coefficient of static friction between the plate-like member 42 and the toner is μm0, and the product of the coefficient of static friction μ0 and gravitational acceleration g is μ0×g. Then, a sliding condition that the toner on the plate-like member 42 slides on the plate-like member 42 is the time when the plate-like member 42 is moved at acceleration of μ0×g or more in a state in which the toner is placed on the plate-like member 42 on the horizontal surface.

In this embodiment, the acceleration was set so that a1<μ0×g<a2 holds. For this reason, when the plate-like member 42 is moved in the arrow D1*a* direction, by the maximum acceleration a1 smaller than μ0×g, the toner is not moved in the arrow D1*a* direction on the plate-like member 42 disposed on the horizontal surface relative to the plate-like member 42. Further, when the plate-like member 42 is moved in the arrow D1*b* direction, by the maximum acceleration a1 larger than 0×g, the toner is moved in the air D1*b* direction on the plate-like member 42 relative to the plate-like member 42.

Thus, the plate-like member 42 repeats the reciprocating motion between the arrow D1*a* direction and the arrow D1*b* direction, so that the toner on the plate-like member 42 is conveyed in the arrow D1*a* direction. Incidentally, the axis direction coefficient of static friction μ0 between the plate-like member 42 and the toner is calculated from μ0−tan θ by taking, as θ, an angle formed between the horizontal surface and the plate-like member 42 when the toner slides down when the toner is placed on the plate-like member 42 and the plate-like member 42 is inclined.

<Action by Shutter Portion>

Figure 30:
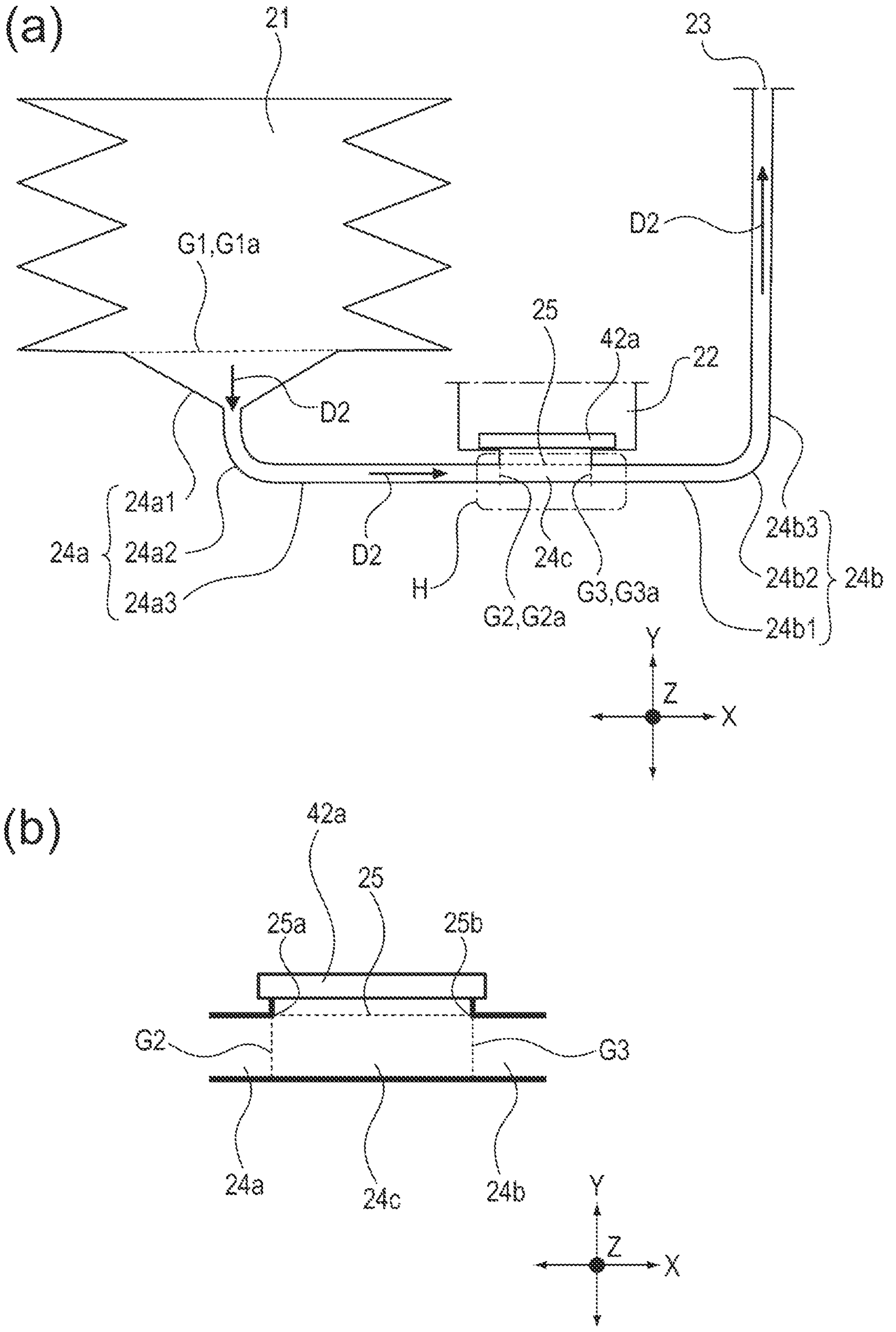
In FIG. 30, part (a) is a sectional view showing a constitution of the pump portion, the feeding path portion, and the shutter portion of the plate-like member in the fifth embodiment. Part (b) is an enlarged view of an H portion of part (a).

Next, using FIG. 27 to FIG. 30, actin of the shutter portion by the shutter portion 42*a* provided on the plate-like member 42 will be described. Part (a) of FIG. 30 is a sectional view showing constitutions of the pump portion 21 and the shutter portion 42*a* provided on the plate-like member 42. Part (b) of FIG. 30 is an enlarged view of an H portion of part (a) of FIG. 30. As described above, each of the rotatable member 45 and the swingable member 41 is rotated in interrelation with the expansion/contraction operation of the pump portion 21, so that the plate-like member 42 performs the reciprocating motion in the arrow D1*a* and D1*b* directions in the toner accommodating portion 22 via the feeding shaft 43 connected to the swingable member 41.

As shown in part (b) of FIG. 27, part (b) of FIG. 28, and FIG. 29, when the bellow-shaped member 26 performs the contraction operation, the plate-like member 42 is moved in the arrow D1*a* direction. Then, the shutter portion 42*a* provided on the plate-like member 42 operates so that the communication opening 25 and the toner accommodating portion 22 are in non-communication with each other.

At this time, with the contraction operation of the bellow-shaped member 26, air passes through the first feeding path region 24*a* shown in FIG. and is sent to the third feeding path region 24*c* as a toner supplying path. The air sent to the third feeding path region 24*c* flows toward the communication opening 25 communicating with the third feeding path region 24*c*, and passes through the second feeding path region 24*b* from the third feeding path region 24*c* and is emitted toward the discharge opening 23. At this time, at least a part of the communication opening 25 is closed by the shutter portion 42*a* provided on the plate-like member 42, and therefore, back-flow of the air and the toner into the toner accommodating portion 22 is suppressed.

Next, as shown in part (a) of FIG. 27, part (a) of FIG. 28, and FIG. 29, when the bellow-shaped member 26 performs the expansion operation, the plate-like member 42 moves in the arrow D1*a* direction, so that the toner passes through the communication opening 25 from the toner accommodating portion 22 and is supplied to the third feeding path region 24*c*. At this time, by a feeding principle of the plate-like member 42, the toner on the plate-like member 42 slides on the plate-like member 42, so that the toner above the communication opening 25 is caused to pass through the communication opening 25 and is supplied to the third feeding path region 24*c* by self-weight falling. Further, by the expansion operation of the bellow-shaped member 26, the inside of the third feeding path region 24*c* shown in part (a) of FIG. 30 becomes negative pressure, so that action such that the toner in the toner accommodating portion 22 is sucked into the third feeding path region 24*c* through the communication opening 25 is also generated.

<Effect of Shutter Portion>

By the axis direction action of the shutter portion 42*a*, the toner is stably supplied to the third feeding path region 42*c* through the communication opening 25, and the back-flow of the air and the toner into the toner accommodating portion 22 is suppressed. By this, an amount of the air which passes through the second feeding path region 24*b* shown in part (a) of FIG. 30 and which is discharged to the discharge opening 23 increases, so that a toner feeding performance can be improved.

<Action of Restricting Portion>

Next, using FIG. 27 to FIG. 30, action of the restricting portion 47 will be described. As shown in part (b) of FIG. 28, when the plate-like member 42 moves in the arrow D1*a* direction and the shutter portion 42*a* provided on the plate-like member 42 closes the communication opening 25, as shown in part (b) of FIG. 27, the bellow-shaped member 26 performs the contraction operation. With this, the air sent from the bellow-shaped member 26 passes through the first feeding path region 24*a* shown in part (a) of FIG. 30 and is sent to the third feeding path region 24*c*. At this time, as described above by showing in part (b) of FIG. 28, by the action of the shutter portion such that the shutter portion 42*a* provided on the plate-like member 42 closes the communication opening 25, it is possible to suppress the back-flow of the air and the toner into the toner accommodating portion 22.

Here, in the case where the toner amount in the toner accommodating portion 22 is large, air pressure of the air liable to flow from the third feeding path region 24*c* toward the inside of the toner accommodating portion 22 can be suppressed by the weight of the toner and the weight of the plate-like member 42. By this, the back-flow of the air and the toner into the toner accommodating portion 22 can be suppressed.

However, when the toner amount in the toner accommodating portion 22 becomes small, the weight of the toner and the weight of the plate-like member 42 cannot withstand the air pressure of the air liable to flow from the third feeding path region 24*c* toward the inside of the toner accommodating portion 22 in some cases. At this time, the shutter portion 42*a* provided on the plate-like member 42 is liable to float up from the bottom 40*a*2 of the toner accommodating portion 22 toward a direction of the restricting portion 47 shown in part (b) of FIG. 28.

At this time, the float-up of the shutter portion 42*a* provided on the plate-like member 42 from the bottom 40*a*2 is restricted by the restricting portion 47. By this, the shutter portion 42*a* does not completely open the communication opening 25, and therefore, it is possible to suppress the air pressure of the air liable to flow from the third feeding path region 24*c* toward the inside of the toner accommodating portion 22. By this, the back-flow of the air and the toner into the toner accommodating portion 22 can be suppressed.

<Effect of Restricting Portion>

By the axis direction action of the restricting portion 47, the float-up of the shutter portion 42*a* provided on the plate-like member 42 from the bottom 40*a*2 is suppressed, so that the air pressure of the air liable to flow from the third feeding path region 24*c* toward the inside of the toner accommodating portion 22 can be suppressed. By this, the back-flow of the air and the toner into the toner accommodating portion 22 can be suppressed, and therefore, the toner can be stably supplied from the communication opening 25 to the third feeding path region 24*c*. Further, the back-flow of the air and the toner into the toner accommodating portion 22 is further suppressed, so that the amount of the air which passes through the second feeding path region 24*b* and which is discharged to the discharge opening 23, and thus the toner feeding performance can be further improved.

Here, in this embodiment, the number of rotations of the pump driving gear 27 was 120 rpm, a reciprocating frequency of the bellow-shaped member 26 and the reciprocating member 28 was 4 Hz, and the number of rotations of the rotatable member was 240 rpm. Further, a swing frequency of the swingable member 41 by slide movement of the projected portion 41*a* of the swingable member 41 on the inclined surface 45*a* was 4 Hz, and an angle of rotation of the swingable member 41 was 25°. Further, a movement distance of a leading end portion 42*a*1 of the shutter portion 42*a* provided on the plate-like member 42 in the arrow D1*a* direction was about 7 mm.

Further, when the swingable member 41 is rotated 25° by the rotation of the rotatable member 45, an urging force received by the engaging portion 41*b* of the swingable member 41 from the urging member 46 in the arrow D5*a* direction was 9.8 N (1000 gf), and an initial toner weight of a toner accommodated in the toner accommodating portion 22 was 500 g. Incidentally, these various conditions are not limited thereto, and can be appropriately selected depending on a kind or a characteristic of the toner, shapes, material, and arrangement of the respective members, and the like.

Further, in this embodiment, as the material of the plate-like member 42, polystyrene (PS) is employed, but is not limited to this. To the material of the plate-like member 42, polyethylene telephthalate (PET), polyimide (PI), and polyphenylene sulfide (PPS) can be applied. Further, to the material of the plate-like member 42, polyethylene (PE), polypropylene (PP), ABS resin, polycarbonate (PC), and polyacetal (POM) can be applied. Even these general plastic materials can be applied as the material of the plate-like member 42.

First Modified Embodiment

Figure 31:
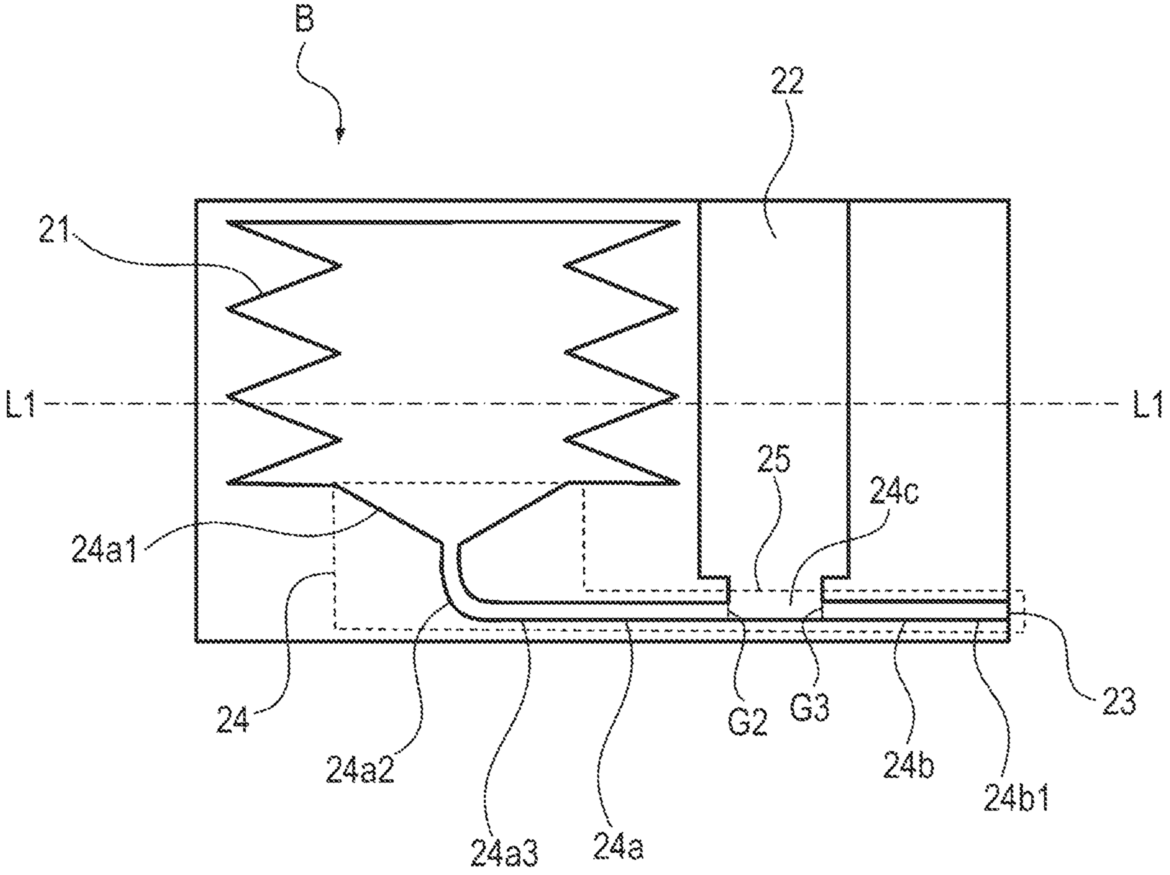
FIG. 31 is a sectional view showing a constitution of a pump portion and a feeding path portion of a first modified embodiment of the fifth embodiment.

Next, constitutions of a pump portion 21 and a feeding path portion 24 in a first modified embodiment of this embodiment will be described using FIG. 31. FIG. 31 is a sectional view showing the constitutions of the pump portion 21 and the feeding path portion 24 in the first modified embodiment of this embodiment. A second feeding path region 24*b* of the toner cartridge B shown in FIG. 31 is provided with a discharge opening 23 at an end portion of a tubular rectilinear portion 24*b*1 connected to a third feeding path region 24*c*. Thus, the second feeding path region 24*b* extending from the third feeding path region 24*c* to the discharge opening 23 may be disposed in the horizontal direction.

In this modified embodiment, as shown in FIG. 31, in the second feeding path region 24*b* which is a portion on the discharge opening 23 side than a boundary G3, the boundary G3 which is one end is disposed at the same height (level) as the discharge opening 23 which is the other end in the vertical direction. Here, the boundary G3 is one end on a side of the feeding path portion 24 where the toner accommodating portion 22 communicates with the feeding path portion 24. At this time, the discharge opening 23 is provided with an unshown shutter member on an outside of the toner cartridge B, the toner accommodated in the toner cartridge B is prevented from leaking out to the outside, by the shutter member.

Second Modified Embodiment

Figure 32:
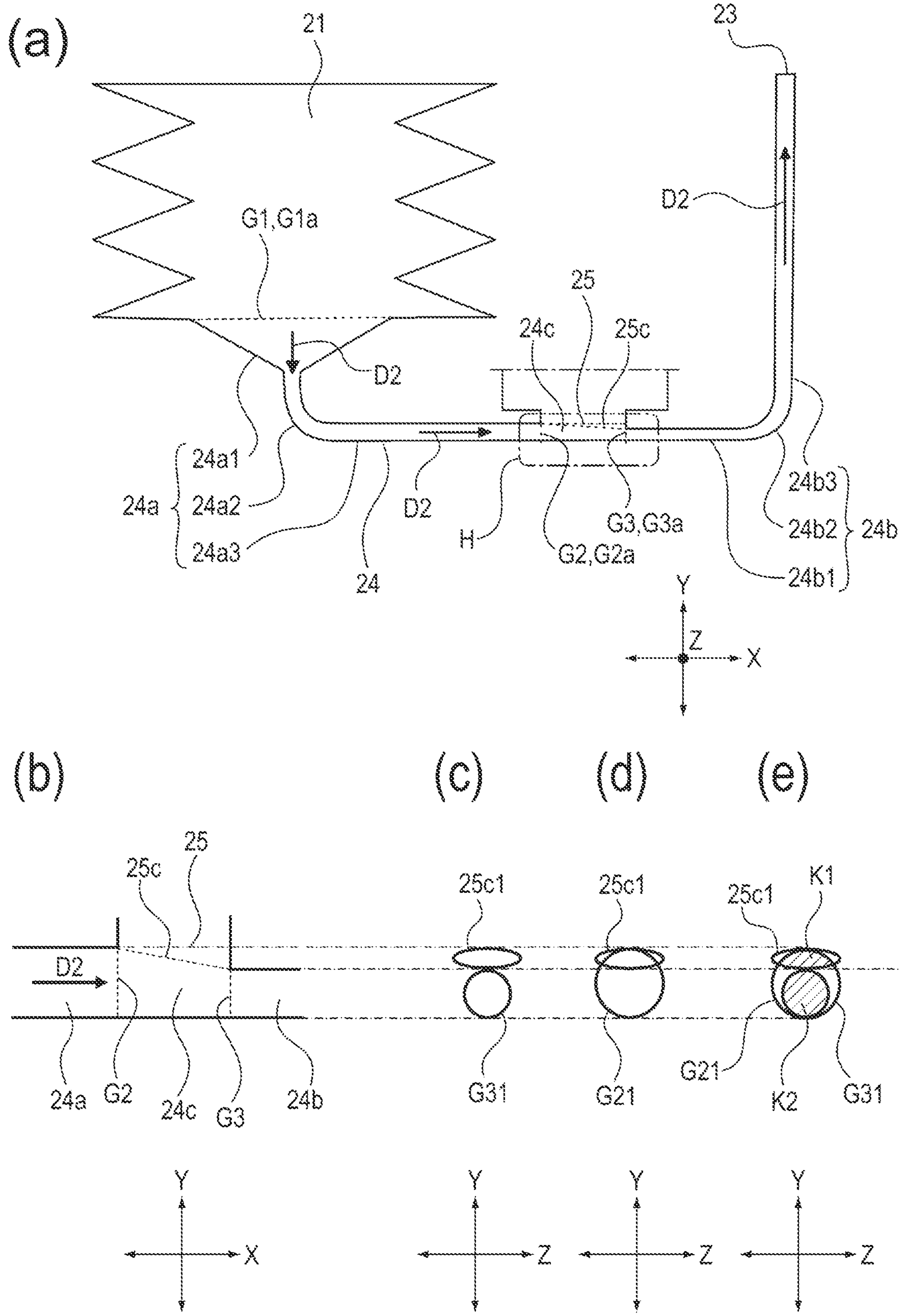
In FIG. 32, part (a) is a sectional view of a pump portion and a feeding path portion of a second modified embodiment of the fifth embodiment which are viewed from the Z axis direction. Part (b) is an enlarged view of an H portion of part (a). Parts (c) to (e) are views showing an outer configuration when a communication opening is projected in the air flowing direction when the pump portion is compressed, an outer configuration when a boundary G3 is projected, and an outer configuration when a boundary G2 is projected.

Next, constitutions of a pump portion 21 and a feeding path portion 24 in a second modified embodiment of this embodiment will be described using FIG. 32. Part (a) of FIG. 32 is a sectional view of the pump portion 21 and the feeding path portion 24 in the second modified embodiment of this embodiment as viewed in the Z axis direction. Part (b) of FIG. 32 is an enlarged view of an H portion of part (a) of FIG. 32.

Part (c) of FIG. 32 is a schematic view showing an outer configuration 25*c*1 when a cross section 25*c* of the communication opening 25 is projected in a direction in which the air when the pump portion 21 is compressed flows, and similarly showing an outer configuration G31 when the boundary G3 is projected in the direction. Part (d) of FIG. 32 is a schematic view showing the outer configuration 25*c*1 when the cross section 25*c* of the communication opening 25 is projected in the direction in which the air when the pump portion 21 is compressed flows, and similarly showing an outer configuration G21 when the boundary G2 is projected in the direction. Part (e) of FIG. 32 is a schematic view in which three outer configurations consisting of the outer configuration 25*c*1, the outer configuration G31, and the outer configuration G21 are caused to overlap with each other.

In the axis direction embodiment with reference to FIG. 22, an example in which a cross-sectional area G2*a* of a boundary G2 and a cross-sectional area G3*a* of the boundary G3 are equal to each other was described. In this modified embodiment, as shown in parts (a) and (b) of FIG. 32, an example in the case where the cross-sectional area G2*a* of the boundary G2 and the cross-sectional area G3*a* of the boundary G2 are different from each other is employed. As shown in part (e) of FIG. 32, an area K2 of a region indicated by a hatched line of part (e) of FIG. 32 in which the outer configuration G21 overlaps with the outer configuration G31 is larger than an area K1 of a region indicated by a hatched line of part (e) of FIG. 32 in which the outer configuration G21 overlaps with the outer configuration 25 c1 (K1<K2).

The boundary G2 is a portion, on the pump portion 21 side, of the feeding path portion at a communicating portion of the communicating opening 25. The boundary G3 is a portion, on the discharge opening 23 side, of the feeding path portion 24 at the communicating portion of the communicating opening 25. As regards the outer configuration G21 when the cross section of the boundary G2 is projected in a direction in which the air when the pump portion 21 is compressed flows, the area K2 in which the outer configuration G21 overlaps with the outer configuration G31 when the cross section of the boundary G3 is projected in the direction in which the air when the pump portion 21 is compressed flows than an area in which the outer configuration G21 overlaps with the outer configuration 25*c*1. By this, the air flowing from the first feeding path region 24*a* when the pump portion 21 is compressed is easy to flow toward the second feeding path region 24*b* in a large amount.

Second Comparison Example

Figure 33:
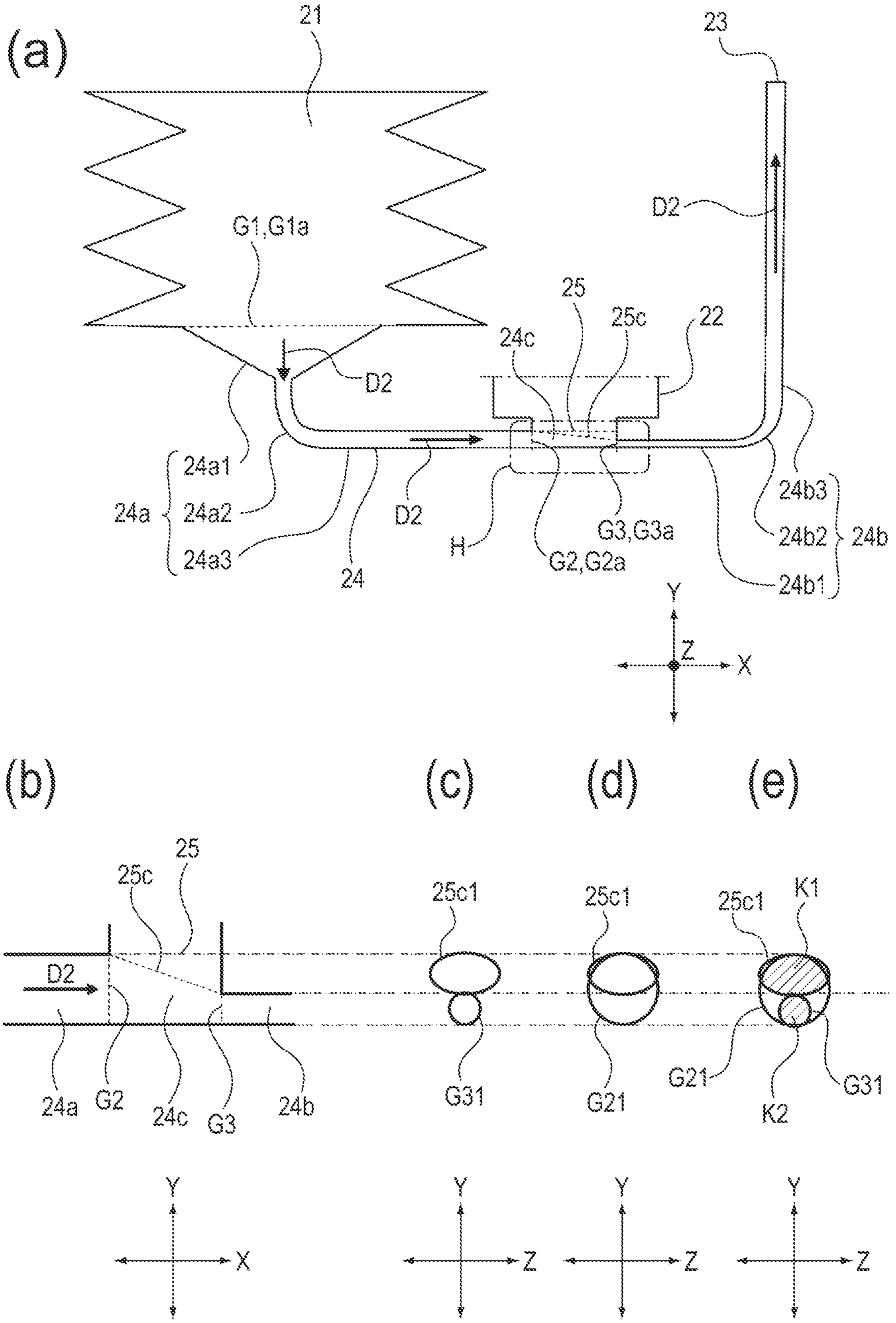
In FIG. 33, part (a) is a sectional view of a pump portion and a feeding path portion of a second comparison example which are viewed from the Z axis direction. Part (b) is an enlarged view of an H portion of part (a). Parts (c) to (e) are views showing an outer configuration when a communication opening is projected in the air flowing direction when the pump portion is compressed, an outer configuration wen a boundary G3 is projected, and an outer configuration when a boundary G2 is projected.

Next, constitutions of a pump portion 21 and a feeding path portion 24 in a second comparison example will be described using FIG. 33. Part (a) of FIG. 33 is a sectional view of the pump portion 21 and the feeding path portion 24 in this comparison example as viewed in the Z axis direction. Part (b) of FIG. 33 is an enlarged view of an H portion of part (a) of FIG. 33. Part (c) of FIG. 33 is a schematic view showing an outer configuration 25*c*1 when a cross section 25*c* of the communication opening 25 is projected in a direction in which the air when the pump portion 21 is compressed flows, and similarly showing an outer configuration G31 when the boundary G3 is projected in the direction. Part (d) of FIG. 33 is a schematic view showing the outer configuration 25*c*1 and an outer configuration G21 when the boundary G2 is projected in the direction in which the air when the pump portion 21 is compressed flows. Part (e) of FIG. 33 is a schematic view in which three outer configurations consisting of the outer configurations 25*c*1, G31 and G21 are caused to overlap with each other.

In this comparison example, as shown in part (b) of FIG. 33, an example of the case where a difference between a cross-sectional area G2*a* of a boundary G2 and a cross-sectional area G3*a* of a boundary G3 is further larger than the difference in the axis direction second modified embodiment shown in part (b) of FIG. 32 will be described. As shown in part (e) of FIG. 33, an area K2 of a region indicated by a hatched line of part (e) of FIG. 33 in which the outer configuration G21 overlaps with the outer configuration G31 is smaller than an area K1 of a region indicated by a hatched line of part (e) of FIG. 33 in which the outer configuration G21 overlaps with the outer configuration 25*c*1 (K1>K2). By this, the air flowing from the first feeding path region 24*a* when the pump portion 21 is compressed flows toward the second feeding path region 24*b* in a large amount.

In order to prevent this, setting is made so that the area K2 of the region in which the outer configuration G21 overlaps with the outer configuration G31 becomes larger than the area K1 of the region in which the outer configuration G21 overlaps with the outer configuration 25*c*1. By this, the air flowing from the first feeding path region 24*a* is easier to flow toward the second feeding path region 24*b* than toward the communication opening 25, so that stabilization of the feeding amount of the toner fed in the feeding path portion 24 can be realized. For this reason, as shown in FIG. 22, it is desirable that the area K2 in which the outer configuration G31 and the outer configuration G21 overlap with each other is increased.

<Effect of Third Feeding Path Region>

As described above, the third feeding path region 24*c* is provided below the toner accommodating portion 22. For this reason, the toner in the toner accommodating portion 22 can be fed into the third feeding path portion 24*c* by utilizing gravitation of the toner. Further, the third feeding path region 24*c* is disposed at the lowest position of the feeding path portion 24 in the vertical direction. For this reason, as described above, the toner supplied into the third feeding path region 24*c* from the inside of the toner accommodating portion 22 by gravitation can be prevented from entering the first feeding path region 24*a* and the second feeding path region 24*b* move than necessary. By this, stabilization of the feeding amount of the toner fed in the feeding path portion 24 can be realized.

Further, as shown in part (e) of FIG. 22 and part (e) of FIG. 32, setting is made so that the area K2 of the region in which the outer configuration G21 overlaps with the outer configuration G31 is larger than the area K1 of the region in which the outer configuration G21 overlaps with the outer configuration 25*c*1 (K1<K2). By this, the toner existing in the third feeding path region 24*c* can be sent to the second feeding path region 24*b* than being blown back to the communication opening 25, by the expansion/contraction operation of the pump portion 21. By this, stabilization of the feeding amount of the toner fed in the feeding path portion 24 can be realized.

<Toner Feeding from Toner Cartridge to Process Cartridge>

Next, a toner feeding operation from the toner cartridge B to the process cartridge A will be described using FIG. 1, FIG. 17 and FIG. 18. First, by using FIG. 17 and FIG. 18, the toner feeding operation in the toner cartridge B will be described. As shown in FIG. 18, the toner cartridge B is provided with the feeding portion 31.

The feeding portion 31 includes the plate-like member 42 provided on the bottom of the toner accommodating portion 22 so as to be capable of being reciprocated and moved in arrow D1*a* and D1*b* directions of FIG. 18. The toner accommodated in the toner accommodating portion 22 is placed on the plate-like member 42. The plate-like member 42 reciprocates and moves in the arrow D1*a* and D1*a* directions of FIG. 18. At this time, maximum acceleration a2 at which the plate-like member 42 in the arrow D1*b* direction of FIG. 18 is made larger than maximum acceleration a1 at which the feeding plate 31*a* in the arrow D1*a* direction of FIG. 18. By this, the toner on the feeding plate 31*a* is fed in the arrow D1*a* direction of FIG. 18.

The toner fed in the arrow D1*a* direction of FIG. 18 is guided by an inclined surface 22*a* provided at an inner surface of the toner accommodating portion 22 and is collected to the communication opening 25. The toner sent to the communication opening 25 passes, as shown in FIG. 17, through the communication opening 25 by gravitation since the communication opening 25 faces below the toner accommodating portion 22, and is sent into the feeding path portion 24. The toner carried into the feeding path portion 24 is sent to the discharge opening 23 by the flow of the air generated when the pump portion 21 is compressed.

As shown in FIG. 1, in a state the toner cartridge B and the process cartridge A are mounted in the image forming apparatus C, the discharge opening 23 of the feeding path portion 24 and one end portion of the main assembly path portion 1 provided on the apparatus main assembly C1 side of the image forming apparatus C communicate with each other. Further, the other end portion of the main assembly path portion 1 and the receiving portion 18 of the toner accommodating portion 17 of the process cartridge A communicate with each other.

The toner sent from the discharge opening 23 of the toner cartridge B passes through the main assembly path portion 1 provided in the image forming apparatus C and is fed into the toner accommodating portion 17 through the receiving portion 18 of the process cartridge A. As described above, the toner is fed from the toner cartridge B to the process cartridge A. In this embodiment, the toner can be discharged upward from the toner cartridge B disposed below the process cartridge A. Further, the toner can be discharged to a distant place. According to this embodiment, the air generated by the contraction operation of the pump portion can be prevented from flowing back into the developer accommodating portion.

Sixth Embodiment

Next, constitutions of a developer supplying device and an image forming apparatus according to the present invention in a sixth embodiment will be described using FIG. 34 to FIG. 37. Incidentally, members (portions) constituted similarly as in the axis direction fifth embodiment will be omitted from description by adding the same symbols or by adding the same member names even when the symbols are different, and a similar effect can be obtained. In this embodiment, a constitution in which a time in which the shutter portion 42*a* provided on the plate-like member 42 provided in the toner accommodating portion 22 closes the communication opening 25 is made longer than the time in the fifth embodiment is employed. Incidentally, an image forming process and constitutions of the process cartridge A and the toner cartridge B are similar to those in the axis direction fifth embodiment, and therefore, overlapping description will be omitted.

<Rotatable Member>

Figure 34:
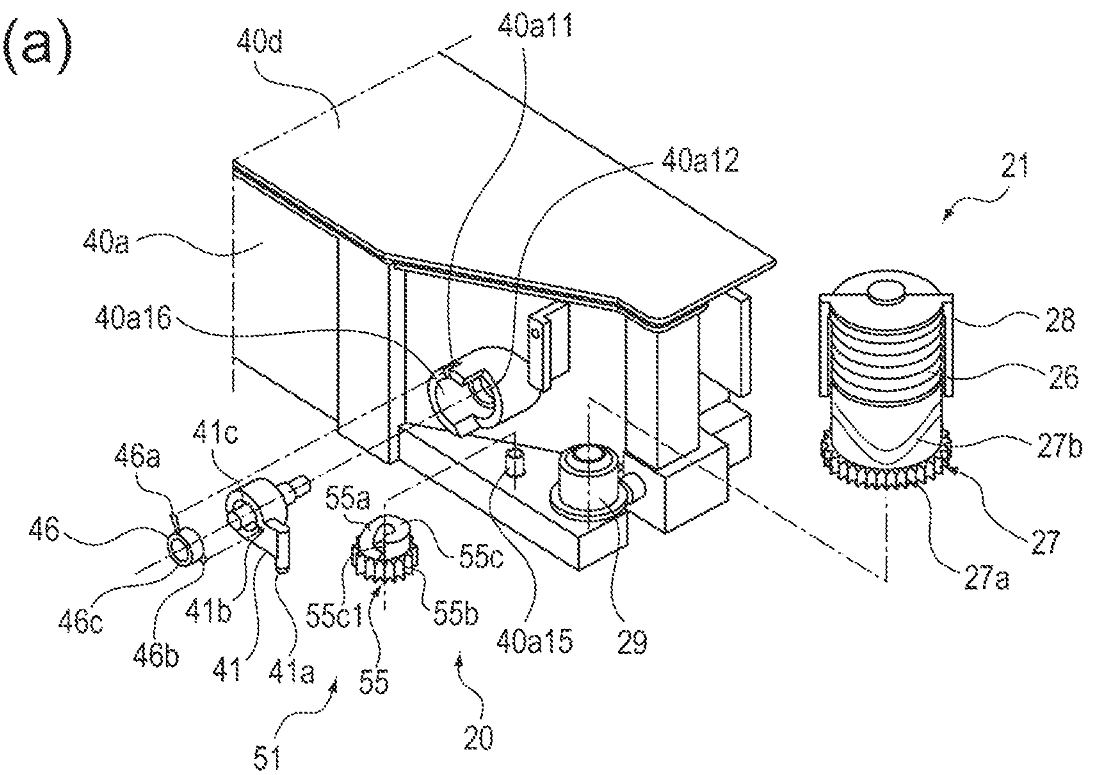
In FIG. 34, part (a) is an exploded perspective view showing a constitution of a driving portion for driving a plate-like member of a sixth embodiment. Part (b) of FIG. 25 is a perspective view showing a constitution of the driving portion for driving the plate-like member of the fifth embodiment.
Figure 34:
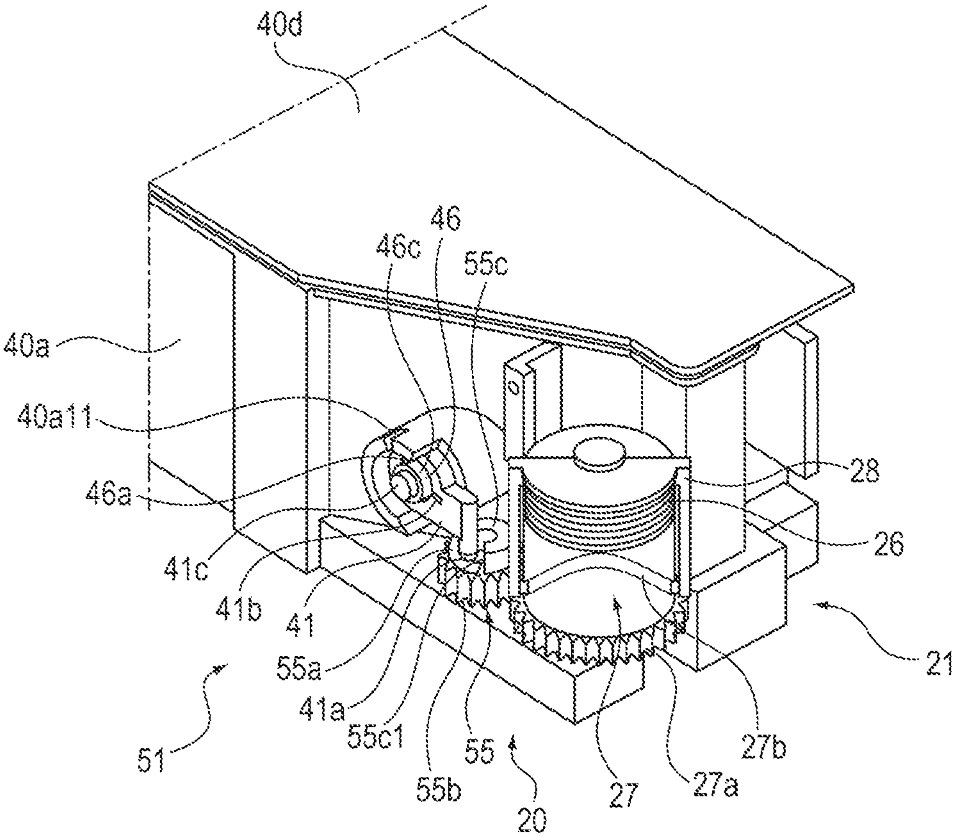

Using FIG. 34, a constitution of a rotatable member 55 which is a characteristic constitution of this embodiment will be described. Part (a) of FIG. 34 is an exploded perspective view showing a constitution of the driving portion 20 for driving the plate-like member 42 of this embodiment. Part (b) of FIG. 34 is a perspective view showing the constitution of the driving portion 20 for driving the plate-like member 42 of this embodiment. As shown in part (a) of FIG. 34, a feeding portion 51 for feeding the toner in this embodiment includes the plate-like member 42 on which the toner in the toner accommodating portion 22 is placed and moved, and the driving portion 20 for driving the plate-like member 42.

The rotatable member 55 provided in the driving portion 20 includes a gear portion 55*b* rotated by receiving a driving force in engagement with the gear portion 27*a* of the pump driving gear 27. At a side surface 55*b*1 of the gear portion 55*b*, an inclined surface 55*a* continuously displaced in height with respect to the rotational axis direction of the gear portion 55*b* and a flat surface 55*c* which is continuous to a highest position of the inclined surface 55*a* and where a certain height continues in the rotational axis direction of the gear portion 55*b*. The rotatable member 55 is constituted by a stepped gear.

<Swingable Member>

As shown in part (b) of FIG. 34, the swingable member 41 is provided with the projected portion 41*a* which contacts and slides on the inclined surface and the flat surface 55*c* when the rotatable member 55 is rotated. The swingable member 41 is urged in a direction in which the projected portion 41*a* is press-contacted to the inclined surface 55*a* and the flat surface 55*c* by the urging member 46 consisting of the torsion coil spring.

<Operation of Feeding Portion>

Figure 35:
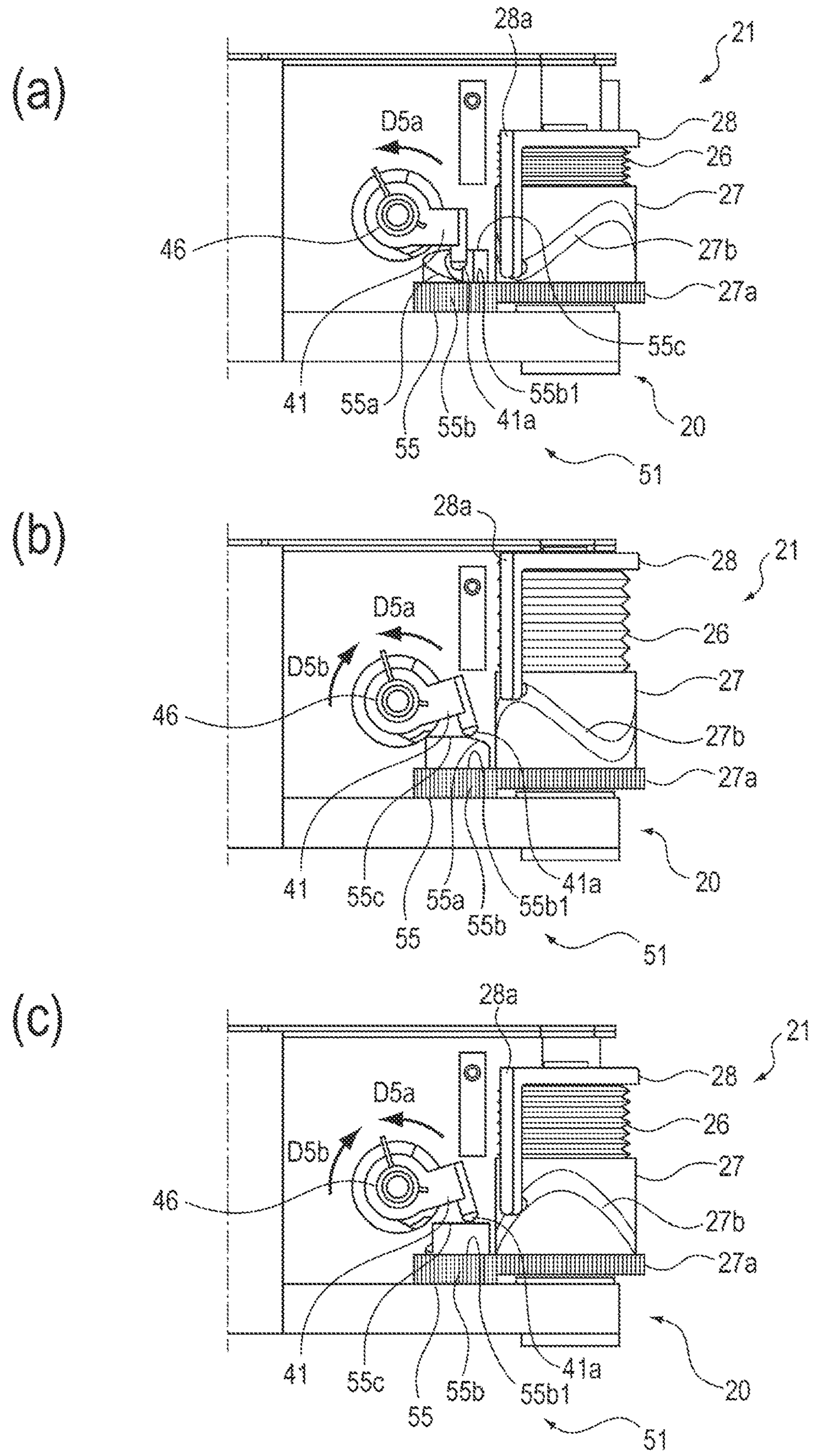
In FIG. 35, parts (a) to (c) are views for illustrating an operation of the driving portion for driving the plate-like member of the sixth embodiment.
Figure 36:
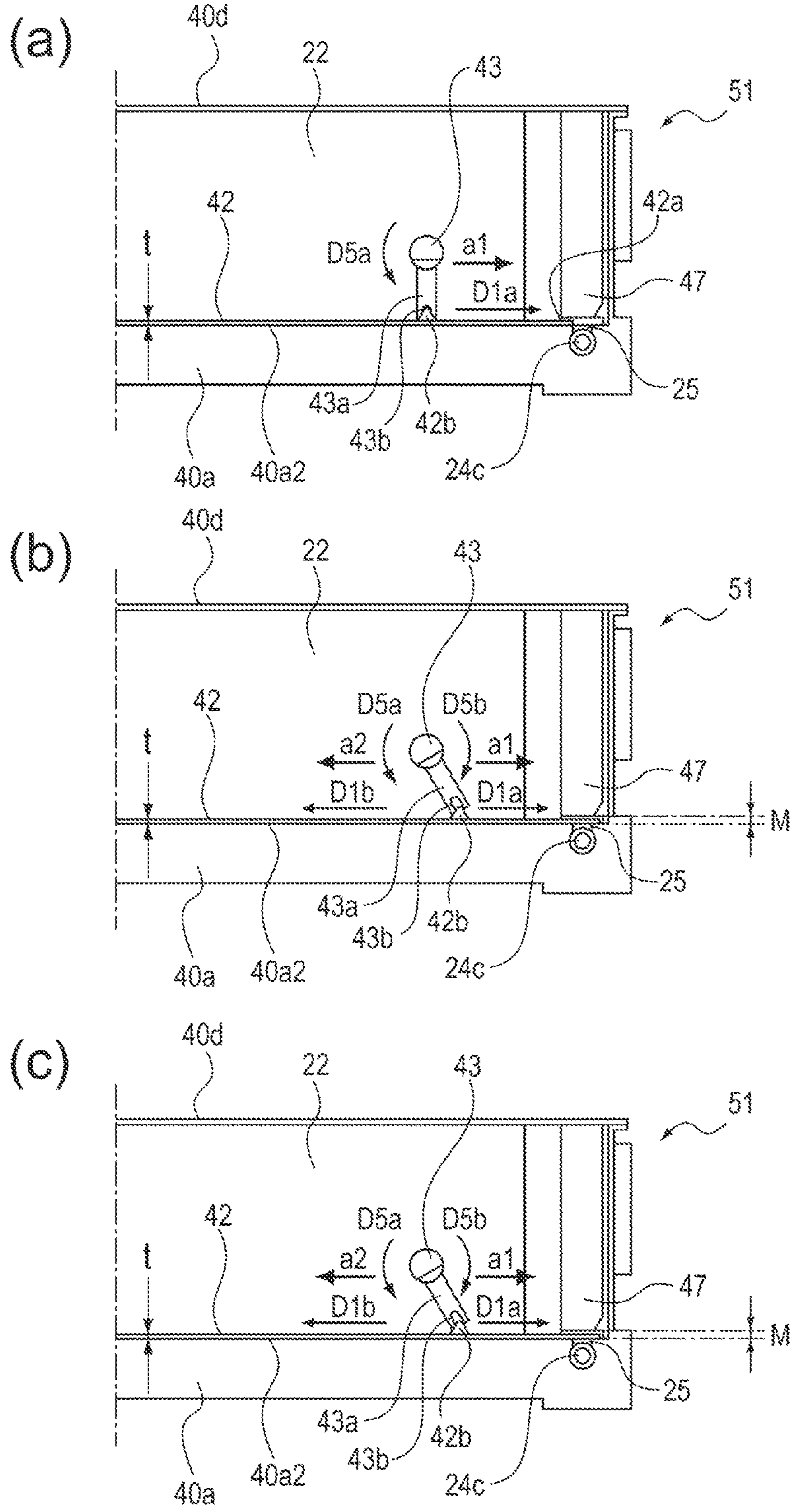
In FIG. 36, parts (a) to (c) are sectional views for illustrating movement of the plate-like member of the sixth embodiment.
Figure 37:
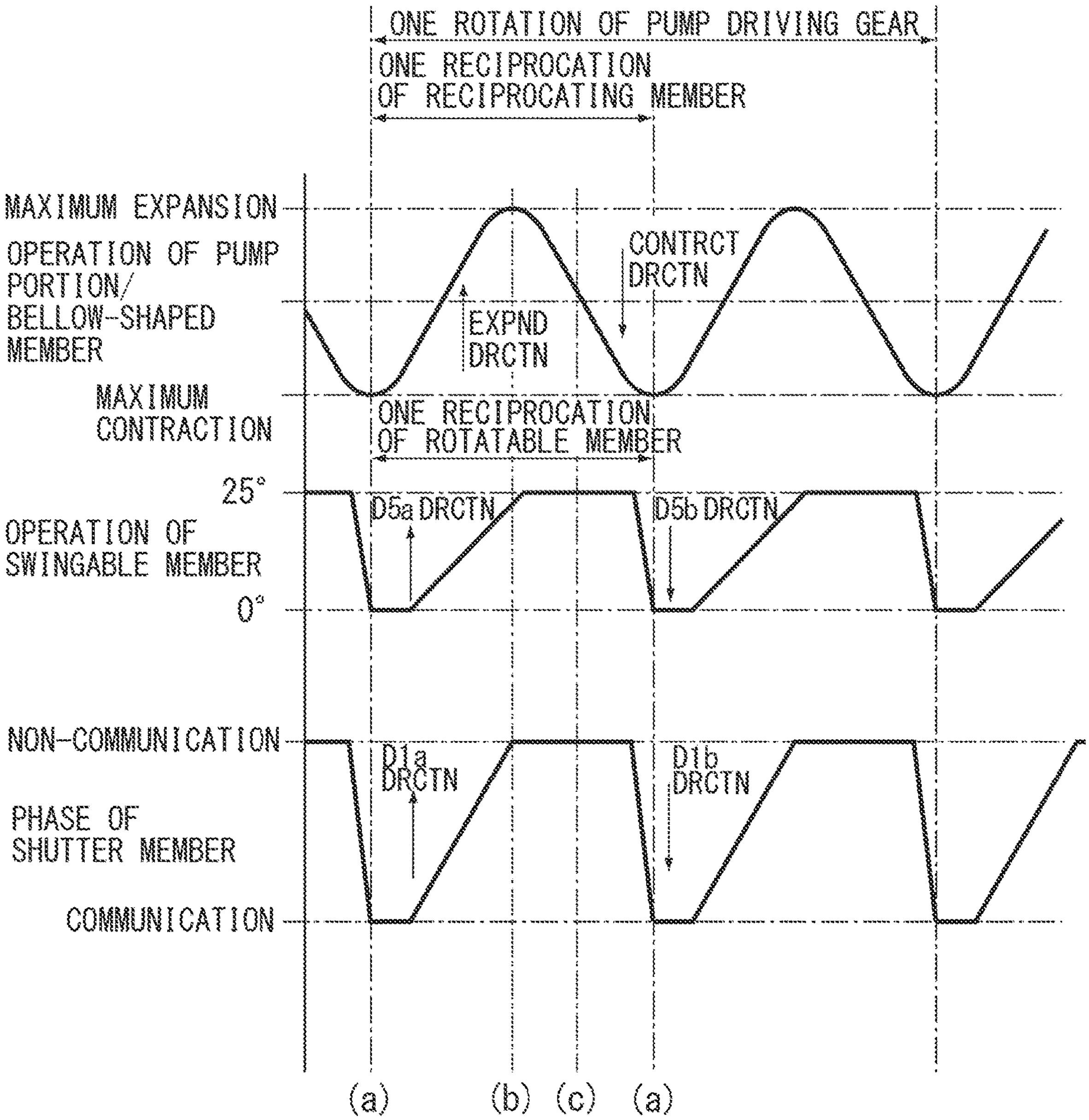
FIG. 37 is a diagram for illustrating an operation of the pump portion, an operation of a swingable member, and a phase of a shutter portion of the plate-like member in the sixth embodiment.

Next, using FIG. 35 to FIG. 37, an operation of the feeding portion 51 will be described. Parts (a) to (c) of FIG. 35 are views for illustrating an operation of the driving portion 20 for driving the plate-like member 42 of this embodiment. Parts (a) to (c) of FIG. 36 are sectional views for illustrating movement of the plate-like member 42 of this embodiment. FIG. 37 is a view for illustrating an operation of the pump portion 21, an operation of the swingable member 41, and a phase of the shutter portion 42*a*.

As shown in part (a) of FIG. 35, a state in which the bellow-shaped member 26 is most contracted is an initial state of the feeding portion 51. In the initial state, as shown in part (a) of FIG. 36, the shutter portion 42*a* provided on the plate-like member 42 does not cover the communication opening 25, and a state in which the communication opening 25 provided in the bottom 40*a*2 of the toner accommodating portion 22, and the inside of the toner accommodating portion 22 were communicated with each other was formed. Thereafter, when the pump driving gear 27 is rotated 90° by the driving force from the driving source such as unshown motor provided in the apparatus main assembly C1 of the image forming apparatus C, the feeding portion 51 changes in state from a sectional view shown in part (a) of FIG. 35 to a state shown in part (b) of FIG. 35.

At this time, the bellow-shaped member 26 is caused to perform the expansion operation by the operation of the reciprocating member 28 engaged with the cam portion 27*b* of the pump driving gear 27. Further, by rotation of the gear portion 55*b* engaged with the pump driving gear 27, the projected portion 41*a* of the swingable member 41 contacts and slides on the inclined surface 55*a*, so that the swingable member 41 is rotated in the arrow D5*a* direction as a first direction shown in part (b) of FIG. 35. By the rotation of the swingable member 41, the feeding shaft 43 engaged with the swingable member 41 is rotated, so that the position of the plate-like member 42 is changed from the position shown in part (a) of FIG. 36 to the position shown in part (b) of FIG. 36. That is, the shutter portion 42*a* is moved in the arrow D1*a* direction as the first direction.

Further, when the pump driving gear 27 is further rotated 45° by the driving force from the unshown driving source provided in the apparatus main assembly C1, the feeding portion 51 transfers from the state shown in part (b) of FIG. 35 to the state shown in part (a) of FIG. 35. At this time, the bellow-shaped member 26 is caused to perform the contraction operation by the operation of the reciprocating member 28 of which projected portion 42*b* is engaged with the cam portion 27*b* of the pump driving gear 27.

Further, the rotatable member 55 is rotated with the rotation of the pump driving gear 27, but as shown in part (c) of FIG. 35, a state in which the projected portion 41*a* of the swingable member 41 operations the flat surface 55*c* of the rotatable member 55 is formed. At this time, the swingable member 41 is set rest in a position where the swingable member 41 is most rotated in the arrow D5*a* direction of part (c) of FIG. 35, and a position of the plate-like member 42 connected to the feeding shaft 43 which is engaged with the swingable member 41 takes a position where the plate-like member 42 is most moved in the arrow D1*a* direction which is the toner feeding direction shown in part (c) of FIG. 36.

That is, when the projected portion 41*a* of the swingable member 41 passes through the highest position of the inclined surface 55*a* of the rotatable member 55, the projected portion 41*a* of the swingable member 41 contacts and slides on the flat surface 55*c* of the rotatable member 55, so that a state in which the shutter portion 42*a* is moved in the arrow D1*a* direction as the first direction is maintained. For this reason, even when the rotatable member 55 is rotated, in a period in which the projected portion 41*a* of the swingable member 41 contacts the flat surface 55*c* of the rotatable member 55, the plate-like member 42 takes the position shown in part (c) of FIG. 36.

Further, when the pump driving gear 27 is further rotated 45° by the driving force from the unshown driving source provided in the apparatus main assembly C1, the feeding portion 51 returns from the state shown in part (c) of FIG. 35 to the state shown in part (a) of FIG. 35. At this time, the bellow-shaped member 26 is caused to perform the contraction operation by the operation of the reciprocating member 28 of which projected portion 28*c* is engaged with the cam portion 27*b* of the pump driving gear 27.

Further, the rotatable member 55 is rotated with the rotation of the pump driving gear 27 and the projected portion 41*a* of the swingable member 41 is separated from the flat surface 55*c* of the rotatable member 55, so that the swingable member 41 is rotated in the arrow D5*b* direction shown in part (c) of FIG. 35 by the urging force of the urging member 46. By the rotation of the swingable member 41, the feeding shaft 43 engaged with the swingable member 41 is rotated, so that the position of the plate-like member 42 returns from the position shown in part (b) of FIG. 36 to the position of part (a) of FIG. 36.

That is, the projected portion 41*a* of the swingable member 41 passes through an end portion 55*c*1 of the flat surface 55*c* of the rotatable member 55. Then, by the urging force of the urging member 46, the projected portion 41*a* of the swingable member 41 is landed on a side surface 55*b*1 of the gear portion 55*b*. At this time, the swingable member 41 is rotated in the arrow D5*b* direction as a second rotational direction, so that the shutter portion 42*a* is moved in the arrow D1*b* direction as a second direction.

A relationship between the operation of the pump portion 31, the operation of the swingable member 41, and the phase of the shutter portion 42*a* is shown in FIG. 37. In FIG. 37, during one rotation of the pump driving gear 27, the operation of the reciprocating member 28 and the operation of the rotatable member 55, the operation of the pump portion 21 in each of states of (a)→(b)→(c)→(a), and the operation of the swingable member 41 are shown.

<Action of Shutter Portion>

Next, using FIG. 30 and FIG. 35 to FIG. 37, actin of the shutter portion 42*a* provided on the plate-like member 42 in this embodiment will be described. The rotatable member 55 and the swingable member 41 are rotated in interrelation with the operation of the pump portion 21, so that the plate-like member 42 performs the reciprocating motion via the feeding shaft 43 connected to the swingable member 41.

As shown in part (c) of FIG. 35, part (c) of FIG. 36, and FIG. 37, when the bellow-shaped member 26 performs the contraction operation, the plate-like member 42 is at rest in a position where the plate-like member 42 is most moved in the arrow D1*a* direction. Then, the shutter portion 42*a* provided on the plate-like member 42 causes the communication opening 25 and the inside of the toner accommodating portion 22 to be in non-communication with each other.

At this time, with the contraction operation of the bellow-shaped member 26 in the contracting direction, air which passes through the first feeding path region 24*a* shown in part (a) of FIG. 30 and which is sent to the third feeding path region 24*c* as a toner supplying path is sent to the communication opening 25 communicating with the third feeding path region 24*c*. Further, the air passes through the second feeding path region 24*b* from the third feeding path region 24*c* and is emitted toward the discharge opening 23. At this time, the communication opening 25 is closed by the shutter portion 42*a* provided on the plate-like member 42. For this reason, back-flow of the air and the toner into the toner accommodating portion 22 is suppressed.

Next, as shown in part (a) of FIG. 35, part (a) of FIG. 36, and FIG. 37, when the bellow-shaped member 26 performs the expansion operation, the plate-like member 42 moves in the arrow D1*a* direction from a position where the plate-like member 42 is most moved in the arrow D1*b* direction. At this time, the shutter portion 42*a* provided on the plate-like member 42 causes the communication opening 25 and the inside of the toner accommodating portion 22 to be in communication with each other. By this, the toner passes through the communication opening 25 from the inside of the toner accommodating portion 22 and is supplied to the third feeding path region 24*c*. At this time, by the axis direction feeding principle of the plate-like member 42, the toner on the plate-like member 42 slides on the plate-like member 42, so that the toner above the communication opening 25 is caused to pass through the communication opening and is supplied to the third feeding path region 24*c* by self-weight falling.

Further, by the expansion operation of the bellow-shaped member 26 in the expanding direction, the inside of the third feeding path region 24*c* shown in part (a) of FIG. 30 becomes negative pressure, so that action such that the toner in the toner accommodating portion 22 is sucked into the third feeding path region 24*c* through the communication opening 25 is also generated. At this time, the plate-like member 42 is moved from the position shown in part (a) of FIG. 36 to the position shown in part (b) of FIG. 36 toward the arrow D1*a* direction. For this reason, the shutter portion 42*a* provided on the plate-like member 42 operates so as to close the communication opening 25.

For this reason, compared with the fifth embodiment, in this embodiment, the amount of the toner sucked into the third feeding path region 24*c* by the expansion operation of the bellow-shaped member 26 in the expanding direction decreases, but the toner in a necessary amount can be supplied and therefore, there is substantially no problem. By such a constitution, during contraction of the bellow-shaped member 26 in the contracting direction, a time in which the shutter portion 42*a* of the plate-like member 42 provided in the toner accommodating portion 22 closes the communication opening 25 can be made longer.

<Effect of Shutter Portion>

By the axis direction action of the shutter portion 42*a*, the toner is stably supplied to the third feeding path region 42*c* through the communication opening 25. Further, the back-flow of the air and the toner into the toner accommodating portion 22 is further suppressed. By this, an amount of the air which passes through the second feeding path region 24*b* and which is discharged to the discharge opening 23 further increases. By this, the toner feeding performance can be further improved. Other constitutions are constituted similarly as in the fifth embodiment, and a similar effect can be obtained.

According to this embodiment, it is possible to prevent the air generated by the contraction operation of the pump portion from flowing back into the developer accommodating portion.

Seventh Embodiment

In the toner cartridge B100, shown in FIG. 16, of JP-A 2010-256894, the toner is fed from the toner accommodating portion 117 toward the discharge opening 123 by expansion of the pump portion 121. However, in the case where the amount of the toner fed is excessive, there was a liability that toner clogging occurred in the feeding path of the toner.

A seventh embodiment and an eighth embodiment described later show a constitution in which clogging, in the feeding path portion, of the developer fed from the developer accommodating portion toward the feeding path portion can be further suppressed.

First, a constitution of a seventh embodiment of the developer supplying device and the image forming apparatus according to the present invention will be specifically described using FIG. 1 and FIG. 38 to FIG. 51.

<Image Forming Apparatus>

A constitution of an image forming apparatus C and a process cartridge A will be described using FIG. 1. FIG. 1 is a sectional view showing a constitution of the image forming apparatus C of this embodiment. Incidentally, in the following description, description will be made, in some cases, using a coordinate system in which an up-down (vertical direction) of FIG. 1 is a Y axis direction, a horizontal direction of FIG. 1 is an X axis direction, and a depth direction of FIG. 1 is a Z axis direction. The image forming apparatus C shown in FIG. 1 is an image forming apparatus for forming an image on a recording material S such as paper by using an electrophotographic (image) forming process. At a central portion of the image forming apparatus C shown in FIG. 1, the process cartridge A detachably mountable to an apparatus main assembly 1C of the image forming apparatus C is provided.

<Process Cartridge>

The constitution of the process cartridge A will be described using FIG. 1. Here, the process cartridge A is one including a photosensitive drum 11 as an image bearing member, and various process means actable on the photosensitive drum 11. Here, as the process means, for example, there is a charging roller as a charging means for electrically charging a surface of the photosensitive drum 11 uniformly. Further, as the process means, there is a developing device 3 for developing an electrostatic latent image, formed on the surface of the photosensitive drum 11, as a toner image by supply toner as a developer to the electrostatic latent image. Further, as the process means, there is a cleaning blade 14 as a cleaning means for removing residual toner remaining on the surface of the photosensitive drum 11 after transfer.

The process cartridge A of this embodiment is provided with the charging roller 12 at a periphery of the photosensitive drum 11 rotating in the clockwise direction of FIG. 1 and includes the cleaning blade 14, having elasticity, as the cleaning means. Further, the developing device 3 includes a developing roller 13 provided opposed to the surface of the photosensitive drum 11, a developing blade 15, and a toner accommodating portion 17 for accommodating the toner. The toner accommodating portion 17 is provided with a receiving portion 18 for receiving the toner supplied, via a maximum acceleration(-side) path portion 1, from a toner cartridge B provided below the process cartridge A.

<Toner Cartridge>

Figure 38:
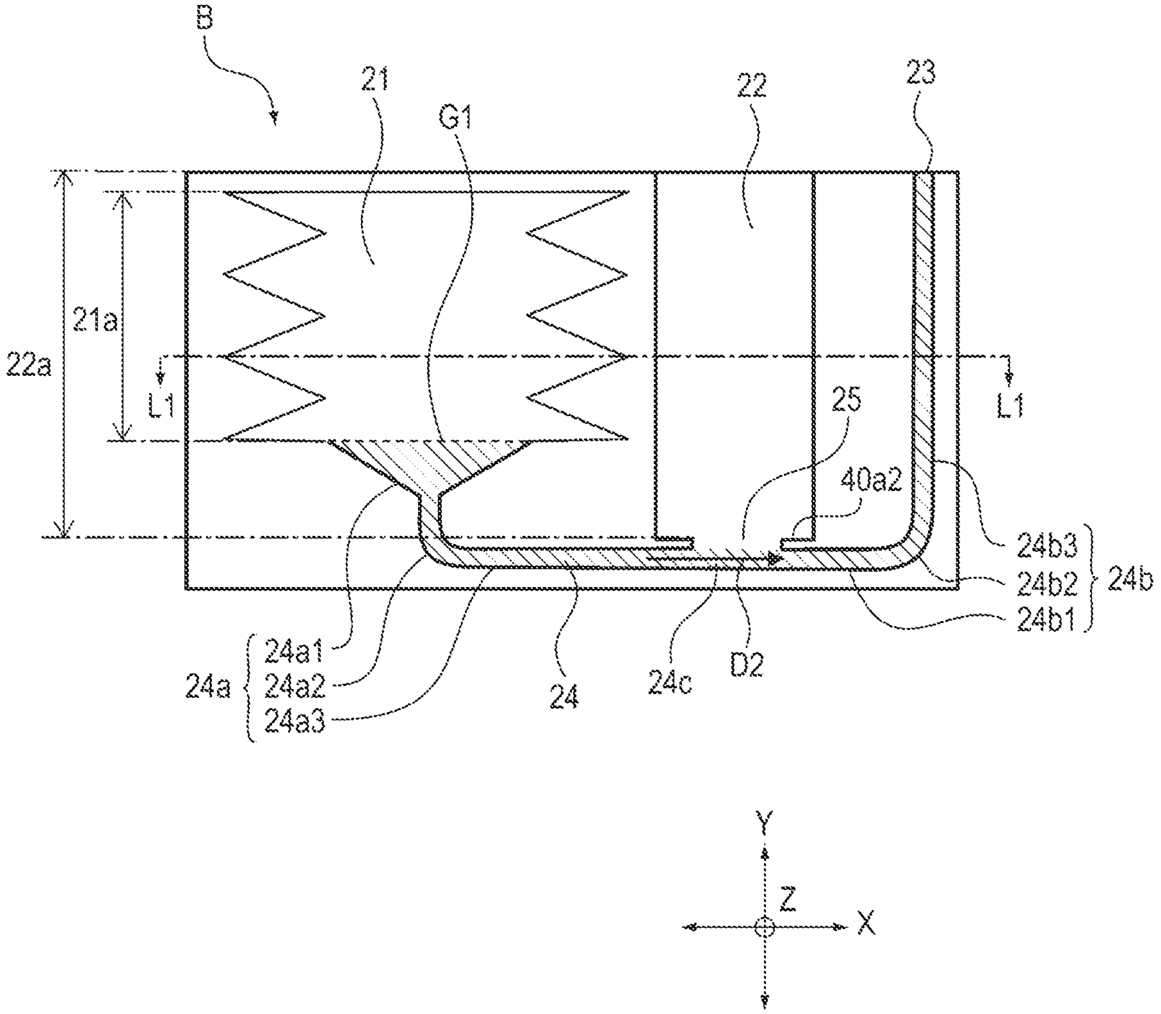
FIG. 38 is a sectional view showing a constitution of the pump portion and the feeding path portion device in a toner cartridge of a seventh embodiment.

A constitution of the toner cartridge B as a developer supplying device used in the image forming apparatus C will be described using FIG. 1 and FIG. 28. FIG. 38 is a sectional view showing the constitutions of the pump portion 21 and the feeding path portion 24 provided in the toner cartridge B of this embodiment. The toner cartridge B shown in FIG. 1 and FIG. 38 is provided such as to be detachably mountable to the apparatus main assembly C1 of the image forming apparatus C.

As shown in FIG. 1, the toner cartridge B includes a toner accommodating portion 22 as a developer accommodating portion for accommodating toner (developer) in an inside thereof. Further, the toner cartridge B includes a volume-variable pump portion 21 for creating a flow of air by a volume change. Further, the toner cartridge B includes a discharge opening 23 for permitting discharge of the toner from the toner accommodating portion 22 of the toner cartridge B to an outside. Further, the toner cartridge B includes a connection opening (boundary G1) connected to the pump portion 21 at one end and includes a feeding path portion 24 (hatching portion of FIG. 38) including the discharge opening 23 at the other end. The toner cartridge B supplies the toner into the toner accommodating portion 17 of the process cartridge A via the main assembly path portion 1 provided in the apparatus main assembly C1 of the image forming apparatus C.

As shown in FIG. 2, the toner accommodating portion 22 is provided with the communication opening 25 as a first communication opening. The toner accommodating portion 22 is connected to an intermediate portion between one end (boundary G1) and the other end (discharge opening 23) of the feeding path portion 24 via the communication opening 25. A volume change amount of the pump portion 21 is set so as to be larger than a total volume from the boundary G1 (connection opening) to the discharge opening 23 of the feeding path portion 24.

The process cartridge A and the toner cartridge B which are shown in FIG. 1 are mounted in the apparatus main assembly C1 of the image forming to apparatus C and are used for image formation. At a lower portion of the image forming apparatus C, a feeding cassette 6 in which recording materials S such as paper are accommodated. The recording materials S accommodated in the feeding cassette 6 are fed and separated one by one by an unshown separating means, and the separated recording material S is fed. Thereafter, a leading end portion of the recording material S is abutted against a nip of registration rollers 7, so that oblique movement of the recording material S is corrected.

In synchronism with a feeding operation of the recording material S from the feeding cassette 6, the surface of the photosensitive drum 11 uniformly charged by the charging roller 12 is selectively exposed to light depending on image information, so that an electrostatic latent image is formed. On the other hand, the toner accommodated in the toner accommodating portion 17 is supplied to the developing roller 13, and the toner is carried in a thin layer state on a surface of the developing roller 13 by the developing blade 15. By applying a developing bias to the developing roller 13, the toner is supplied to the electrostatic latent image formed on the surface of the photosensitive drum 11, so that the electrostatic latent image is developed as a toner image.

In conformity to a timing when the toner image formed on the surface of the photosensitive drum 11 reaches a transfer nip N formed by the photosensitive drum 11 and a transfer roller 9, the recording material S is fed to the transfer nip N by the registration rollers 7. By applying a transfer bias voltage to the transfer roller 9, in the transfer nip N, the toner image formed on the surface of the photosensitive drum 11 is transferred onto the recording material S.

The recording material S on which the toner image is transferred is conveyed to a fixing device 10, and is heated and pressed by a heating unit 10*a* and a pressing roller 10*b* which are provided in the fixing device 10, so that the toner image is fixed on the recording material S. The recording material S on which the toner image is fixed is conveyed to discharging rollers 16 and is discharged onto a discharge portion 4 provided at an upper portion of the image forming apparatus C.

Figure 39:
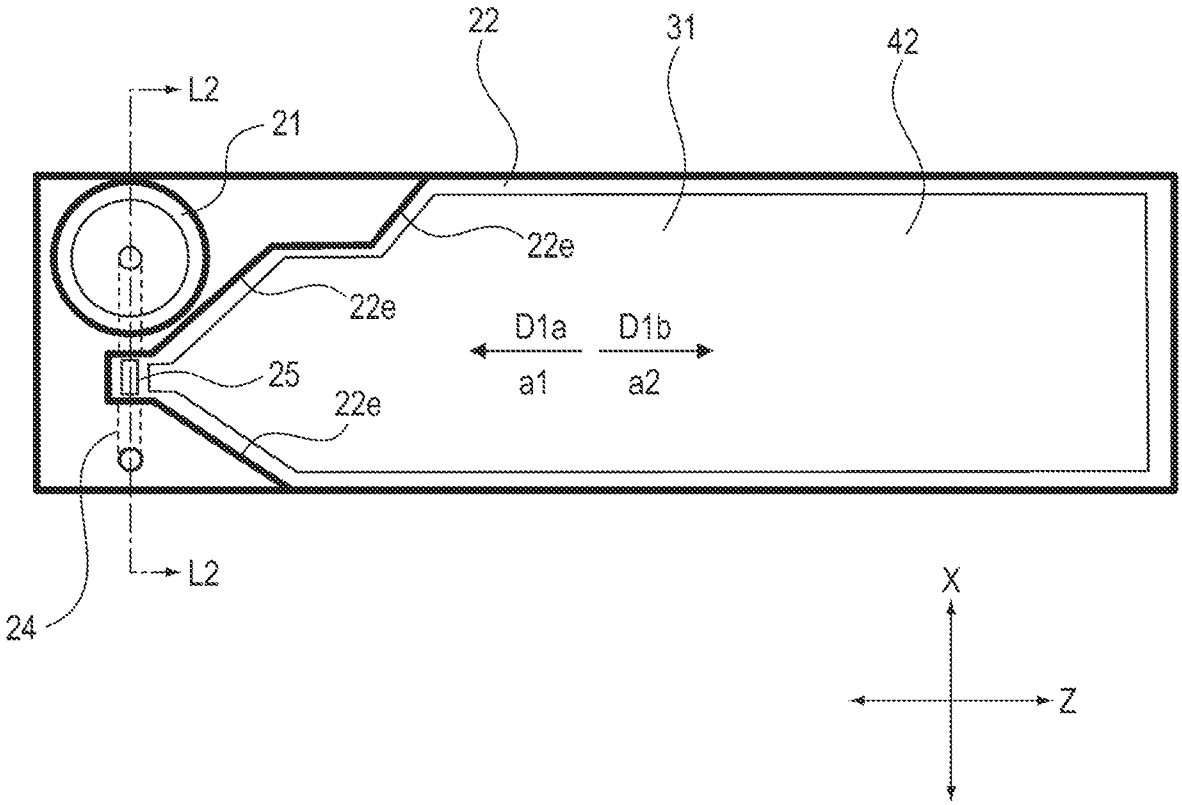
FIG. 39 is a sectional view viewed from above when the toner cartridge of the first embodiment is cut in a horizontal direction.

FIG. 39 is a sectional view of the toner cartridge B of this embodiment as seen from above when the toner cartridge B is cut in a horizontal direction. FIG. 38 is a sectional view of a cross section of the toner cartridge B of this embodiment, as seen in a rightward direction of FIG. 39, when the toner cartridge B is cut in a vertical direction along L2-L2 (line) of FIG. 39. On the other hand, FIG. 39 is a sectional view of a cross section of the toner cartridge B of this embodiment, as seen from above, when the toner cartridge B is cut in the horizontal direction along L1-L2 (line) of FIG. 38.

As shown in FIG. 39, the toner accommodating portion 22 accommodates the toner (developer) therein. A feeding portion 31 feeds the toner at an inner portion of the toner accommodating portion 22. The feeding portion 31 includes a feeding member 42 disposed on a lower side of the toner and consisting of a plate-like member reciprocating in arrow D1*a* and D1*b* directions. The toner on the feeding member 42 is fed by reciprocating the feeding member 42 in the arrow D1*a* and D1*b* directions of FIG. 39 along a bottom 40*a*2 of an inside of the toner accommodating portion 22.

The feeding member 42 moves at maximum acceleration μl in the arrow D1*a* direction in which it approaches a communication opening 25. Further, the feeding member 42 moves at maximum acceleration a2 in the arrow D1*b* direction, opposite to the toner feeding direction, in which it moves away from the communication opening 25. Here, the maximum acceleration a1 is set so as to become smaller than the maximum acceleration a2. By this, the toner on the feeding member 42 is fed in the arrow D1*a* direction in which the toner approaches the communication opening 25. By this, the toner on the feeding member 42 is fed in the arrow D1*a* direction and is supplied into the feeding path portion 24 by a self-weight thereof from the communication opening 25.

The bottom 40*a*2 of the toner accommodating portion 22 shown in FIG. 39 on one end side (arrow D1*a* direction side of FIG. 39) with respect to a longitudinal direction is provided with the communication opening 25 which is an opening downward opening and which is connected to the feeding path portion 24. As shown in FIG. 3, the communication opening 25 is constituted by a rectangle.

<Pump Portion>

Figure 40:
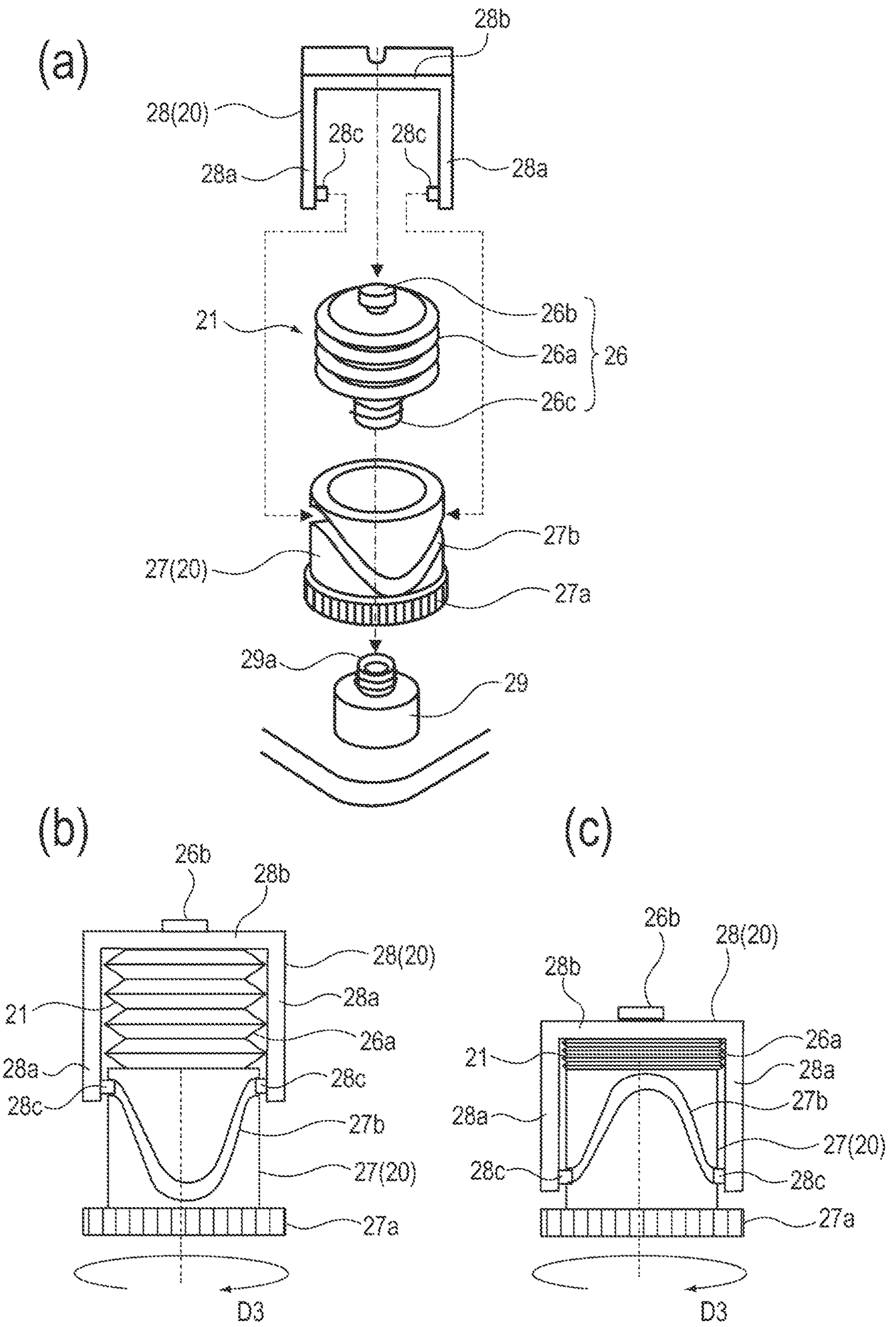
In FIG. 40, part (a) is an exploded perspective view showing a constitution of a driving portion for a pump portion of the seventh embodiment. Part (b) is a side view showing a state when the pump portion of the seventh embodiment is expanded. Part (c) is a side view showing a state when the pump portion of the seventh embodiment is contracted.
Figure 41:
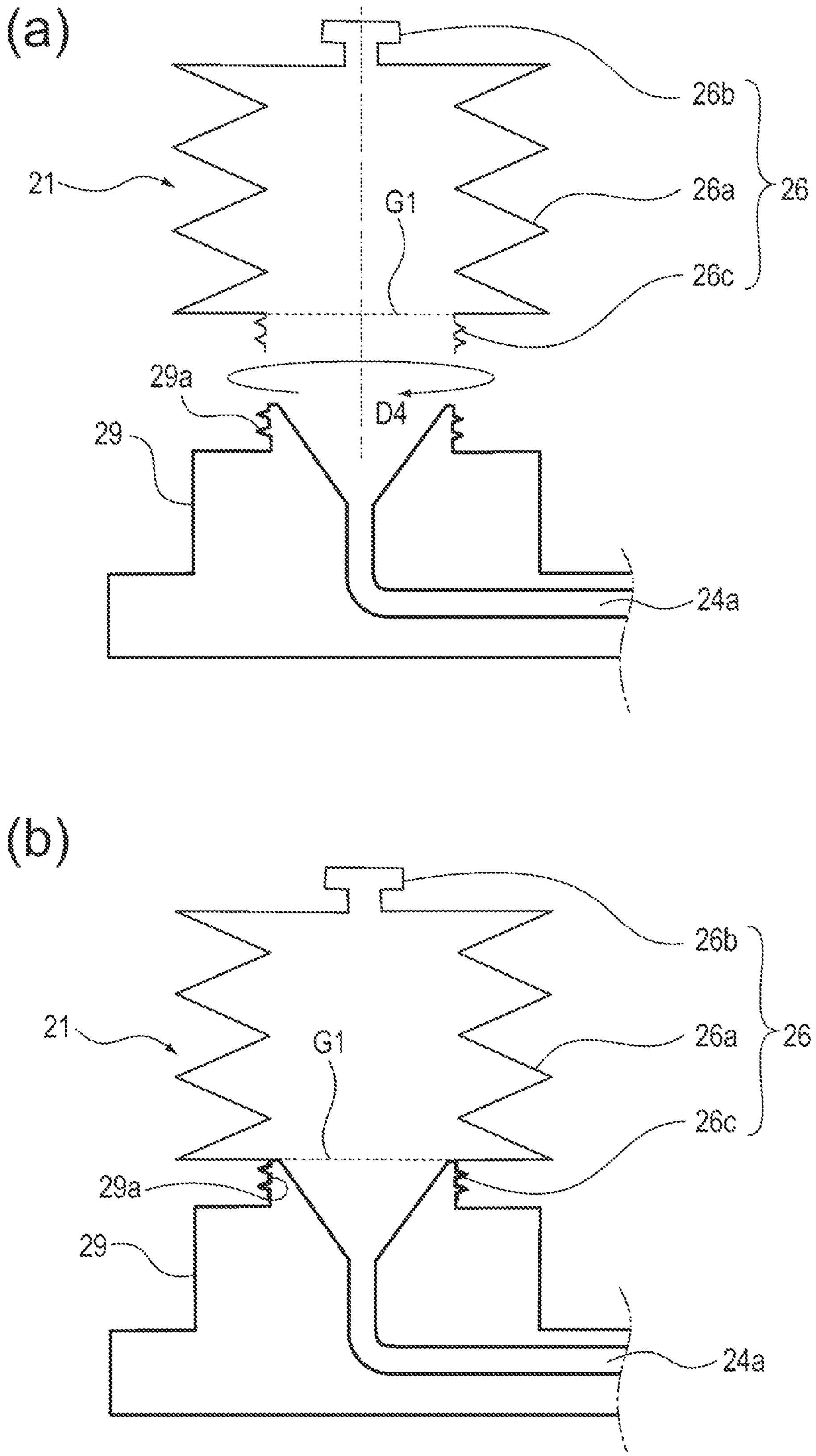
In FIG. 41, part (a) is a sectional view before the pump portion of the seventh embodiment is assembled. Part (b) is a sectional view after the pump portion of the seventh embodiment is assembled.

Next, a constitution of a pump portion 21 will be described using FIG. and FIG. 51. Part (a) of FIG. 40 is an exploded perspective view showing a constitution of a driving portion 20 of the pump portion 21 in this embodiment. Part (b) of FIG. 40 is a side view showing a state in which the pump portion 21 in this embodiment is expanded. Part (c) of FIG. 40 is a side view showing a state in which the pump portion 21 in this embodiment is contracted. Part (a) of FIG. 41 is a sectional view before the pump portion 21 in this embodiment is assembled. Part (b) of FIG. 41 is a sectional view after the pump portion 21 in this embodiment is assembled.

<Driving Portion>

As shown in parts (a) to (c) of FIG. 40, the pump portion 21 changes in volume by being driven by the driving portion 20. The driving portion is constituted by including a pump driving gear 27 and a reciprocating member 28. The pump portion 21 is driven by the driving portion 20 so that a volume change amount of the pump portion 21 becomes larger than a total volume from the boundary G1 (connection opening) to the discharge opening 23. The pump portion 21 expands in an upward direction via the pump driving gear 27 and the reciprocating member 28 as shown in part (b) of FIG. 40, and compresses in a downward direction as shown in part (c) of FIG. 40. The pump driving gear 27 includes a gear portion 27*a* and a cam portion 27*b*, and is rotated in an arrow D3 direction of parts (b) and (c) of FIG. 40 by receiving a driving force inputted from the image forming apparatus C.

The pump driving gear 27 is constituted in a cylindrical shape, and is rotatably supported by a supporting member 29 constituted such that an outer peripheral surface is a circumferential surface. The gear portion 27*a* is formed over a full length of a lower end portion of the pump driving gear 27 with respect to a circumferential direction of the outer peripheral surface. At the outer peripheral surface of the pump driving gear 27 and at the upper portion of the gear portion 27*a*, the cam portion 27*b* consisting of a groove portion which causes continuous reciprocating displacement in an axial direction (up-down direction of (a) to (c) of FIG. 40) of the pump driving gear 27 is formed over the full length of the pump driving gear 27 with respect to the circumferential direction of the outer peripheral surface.

By rotation of the pump driving gear 27 in an arrow D3 direction of parts (b) and (c) of FIG. 40, the reciprocating member 28 engaged with the cam portion 27*b* is reciprocated in the up-down direction of parts (b) and (c) of FIG. 40. The reciprocating member 28 engages with an engaging portion 26*b* provided at an upper end portion of a bellow-shaped member 26 constituting a part of the pump portion 21. The reciprocating member 28 is constituted by including a pair of arm portions 28*a* and fixing portions 28*b* each connected to one end portion of each of the pair of arm portions 28*a*, and at the other end portion of each of the arm portions 28*a*, a projected portion 28*c* projecting toward an inside of each of the arm portions 28*a* is provided. The projected portion 28*c* of the reciprocating member 28 is slidably inserted into the groove portion of the cam portion 27*b* of the pump driving gear 27.

As shown in part (a) of FIG. 40, the pump portion 21 is constituted by a part of the bellow-shaped member 26 which is round in cross section when cut in a horizontal direction and which opens at a lower portion. Further, as shown in FIG. 41, the bellow-shaped member 26 includes a bellow portion 26*a* and an engaging portion 26*b* provided at an upper end portion of the bellow portion 26*a*. Further, the bellow-shaped member 26 is constituted by including a fixing portion 26*c* consisting of a cylindrical female-screw portion which is open at a lower end portion of the bellow portion 26*a*. The fixing portion 26*c* is threadably fastened to a cylindrical male-screw portion 28*a* which is open at an upper end portion of the supporting member 29. The engaging portion 26*b* is mounted in the fixing portion 28*b* of the reciprocating member 28.

As shown in part (a) of FIG. 41, the fixing portion 26*c* has a screw-like shape, and the female-screw portion is formed on an inner peripheral surface of the cylindrical portion. Further, the fixing portion 26*c* is rotated in an arrow D4 direction of part (a) of FIG. 41, and is threadably fastened and fixed to the male-screw portion 29*a* of the supporting member 29.

The pump driving gear 27 is rotated in the arrow D3 direction of parts (b) and (c) of FIG. 40 by the driving force inputted from an unshown driving portion of the image forming apparatus C to the gear portion 27*a*. Then, the cam portion 27*b* is rotated integrally with the pump driving gear 27, so that the reciprocating member 28 reciprocates in the up-down direction of parts (b) and (c) of FIG. 40 via the projected portion 28*c* engaged with the groove portion of the cam portion 27*b*. By this, the pump portion 21 locked at an upper end portion to the fixing portion 28*b* of the reciprocating member via the engaging portion 26*b* repeats expansion and contraction as shown in parts (b) and (c) of FIG. 40. The toner is supplied from the toner accommodating portion 22 to the feeding path portion 24 by using negative pressure by the expansion operation of the pump portion 21.

As shown in parts (a) and (b) of FIG. 41, inside the supporting member 29, a first feeding path region 24*a* which is a part of the feeding path portion 24 is provided. Here, the pump portion 21 is a part of the bellow portion 26*a*. On the other hand, the fixing portion 26*c* which does not cause volume change is included in the feeding path portion 24, not the pump portion 21. Therefore, a boundary between the pump portion 21 and the feeding path portion 24 is the boundary G1 between the bellow portion 26*a* and the fixing portion 26*c* of the bellow-shaped member 26.

As shown in FIG. 38, the boundary G1 as the connection opening between the pump portion 21 and the feeding path portion 24 is disposed above a portion where the feeding path portion 24 communicates with the toner accommodating portion 22. Further, a direction in which the pump portion 21 is connected to the feeding path portion is a downward direction, the portion where the feeding path portion 24 communicates with the feeding path portion 24 is disposed below the toner accommodating portion 22.

Here while sandwiching the boundary G1 as shown in FIG. 38, a volume of the pump portion 21 is set so as to become larger than a volume of the feeding path portion 24 (hatched portion of FIG. 38). Further, as shown in FIGS. 1 and 38, the volume of the pump portion 21 is set so as to become larger than a volume of a sum of the volume of the feeding path portion 24 and a volume of the main assembly path portion 1. In this embodiment, the volume of the pump portion 21 is 10 cc, and the volume of the sum of the volumes of the feeding path portion 24 and the main assembly path portion 1 is 3 cc.

Further, the volume of the sum of the volumes of the feeding path portion 24 and the main assembly path portion 1 is smaller than the volume change amount of the pump portion 21. By this, even in a combination of a long feeding path portion 24 with the main assembly path portion 1 or in a combination of a bent feeding path portion 24 with the main assembly path portion 1, toner feeding can be made easy by an expansion/contraction operation of the pump portion 21.

Further, the boundary G1 of the pump portion 21 with the feeding path portion 24 is provided at a position higher with respect to a vertical direction than the communication opening 25 provided at the boundary between the toner accommodating portion 22 and the feeding path portion 24, further, when the pump portion 21 and the toner accommodating portion 22 shown in FIG. 38 are viewed in a horizontal direction (X axis direction), a range of the pump portion 21 in the vertical direction (Y axis direction) in FIG. 38 is a range 21*a*, and similarly a range of the toner accommodating portion 22 in the vertical direction (Y axis direction) in FIG. 38 is a range 22*a*. At this time, the range 21*a* and the range 22*a* are set in an overlapping range in the vertical direction. That is, the pump portion 21 is disposed at an overlapping position with the toner accommodating portion 22 in the vertical direction when viewed in the horizontal direction.

The pump portion 21 repeats the expansion/contraction operation. The toner supplied into the feeding path portion 24 is fed in the feeding path portion 24 by a flow of air in the arrow D2 generated during compression of the pump portion 21, and is supplied into the main assembly path portion 1 provided in the apparatus main assembly C1 of the image forming apparatus C through the discharge opening 23. Further, the toner is supplied into the toner accommodating portion 17 through the receiving portion 18, provided in the toner accommodating portion 17 of the process cartridge A, with which the other end portion of the main assembly path portion communicates. The main assembly path portion 1 shown in FIG. 1 is constituted by a hollow tube shape.

<Effect of Pump Portion>

The volume of the pump portion 21 is set so as to be larger than the volume of the sum of the volume of the feeding path portion 24 and the volume of the main assembly path portion 1. By this, the toner carried to the feeding path portion 24 through the communication opening 25 of the toner accommodating portion 22 by the extraction/contraction operation of the pump portion 21 can be fed from the feeding path portion 24 to an outside of the discharge opening 23. Further, the toner is fed through the main assembly path portion 1 to the receiving portion 18 provided in the toner accommodating portion 17, so that the toner can be supplied into the toner accommodating portion 17. In this embodiment, the volume of the pump portion 21 is about 10 cc, and the volume of the sum of the volumes of the feeding path portion 24 and the main assembly path portion 1 is about 3 cc. By this, the volume of the pump portion 21 is set so as to be twice or more the volume of the feeding path portion 24.

Incidentally, a relationship between the volume of the pump portion 21 and the volume of the sum of the volumes of the feeding path portion 24 and the main assembly path portion is not limited thereto, but may be appropriately set depending on a kind of the toner fed, or a higher or a distance in which the toner is fed. The volume of the pump portion 21 is made twice or more the volume of the feeding path portion 24, whereby the toner can be stably discharged by the expansion/contraction operation without leaving the toner in the feeding path portion 24.

Further, as shown in FIG. 38, a (toner) discharging direction of the pump portion 21 is disposed downward, whereby the toner can be made hard to enter the pump portion 21 during suction of air by the pump portion 21. Further, in the vertical direction shown in FIG. 38, the boundary G1 between the pump portion 21 and the feeding path portion 24 is provided at a position higher than the communication opening 25 of the toner accommodating portion 22. By this, it is possible to suppress that the toner accommodated in the toner accommodating portion 22 enters the pump portion 21 via the feeding path portion 24 during transportation or the like of the toner cartridge B. Further, when the pump portion 21 is viewed in the horizontal direction of FIG. 38, the pump portion 21 is disposed at an overlapping position with the toner accommodating portion 22 in the vertical direction of FIG. 38. By this, the toner cartridge B can be downsized in the vertical direction.

<Feeding Path Portion>

Figure 42:
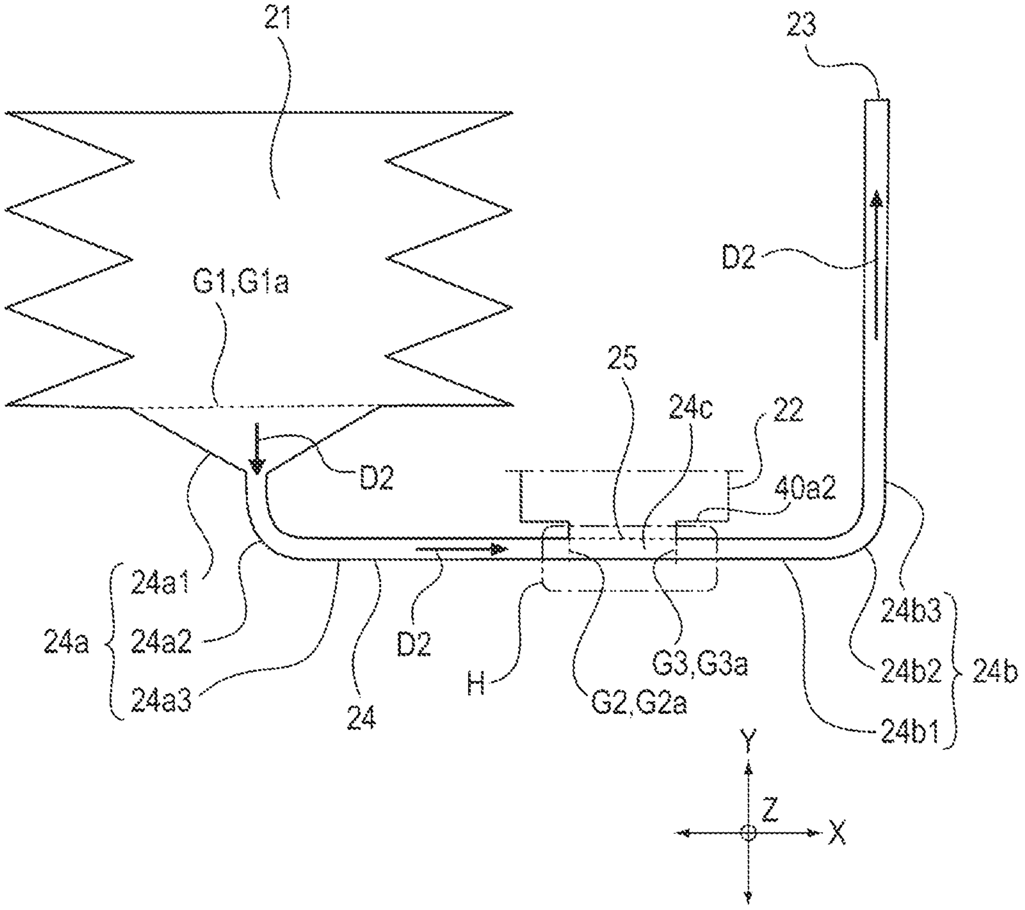
In FIG. 42, part (a) is a sectional view showing a constitution of the pump portion and a feeding path portion of the seventh embodiment. Part (b) is an enlarged view of an H portion of part (a).
Figure 42:
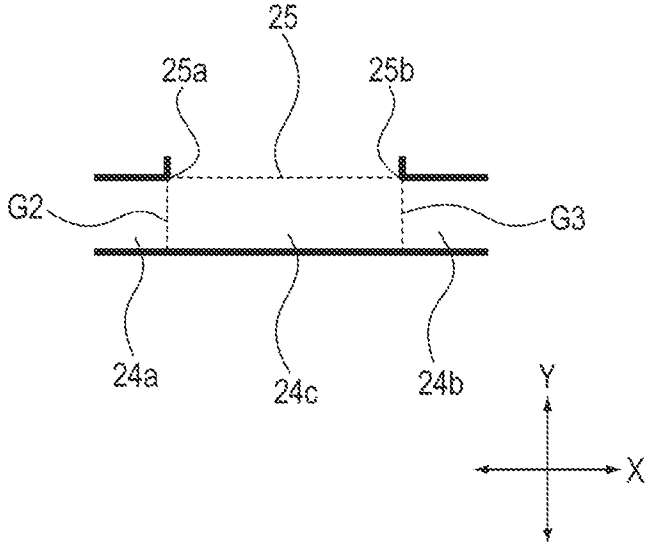

Next, a constitution of the feeding path portion 24 will be described using FIGS. 38 and 42. Part (a) of FIG. 42 is a sectional view showing constitutions of the pump portion 21 and the feeding path portion 24 in this embodiment. Part (b) of FIG. 42 is an enlarged view of an H portion of part (a) of FIG. 42.

A range of the feeding path portion 24 indicated by a hatched portion of FIG. 38 is a range from the boundary G1 between the pump portion 21 and the feeding path portion 24 to the discharge opening 23 in the arrow D2 direction which is a direction in which the air generated during compression of the pump portion 21 flows. At an intermediary portion of the feeding path portion 24, the feeding path portion 24 communicates with the communication opening 25 of the toner accommodating portion 22.

As shown part (a) of FIG. 42, the feeding path portion 24 includes a first feeding path region 24*a* connected to the pump portion 21 and a second feeding path region 24*b* connected to the discharge opening 23. Further, the feeding path portion 24 includes a third feeding path region 24*c* connected to the first feeding path region 24*a*, the second feeding path region 24*b*, and the communication opening of the toner accommodating portion 22. As shown in part (b) of FIG. 42, the first feeding path region 24*a* and the third feeding path region 24*c* are sectioned by a boundary G2, and the second feeding path region 24*b* and the third feeding path region 24*c* are sectioned by a boundary G3.

The boundary G2 is a cross section of the feeding path portion 24 including an end portion 25*a*, on the pump portion 21 side, of the communication opening 25 of the toner accommodating portion 22 contacting the feeding path portion 24. The boundary G3 is a cross section of the feeding path portion 24 including an end portion 25*b*, on the discharge opening 23 side, of the communication opening 25 of the toner accommodating portion 22 contacting the feeding path portion 24.

The first feeding path region 24*a* is a region, on the pump portion 21 side, of the feeding path portion 24 from the boundary G1 to the boundary G2 shown in part (a) of FIG. 42. The second feeding path region 24*b* is a region, on the discharge opening 23 side, of the feeding path portion 24 from the boundary G3 to the discharge opening 23 shown in part (a) of FIG. 42. The second feeding path region 24*b* is a portion on the discharge opening 23 side (discharge opening side) than the boundary G3 which is a portion where the feeding path portion communicates with the toner accommodating portion 22.

In the second feeding path region 24*b*, the boundary G3 which is one end on the side where the feeding path portion 24 communicates with the toner accommodating portion 22 is disposed at a position lower in the vertical direction them the discharge opening 23 which is the other end. The third feeding path region 24*c* is a region, from the boundary G2 to the boundary G3, other than the first feeding path region 24*a* and the second feeding path region 24*b* in the feeding path portion 24 shown in parts (a) and (b) of FIG. 42.

<First Feeding Path Region>

A constitution of the first feeding path region 24*a* will be described using FIG. 42. The first feeding path region 24*a* shown in part (a) of FIG. 42 is constituted by including a funnel-shaped portion 24*a*1 connected to the pump portion 21, a tubular bent portion 24*a*2 connected to the funnel-shaped portion 24*a*2, and a tubular rectilinear portion 24*a*3 connected to the bent portion 24*a*2. These portions are smoothly connected to each other. In the case where a cross-sectional area of each of opposite end portions of the first feeding path region 24*a* is considered, when the cross-sectional area of the boundary G1 is G1*a* and the cross-sectional area of the boundary G2 is G2*a*, the following relationship is satisfied.

$$G1a>G2a$$

The first feeding path region 24*a* shown in part (a) of FIG. 42 is a portion on the pump portion 21 side (pump portion side) than the portion where the feeding path portion 24 communicates with the toner accommodating portion 22. In the first feeding path region 24*a*, the cross-sectional area G1*a* of the boundary G1 (connection opening) is larger than the cross-sectional area G2*a* of the boundary G2 which is the portion where the feeding path portion 24 communicates with the toner accommodating portion 22. Further, in the first feeding path region 24, the boundary G2 as one end on the side where the feeding path portion 24 communicates with the toner accommodating portion 22 is disposed at the lowest position in the vertical direction.

<Effect of First Feeding Path Region>

As described above, the first feeding path region 24*a* is capable of freely disposing a position of the pump portion 21 by including the bent portion 24*a*2. Further, by including the bent portion 24*a*2, the boundary G1 which is the connection opening of the pump portion 21 can be disposed downward in the vertical direction. By this, the toner can be made hard to enter the pump portion 21.

Further, the relationship between the cross-sectional areas of the opposite end portions of the first feeding path region 24*a* is made to satisfy G1*a*>G2*a*, so that a flow rate of air stream generated in the pump portion 21 can be made fast in the first feeding path region 24*a*. By this, the toner can be sent to a higher place or a more distant place by the extraction/contraction operation of the pump portion 21.

Further, in the first feeding path region 24*a*, the boundary G2 side is provided at the lowest position in the vertical direction. By this, the toner accommodated in the toner accommodating portion 22 becomes hard to enter a region of the first feeding path region 24*a* from the bent portion 24*a*2 to the funnel-shaped portion 24*a*1, and therefore, stability of a toner feeding amount can be realized.

<Second Feeding Path Region>

Next, a constitution of the second feeding path region 24*b* will be described using FIG. 42. The second feeding path region 24*b* shown in part (a) of FIG. 42 is constituted by including a tubular rectilinear portion 24*b*1 connected to the third feeding path region 24*c*, a tubular bent portion 24*b*2 connected to the rectilinear portion 24*b*1, and a tubular rectilinear portion 24*b*3 connected to the bent portion 24*b*2. The respective portions are smoothly connected to each other.

Incidentally, an inner diameter of each of the rectilinear portions 24*b*1 and 24*b*3 and the bent portion 24*b*2 is 4 mm. Further, the second feeding path region 24*b* extends upward in the vertical direction from the bent portion 24*b*2 over the rectilinear portion 24*b*3, and the discharge opening 23 provided at an end portion of the rectilinear portion 24*b*3 is disposed at a position higher than the third feeding path region 24*c* in the vertical direction.

Further, as shown in part (a) of FIG. 42, the second feeding path region 24*b* is a portion on the discharge opening 23 side (discharge opening side) than a portion of the feeding path portion 24 communicating with the toner accommodating portion 22. Further, in the second feeding path region 24*b*, the boundary G3 is disposed at the lowest position with respect to the vertical direction. Further, the second feeding path region 24*b* feeds the air sent from the pump portion 21 and the toner supplied from the toner accommodating portion 22. For this reason, it is desirable that in the air flowing direction, an abutting change in cross-sectional area such as a stepped portion is small.

<Effect of Second Feeding Path Region>

As described above, the second feeding path region 24*b* includes the bent portion 24*b*2, so that a position of the discharge opening 23 can be freely disposed. Further, in the second feeding path region 24*b*, the boundary G3 side is provided at the lowest position in the vertical direction. By this, the toner in the toner accommodating portion 22 becomes hard to enter a region from the bent portion 24*b*2 to the rectilinear portion 24*b*3 of the second feeding path region 24*b*, and therefore, stabilization of the toner feeding amount can be realized.

<Third Feeding Path Region>

Figure 43:
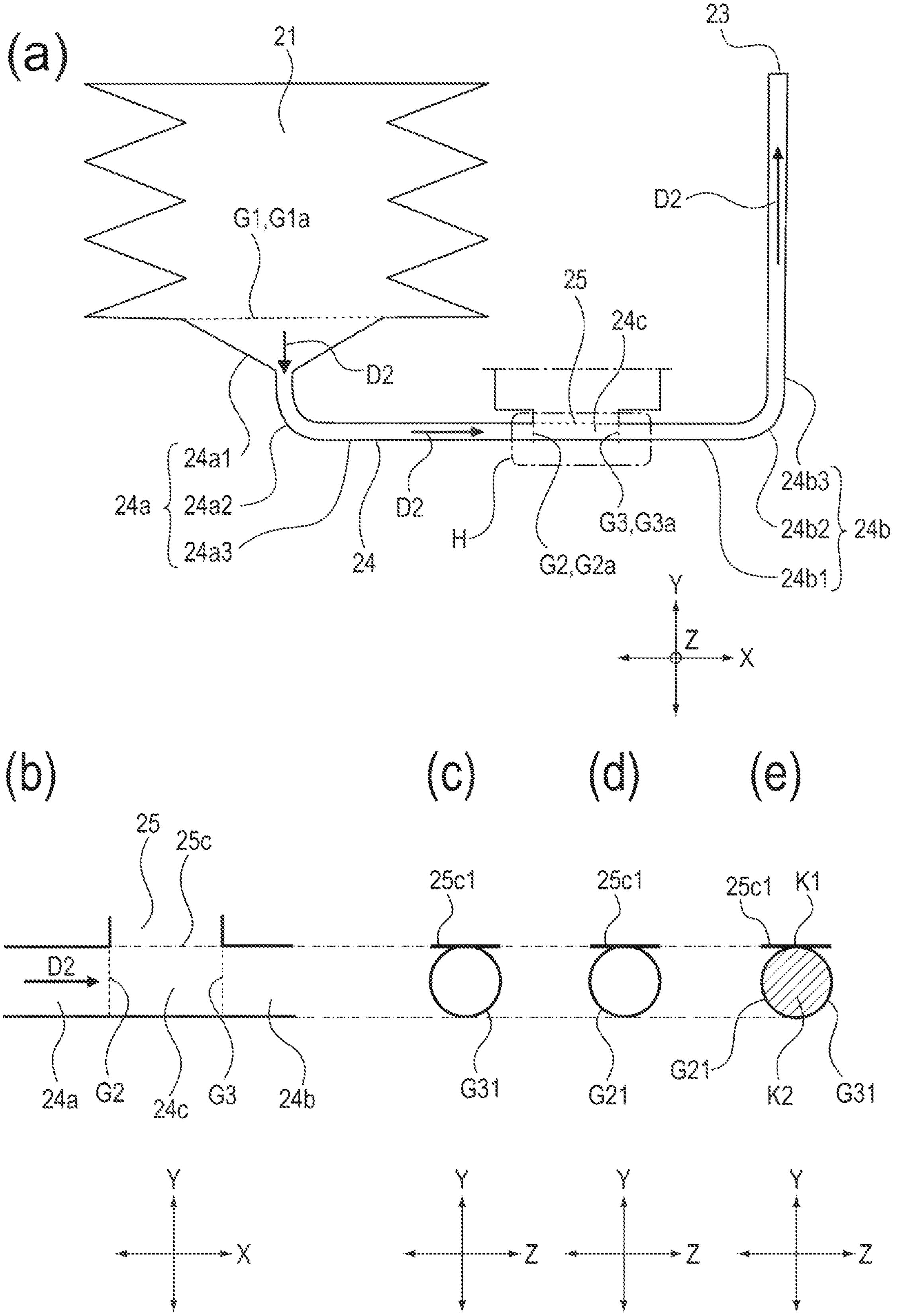
In FIG. 43, part (a) is a sectional view of the pump portion and the feeding path portion of the seventh embodiment which are viewed from a Z axis direction. Part (b) is an enlarged view of an H portion of part (a). Parts (c) to (e) are views showing an outer configuration when a communication opening is projected in an air flowing direction when the pump portion is compressed, an outer configuration when a boundary G3 is projected, and an outer configuration when a boundary G2 is projected.

Next, a constitution of the third feeding path region 24*c* will be described using FIGS. 38, 42 and 43. Part (a) of FIG. 43 is a sectional view of the pump portion 21 and the feeding path portion 24 in this embodiment as viewed in the Z axis direction. Part (b) of FIG. 43 in an enlarged view of an H portion of part (a) of FIG. 43. Part (c) of FIG. 43 is a schematic view showing an outer configuration 25*c*1 when a cross section 25*c* of the communication opening 25 on the feeding path portion 24 side is projected in a direction in which the air when the pump portion 21 is compressed flows, and showing an outer configuration G31 when the boundary G3 is projected in the direction.

Part (d) of FIG. 43 is a schematic view showing the outer configuration 25*c*1 and an outer configuration G21 when the boundary G2 is projected in the direction in which the air when the pump portion 21 is compressed flows. The arrow D2 direction is the direction in which the air when the pump portion 21 is compressed flows. A superposed view of these outer configurations consisting of the outer configuration 24*c*1, the outer configuration G31, and the outer configuration G21 is shown in part (e) of FIG. 43.

The third feeding path region 24*c* is a portion where the toner in the toner accommodating portion 22 is received in the feeding path portion 24 through the communication opening 25. The third feeding path region 24*c* is disposed below the toner accommodating portion 22 and at a lowermost portion in the feeding path portion 24 in the vertical direction. The volume of the third feeding path region 24*c* may be a volume in conformity to an amount of the toner intended to be fed, but in the neighborhoods of the boundary G2 and the boundary G3 shown in part (b) of FIG. 42, it is desirable that an abrupt change in cross section such as a stepped portion is small.

In this embodiment shown in FIG. 43, an example of the case where a cross-sectional area G2*a* of the boundary G2 between the first feeding path region 24*a* and the third feeding path region 24*c* and a cross-sectional area G3*a* of the boundary G3 between the second feeding path region 24*b* and the third feeding path region 24*c* are equal to each other is shown.

As shown in part (e) of FIG. 43, an area of the outer configuration when the cross section 25*c* of the communication opening 52 on the feeding path portion 24 side is projected in the arrow D2 direction becomes substantially 0. On the other hand, an area of the outer configuration G21 when the boundary G2 is projected in the arrow D2 direction and an area of the outer configuration G 31 when the boundary G3 is projected in the arrow D2 direction are substantially equal to each other.

For this reason, an area K2 of a region indicated by a hatched line of part (e) of FIG. 43 in which the outer configuration G21 overlaps with the outer configuration G31 is larger than an area K1 (=0) of a region in which the outer configuration G21 overlaps with the outer configuration 25*c*1 (K1<K2).

That is, in the direction in which the air when the pump portion 21 is compressed flows, the outer configuration G21 and the outer configuration 25*c*1 shown in part (e) of FIG. 43 are compared with each other. Here, the outer configuration G21 is an outer configuration such that the cross section of the boundary G2 which is a position, on the pump portion 21 side, of the feeding path portion 24 at a portion with which toner accommodating portion 22 communicates is projected in the arrow D2 direction. Further, the outer configuration 25*c*1 is an outer configuration such that the cross section 25*c* of a portion, on the toner accommodating portion 22 side (developer accommodating portion side), of the feeding path portion 24 at a portion with which the toner accommodating portion 22 communicates is projected in the arrow D2 direction. At this time, as regards the outer configuration G21, the area K2 in which the opening G21 overlaps with the outer configuration G31 when the cross section of the boundary G3 as the portion, on the discharge opening 23 side, of the feeding path portion 24 at the portion with which the toner accommodating portion 22 communicates is larger than the outer configuration 25*c*1.

By this, the air flowing from the first feeding path region 24*a* when the pump portion 21 is compressed substantially does not flow toward the communication opening 25, but is easy to flow toward the second feeding path region 24*b* unilaterally. By this, stabilization of the feeding amount of the toner fed in the feeding path portion 24 can be realized.

According to this embodiment, the pump portion 21 and the discharge opening 23 are caused to communicate with each other by the feeding path portion 24. Further, then, the volume of the feeding path portion 24 is set so as to be smaller than the volume change amount of the pump portion 21. By this, even when a long feeding path portion 24 or a bent feeding path portion 24 is employed, a degree of freedom of a distance and a direction to a supply destination of the toner is improved.

<Opposite Region Forming Portion>

Figure 44:
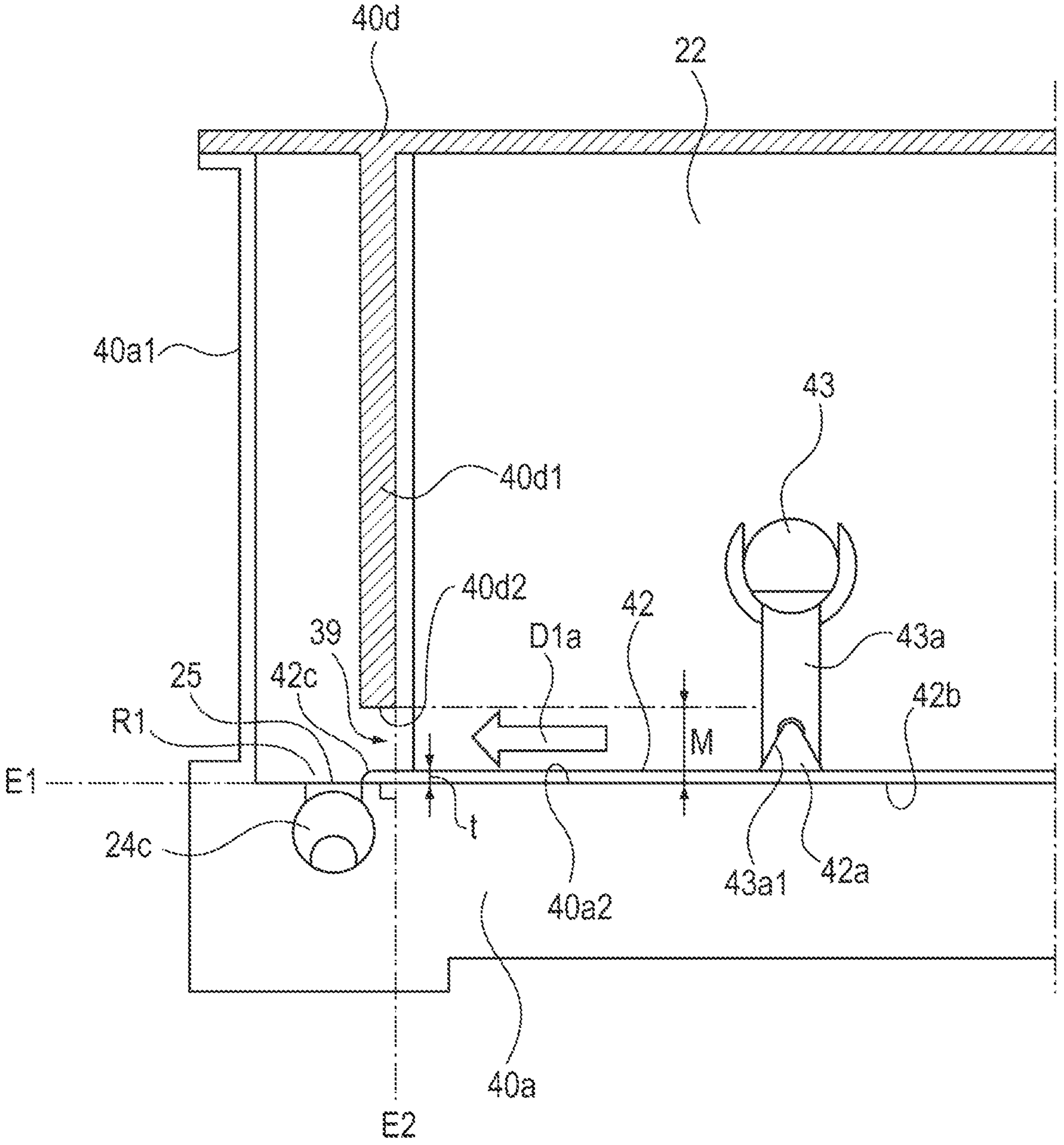
FIG. 44 is a sectional view showing a constitution of an opposing region forming portion provided in a toner accommodating portion of the seventh embodiment.

Next, using FIG. 44, a constitution of an opposing region forming portion 40*d*1 provided in the toner accommodating portion 22 will be described. FIG. 44 is a sectional view showing the constitution of the opposing region forming portion 40*d*1 provided in the toner accommodating portion 22 of this embodiment. As shown in FIG. 44, the toner accommodating portion 22 is constituted by including the frame 40*a*, the cap member 40*d*, the feeding member 42, and the feeding shaft 43.

As shown in FIG. 44, the opposing region forming portion 40*d*1 is formed by a projected portion extended downward from a lower surface of the cap member 40*d* toward the communication opening 25. The opposing region forming portion 40*d*1 is the projected portion projected from an inner wall surface of the toner accommodating portion 22 toward an inside. Further, the opposing region forming portion 40*d*1 is constituted by a part of the inner wall surface of the toner accommodating portion 22.

The opposing region forming portion 40*d*1 is provided at a position on a side opposite from the side plate 40*a*1 of the frame 40*a* with the communication opening 25 as a boundary. The opposing region forming portion 40*d*1 includes an opposing surface 40*d*2 opposing the communication opening 25. The opposing region forming portion 40*d*1 forms an opposing region R1, of an inside space of the toner accommodating portion 22, which opposes the communication opening 25 and which encloses the communication opening 25 by partitioning the opposing region R1 from another region. A volume of the opposing region is smaller than a volume of another region.

The opposing region forming portion 40*d*1 is disposed on a side upstream of the communication opening 25 in the toner feeding direction shown by the arrow D1*a* direction. The opposing region forming portion 40*d*1 restricts the amount of the toner (amount of the developer) moving from the toner accommodating portion 22 toward the feeding path portion 24.

By (partition) forming the opposing region R1 opposing the communication opening 25, when the pump portion 21 performs the expansion operation, the amount of the toner supplied from the communication opening 25 to the feeding path portion 24 can be made stable and hard to become excessive. By this, it is possible to suppress an occurrence of toner clogging in the feeding path portion 24.

The opposing region R1 and another region are caused to communicate with each other via a second communication opening 39. The communication opening 39 is formed between the opposing surface 40*d*2 of the opposing region forming portion 40*d*1 and the bottom 40*a*2 of the toner accommodating portion 22 (or an upper surface of the feeding member 42). The bottom 40*a*2 of the toner accommodating portion 22 is constituted by a part of the frame 40*a*. In this embodiment, a gap M between the opposing surface 40*d*2 of the opposing region forming portion 40*d*1 and the bottom 40*a*2 of the toner accommodating portion 22 is constituted by 10 mm, but the present invention is not limited to this constitution.

A first flat plane E1 where the communication opening 25 is formed and a second flat plane E2 where the second communication opening 39 is formed cross substantially at right angles. By this, the flow of the toner is deflected, whereby flow of excessive toner into the communication opening 25, so that the toner can be supplied to the feeding path portion 24 more stably.

Further, the second communication opening 39 is smaller than the communication opening 25. By this, during the expansion operation (suction of air) of the pump portion 21, it is advantageous in that the amount of the toner drawn in the feeding path portion 24 is effectively suppressed.

<Feeding Member>

Next, using FIG. 44, a constitution of the feeding member 42 will be described. As shown in FIG. 44, the feeding member 42 is a plate-like member for feeding the toner.

Further, in this embodiment, the feeding member 42 is constituted by a plate-like member of 1 mm in thickness t. Further, a V-shaped recessed portion provided at a free end portion of the arm portion 43*a* projected from the feeding shaft 43 connected to the unshown driving source in a direction perpendicular to the axis direction of the feeding shaft 43, and a V-shaped projected portion 42*a* partially projected from an upper surface of the feeding member 42 are swingably connected to each other. Incidentally, drive of the feeding member 42 is not limited to this constitution.

Further, an arrangement such that the feeding member 42 passes through between the feeding shaft 43 and the bottom 40*a*2 of the toner accommodating portion 22 so that a lower surface 42*b* of the feeding member 42 extends along the bottom 40*a*2 of the toner accommodating portion 22 is employed. The feeding member 42 is constituted so that in the arrow D1*a* direction, a leading end portion 42*c* of the feeding member 42 is capable of entering the communication opening 39 formed between the opposing surface 40*d*2 of the opposing region forming portion 40*d*1 and the bottom 40*a*2 of the toner accommodating portion 22.

<Feeding Path Portion>

Figure 45:
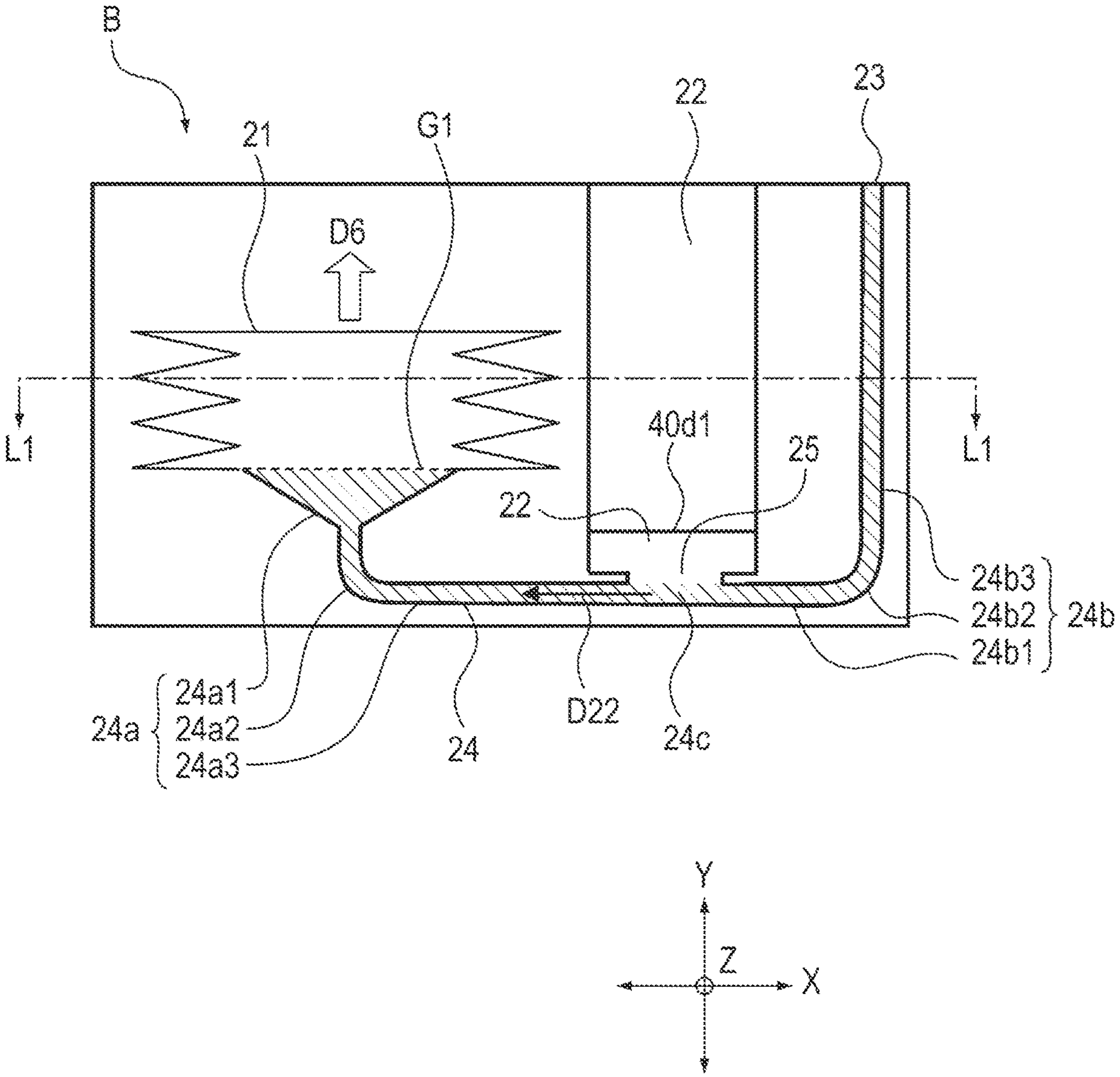
FIG. 45 is a sectional view showing a constitution of the pump portion, the feeding path portion, and the opposing region forming portion provided in the toner accommodating portion in the seventh embodiment.

FIG. 45 is a sectional view showing constitutions of the pump portion 21 and the feeding path portion 24. As shown in FIG. 45, the toner cartridge B includes the toner accommodating portion 22 accommodating the toner thereon, the pump portion 21 for creating a flow of the air by a volume change, and the discharge opening 23 through which the toner is discharged. The toner cartridge B further includes the feeding path portion 24 which connects the pump portion 21 and the discharge opening 23 and which is shown by hatching of FIG. 45, and includes, at an intermediary portion of the feeding path portion 24, the communication opening 25 through which the feeding path portion 24 is connected to the toner accommodating portion 22.

<Suppression of Toner Supply Amount by Opposing Region Forming Portion>

Next, using FIG. 44 and FIG. 45, a restricting action of the toner supply amount by the opposing region forming portion 40*d*1 will be described. As shown in FIG. 44, the toner fed toward the arrow D1*a* direction by the feeding member 42 is partially scraped off the feeding member 42 by the opposing region forming portion 40*d*1 provided on the cap member 40*d*. For this reason, the toner on the feeding member 42 passes through the communication opening 39 formed between the opposing region forming portion 40*d*1 and the feeding member 42 and moves toward the communication opening 25. Thus, the amount of the toner moving toward the communication opening 25 is restricted by the opposing region forming portion 40*d*1, so that the toner is supplied, through the communication opening 25, to the third feeding path region 24*c* of the feeding path portion by gravitation.

Further, as shown in FIG. 45, by the expansion operation of the pump to portion 21 in an arrow D6 direction, the air flows toward an arrow D22 direction the air generated during the expansion of the pump portion 21 flows. By the negative pressure generates at this time, the air is sucked from the discharge opening 23 through the second feeding path region 24*b* of the feeding path portion 24 and from the communication opening 25 through the third feeding path region 24*c* of the feeding path portion 24.

At this time, the toner is supplied together with the air from the toner accommodating portion 22 to the third feeding path region 24*c* of the feeding path portion 24 through the communication opening 25. Here, a space in the neighborhood of the communication opening 25 of the toner accommodating portion 22 is constituted so as to be narrow by the opposing region forming portion 40*d*1. For this reason, the amount of the toner supplied together with the air flowing toward the arrow D22 direction to the first feeding path region 24*a* of the feeding path portion 24 by the expansion operation of the pump portion 21 is restricted.

<Effect of Opposing Region Forming Portion>

The amount of the toner supplied to the feeding path portion 24 through the communication opening 25 is restricted by the opposing region forming portion 40*d*1. By this, it is possible to prevent the clogging of the toner in the first feeding path region 24*a*, the second feeding path region 24*b*, and the third feeding path region 24*c* of the feeding path portion 24 due to an excessive supply amount of the toner from the toner accommodating portion 22.

Supply of the toner from the toner accommodating portion 22 to the feeding path portion 24 by way of the communication opening 25 is intended to be made by the self-weights of the feeding member 42 and the toner. Accordingly, the toner drawn into the feeding path portion 24 by the expansion operation of the pump portion 21 is not originally intended. When the amount of the toner drawn by the expansion operation of the pump portion 21 is large, the amount of the toner fed by the contraction operation of the pump portion 21 becomes excessive, so that toner clogging in the feeding path portion 24 occurs. For this reason, in the expansion operation (suction of the air) of the pump portion 21, the amount of the toner drawn from the toner accommodating portion 22 into the feeding path portion 24 by way of the communication opening 25 can be suppressed by the opposing region forming portion 40*d*1.]

First Modified Embodiment

Figure 46:
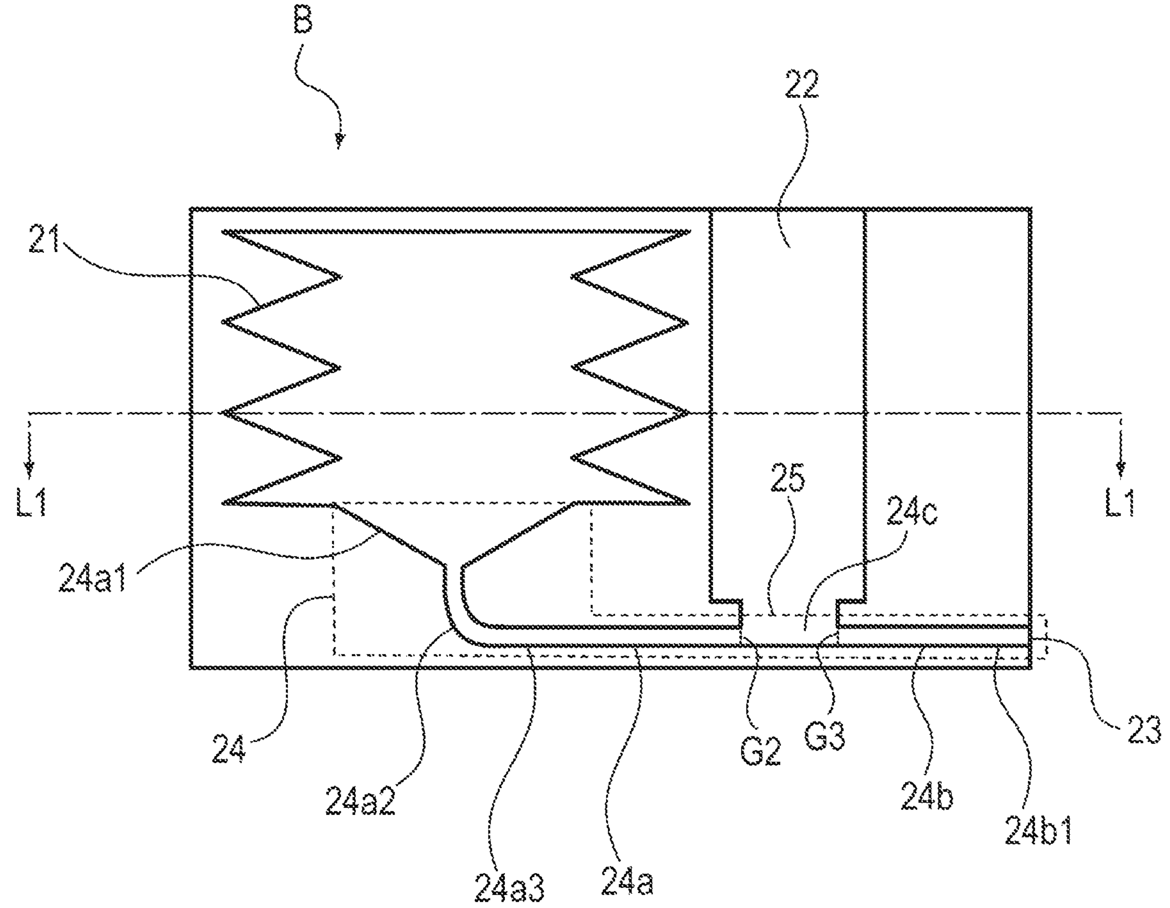
FIG. 46 is a sectional view showing a constitution of a pump portion and a feeding path portion of a first modified embodiment of the seventh embodiment.

Next, constitutions of a pump portion 21 and a feeding path portion 24 in a first modified embodiment of this embodiment will be described using FIG. 46. FIG. 46 is a sectional view showing the constitutions of the pump portion 21 and the feeding path portion 24 in the first modified embodiment of the seventh embodiment. A second feeding path region 24*b* of the toner cartridge B shown in FIG. 46 is provided with a discharge opening 23 at an end portion of a tubular rectilinear portion 24*b*1 connected to a third feeding path region 24*c*. Thus, the second feeding path region 24*b* extending from the third feeding path region 24*c* to the discharge opening 23 may be disposed in the horizontal direction.

In this modified embodiment, as shown in FIG. 46, in the second feeding path region 24*b* which is a portion on the discharge opening 23 side than a boundary G3, the boundary G3 which is one end is disposed at the same height (level) as the discharge opening 23 which is the other end in the vertical direction. Here, the boundary G3 is one end on a side of the feeding path portion 24 where the toner accommodating portion 22 communicates with the feeding path portion 24.

At this time, the discharge opening 23 is provided with an unshown shutter member on an outside of the toner cartridge B, the toner accommodated in to the toner cartridge B is prevented from leaking out to the outside, by the shutter member.

Second Modified Embodiment

Figure 47:
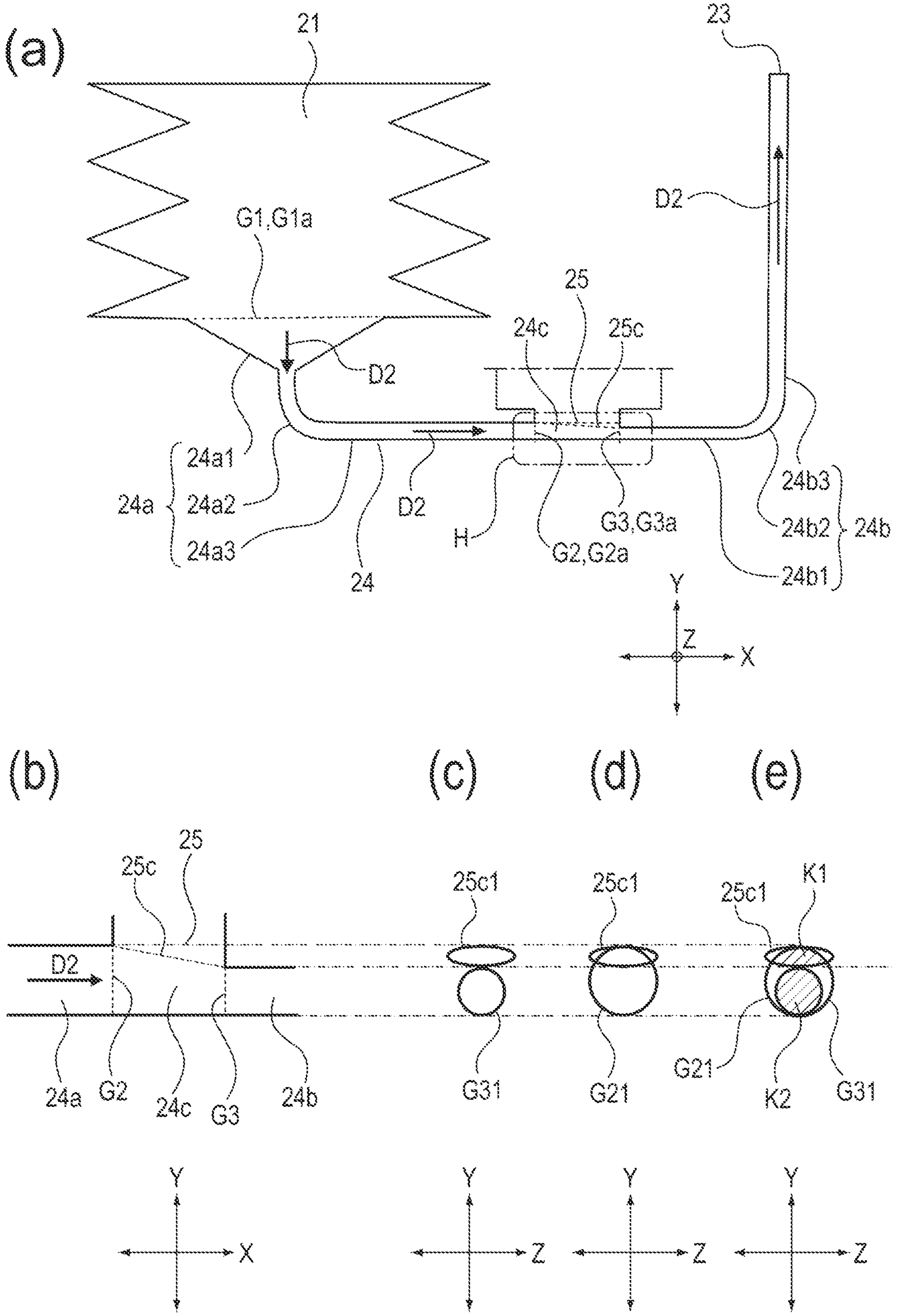
In FIG. 47, part (a) is a sectional view of a pump portion and a feeding path portion of a second modified embodiment of the seventh embodiment which are viewed from the Z axis direction. Part (b) is an enlarged view of an H portion of part (a). Parts (c) to (e) are views showing an outer configuration when a communication opening is projected in the air flowing direction when the pump portion is compressed, an outer configuration when a boundary G3 is projected, and an outer configuration when a boundary G2 is projected.

Next, constitutions of a pump portion 21 and a feeding path portion 24 in a second modified embodiment of this embodiment will be described using FIG. 47. Part (a) of FIG. 47 is a sectional view of the pump portion 21 and the feeding path portion 24 in the second modified embodiment of this embodiment as viewed in the Z axis direction. Part (b) of FIG. 47 is an enlarged view of an H portion of part (a) of FIG. 47. Part (c) of FIG. 47 is a schematic view showing an outer configuration 25*c*1 and an outer configuration G31. Part (d) of FIG. 47 is a schematic view showing the outer configuration and an outer configuration G21. Part (e) of FIG. 47 is a schematic view in which three outer configurations consisting of the outer configuration 25*c*1, the outer configuration G31, and the outer configuration G21 are caused to overlap with each other.

In the axis direction embodiment with reference to FIG. 42, an example in which a cross-sectional area G2*a* of a boundary G2 and a cross-sectional area G3*a* of the boundary G3 are equal to each other was described. In this modified embodiment, as shown in parts (a) and (b) of FIG. 47, an example in the case where the cross-sectional area G2*a* of the boundary G2 and the cross-sectional area G3*a* of the boundary G2 are different from each other is employed. As shown in part (e) of FIG. 47, an area K2 of a region indicated by a hatched line of part (e) of FIG. 47 in which the outer configuration G21 overlaps with the outer configuration G31 is larger than an area K1 of a region indicated by a hatched line of part (e) of FIG. 47 in which the outer configuration G21 overlaps with the outer configuration 25 c1 (K1<K2).

The boundary G2 is a portion, on the pump portion 21 side, of the feeding path portion at a communicating portion of the communicating opening 25. The boundary G3 is a portion, on the discharge opening 23 side, of the feeding path portion 24 at the communicating portion of the communicating opening 25. As regards the outer configuration G21 when the cross section of the boundary G2 is projected in a direction in which the air when the pump portion 21 is compressed flows, the area K2 in which the outer configuration G21 overlaps with the outer configuration G31 when the cross section of the boundary G3 is projected in the direction in which the air when the pump portion 21 is compressed flows than an area in which the outer configuration G21 overlaps with the outer configuration 25*c*1. By this, the air flowing from the first feeding path region 24*a* when the pump portion 21 is compressed is easy to flow toward the second feeding path region 24*b* in a large amount.

Second Comparison Example

Figure 48:
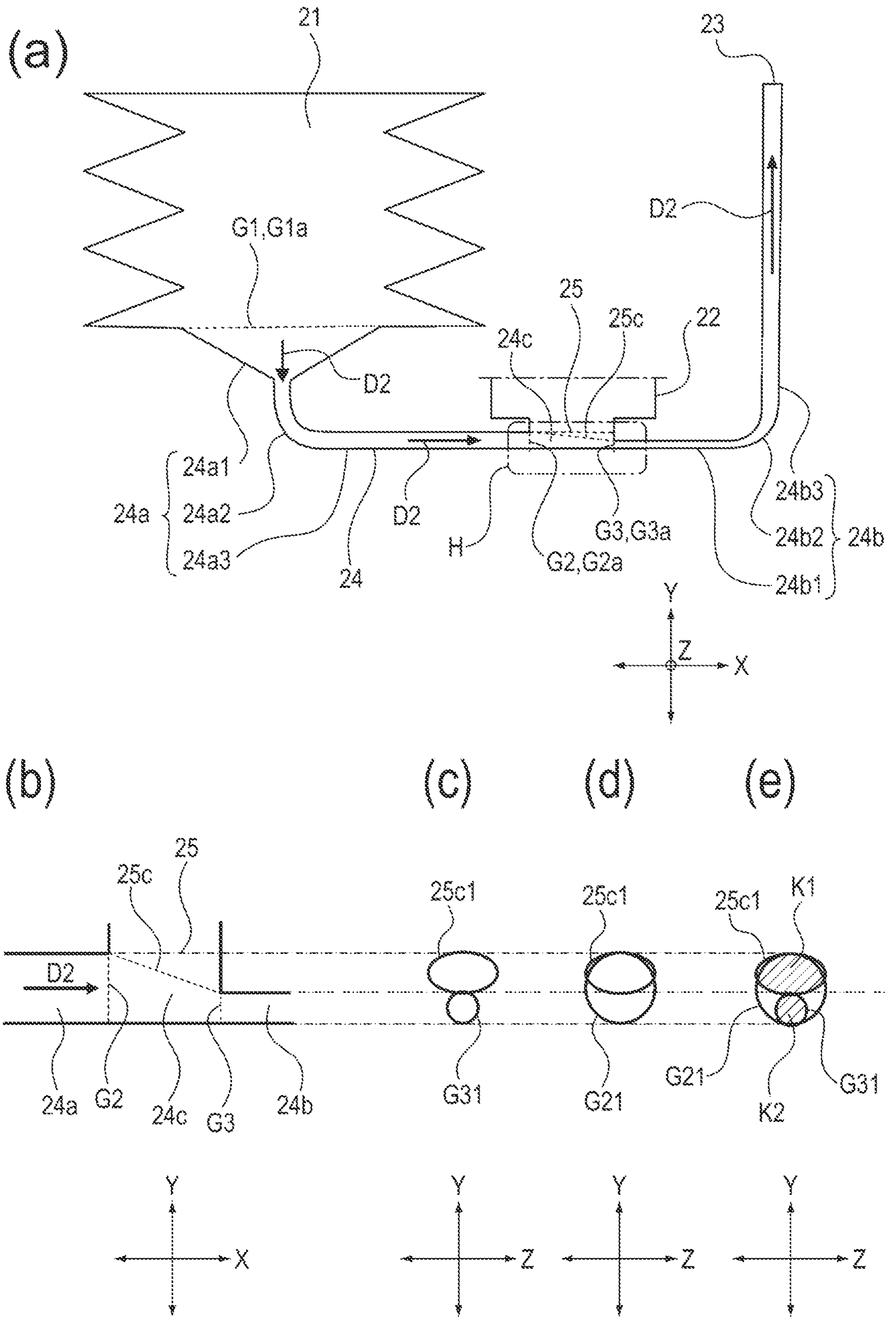
In FIG. 48, part (a) is a sectional view of a pump portion and a feeding path portion of a second comparison example which are viewed from the Z axis direction. Part (b) is an enlarged view of an H portion of part (a). Parts (c) to (e) are views showing an outer configuration when a communication opening is projected in the air flowing direction when the pump portion is compressed, an outer configuration wen a boundary G3 is projected, and an outer configuration when a boundary G2 is projected.

Next, constitutions of a pump portion 21 and a feeding path portion 24 in a second comparison example will be described using FIG. 48. Part (a) of FIG. 48 is a sectional view of the pump portion 21 and the feeding path portion 24 in this comparison example as viewed in the Z axis direction. Part (b) of FIG. 48 is an enlarged view of an H portion of part (a) of FIG. 48. Part (c) of FIG. 48 is a schematic view showing an outer configuration 25*c*1 and an outer configuration G31. Part (d) of FIG. 48 is a schematic view showing an outer configuration 25*c*1 and an outer configuration G21. Part (e) of FIG. 10 48 a schematic view in which three outer configurations consisting of the outer configurations 25*c*1, G31 and G21 are caused to overlap with each other.

In this comparison example, as shown in part (b) of FIG. 48, an example of the case where a difference between a cross-sectional area G2*a* of a boundary G2 and a cross-sectional area G3*a* of a boundary G3 is further larger than the difference in the axis direction second modified embodiment shown in part (b of FIG. 47 will be described.

As shown in part (e) of FIG. 48, an area K2 of a region indicated by a hatched line of part (e) of FIG. 48 in which the outer configuration G21 overlaps with the outer configuration G31 is smaller than an area K1 of a region indicated by a hatched line of part (e) of FIG. 48 in which the outer configuration G21 overlaps with the outer configuration 25*c*1 (K1>K2). By this, the air flowing from the first feeding path region 24*a* when the pump portion 21 is compressed flows toward the second feeding path region 24*b* in a large amount.

In order to prevent this, setting is made so that the area K2 of the region in which the outer configuration G21 overlaps with the outer configuration G31 becomes larger than the area K1 of the region in which the outer configuration G21 overlaps with the outer configuration 25*c*1. By this, the air flowing from the first feeding path region 24*a* is easier to flow toward the second feeding path region 24*b* than toward the communication opening 25, so that stabilization of the feeding amount of the toner fed in the feeding path portion 24 can be realized. For this reason, as shown in FIG. 43, it is desirable that the area K2 in which the outer configuration G31 and the outer configuration G21 overlap with each other is increased.

<Effect of Third Feeding Path Region>

As described above, the third feeding path region 24*c* is provided below the toner accommodating portion 22. For this reason, the toner in the toner accommodating portion 22 can be fed into the third feeding path portion 24*c* by utilizing gravitation of the toner. Further, the third feeding path region 24*c* is disposed at the lowest position of the feeding path portion 24 in the vertical direction. For this reason, as described above, the toner supplied into the third feeding path region 24*c* from the inside of the toner accommodating portion 22 to by gravitation can be prevented from entering the first feeding path region 24*a* and the second feeding path region 24*b* move than necessary. By this, stabilization of the feeding amount of the toner fed in the feeding path portion 24 can be realized.

Further, as shown in part (e) of FIG. 43 and part (e) of FIG. 47, setting is made so that the area K2 of the region in which the outer configuration G21 overlaps with the outer configuration G31 is larger than the area K1 of the region in which the outer configuration G21 overlaps with the outer configuration 25*c*1 (K1<K2).

By this, the toner existing in the third feeding path region 24*c* can be sent to the second feeding path region 24*b* than being blown back to the communication opening 25, by the expansion/contraction operation of the pump portion 21. By this, stabilization of the feeding amount of the toner fed in the feeding path portion 24 can be realized.

<Toner Feeding from Toner Cartridge to Process Cartridge>

Next, a toner feeding operation from the toner cartridge B to the process cartridge A will be described using FIG. 1, FIG. 38, and FIG. 39. First, by using FIG. 38 and FIG. 39, the toner feeding operation in the toner cartridge B will be described. As shown in FIG. 39, the toner cartridge B is provided with the feeding portion 31.

The feeding portion 31 includes the feeding member 42 provided on the bottom of the toner accommodating portion 22 so as to be capable of being reciprocated and moved in arrow D1*a* and D1*b* directions of FIG. 39. The toner accommodated in the toner accommodating portion 22 is placed on the feeding member 42. The feeding member 42 reciprocates and moves in the arrow D1*a* and D1*a* directions of FIG. 39. At this time, maximum acceleration a2 at which the feeding member 42 in the arrow D1*b* direction of FIG. 39 is made larger than maximum acceleration a1 at which the feeding member 42 in the arrow D1*a* direction of FIG. 39. By this, the toner on the feeding member 42 is fed in the arrow D1*a* direction of FIG. 39.

The toner fed in the arrow D1*a* direction of FIG. 39 is guided by an inclined surface 22*a* provided at an inner surface of the toner accommodating portion 22 and is collected to the communication opening 25. The toner sent to the communication opening 25 passes, as shown in FIG. 38, through the communication opening 25 by gravitation since the communication opening 25 faces below the toner accommodating portion 22, and is sent into the feeding path portion 24. The toner carried into the feeding path portion 24 is sent to the discharge opening 23 by the flow of the air generated when the pump portion 21 is compressed.

As shown in FIG. 1, in a state the toner cartridge B and the process cartridge A are mounted in the image forming apparatus C, the discharge opening 23 of the feeding path portion 24 and one end portion of the main assembly path portion 1 provided on the apparatus main assembly C1 side of the image forming apparatus C communicate with each other. Further, the other end portion of the main assembly path portion 1 and the receiving portion 18 of the toner accommodating portion 17 of the process cartridge A communicate with each other.

The toner sent from the discharge opening 23 of the toner cartridge B passes through the main assembly path portion 1 provided in the image forming apparatus C and is fed into the toner accommodating portion 17 through the receiving portion 18 of the process cartridge A. As described above, the toner is fed from the toner cartridge B to the process cartridge A. In this embodiment, the toner can be discharged upward from the toner cartridge B disposed below the process cartridge A. Further, the toner can be discharged to a distant place.

Third Modified Embodiment to Fifth Modified Embodiment

In this embodiment, as shown in FIG. 44, an example of the opposing region forming portion 40*d*1 drooping from the lower surface of the cap member 40*d* toward the communication opening 25 was described, but is not limited to this shape.

Figure 49:
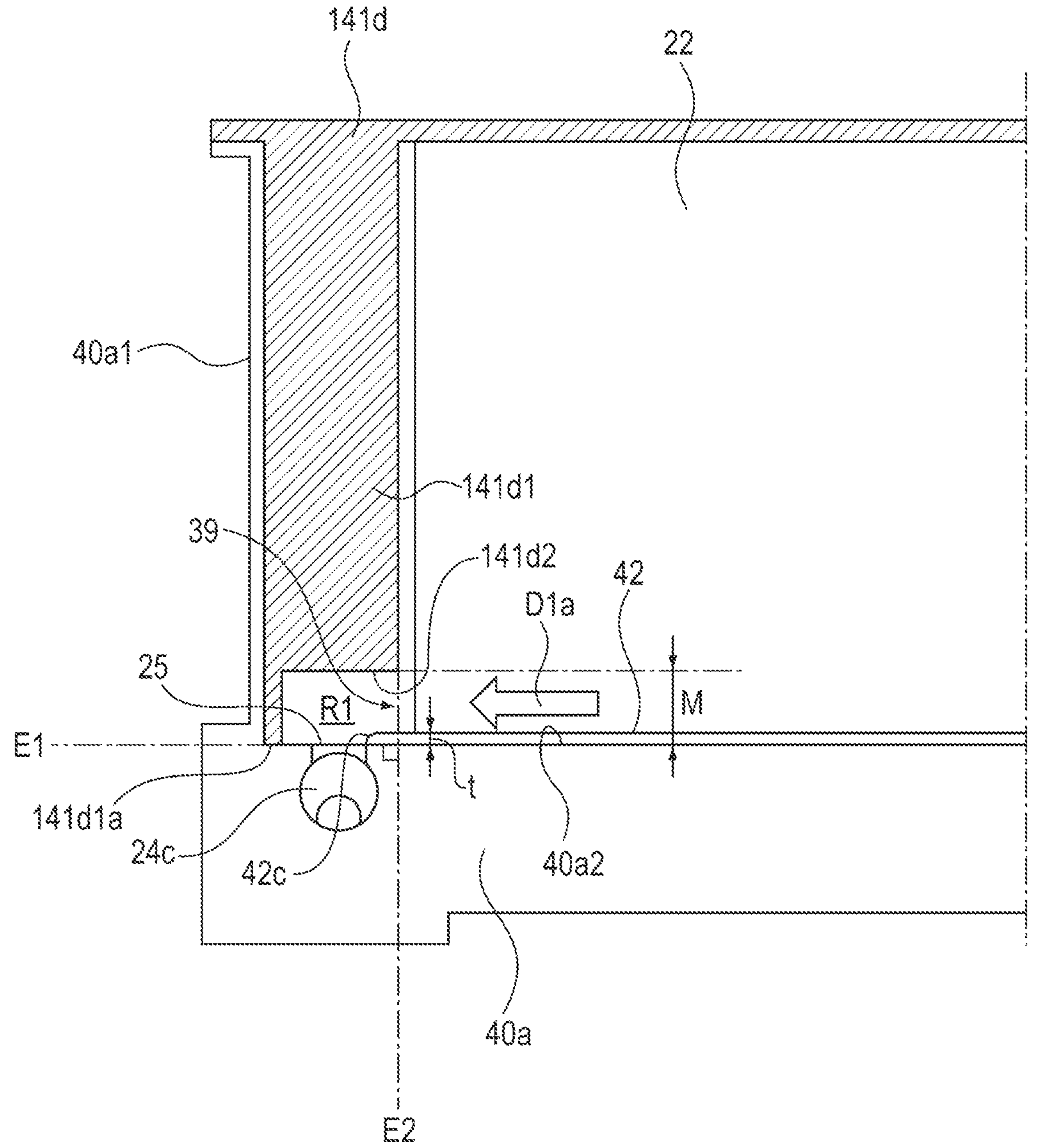
FIG. 49 is a sectional view showing a constitution of an opposing region forming portion provided in a toner accommodating portion of a third modified embodiment of the seventh embodiment.
Figure 50:
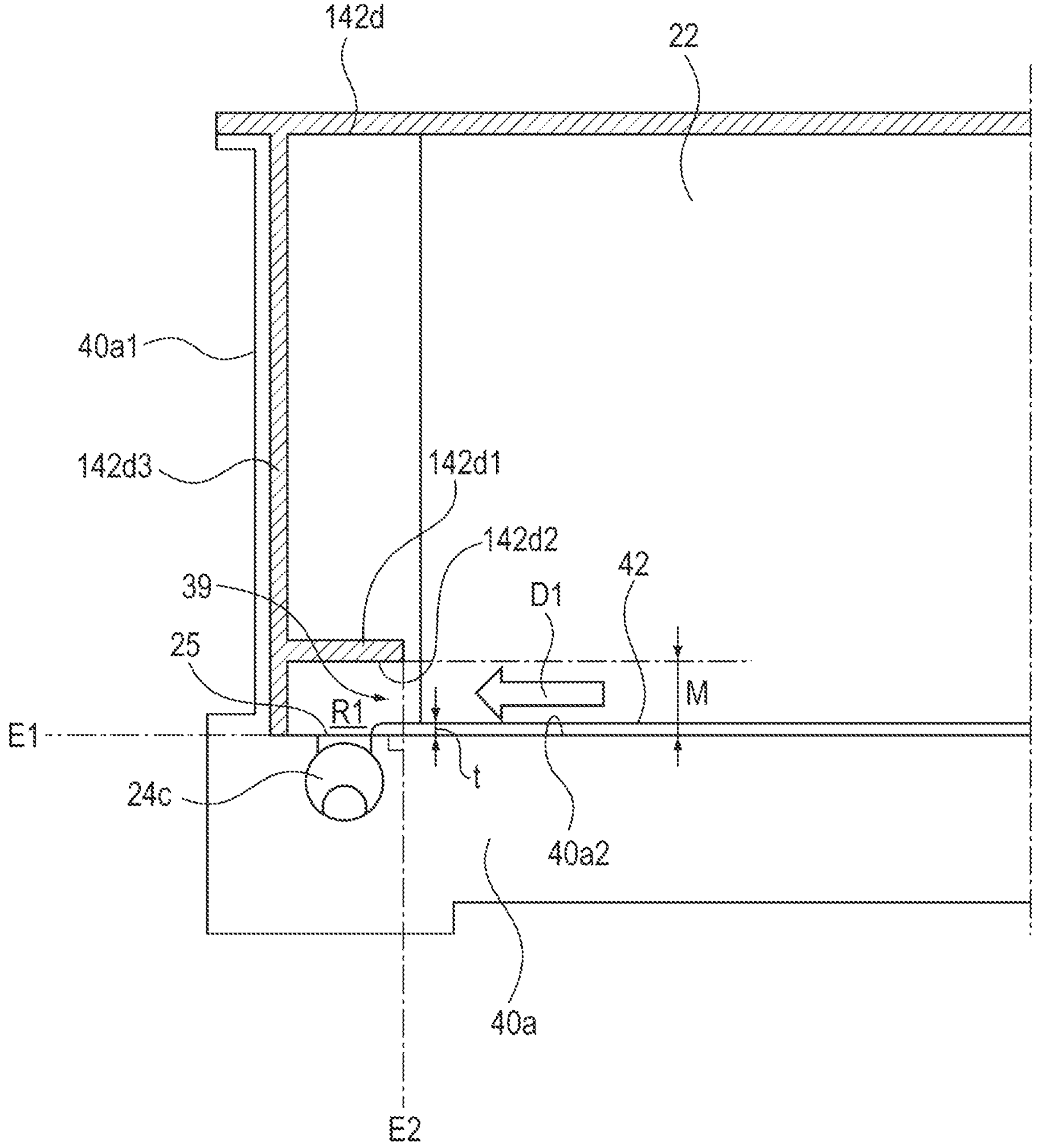
FIG. 50 is a sectional view showing a constitution of an opposing region forming portion provided in a toner accommodating portion of a fourth modified embodiment of the seventh embodiment.
Figure 51:
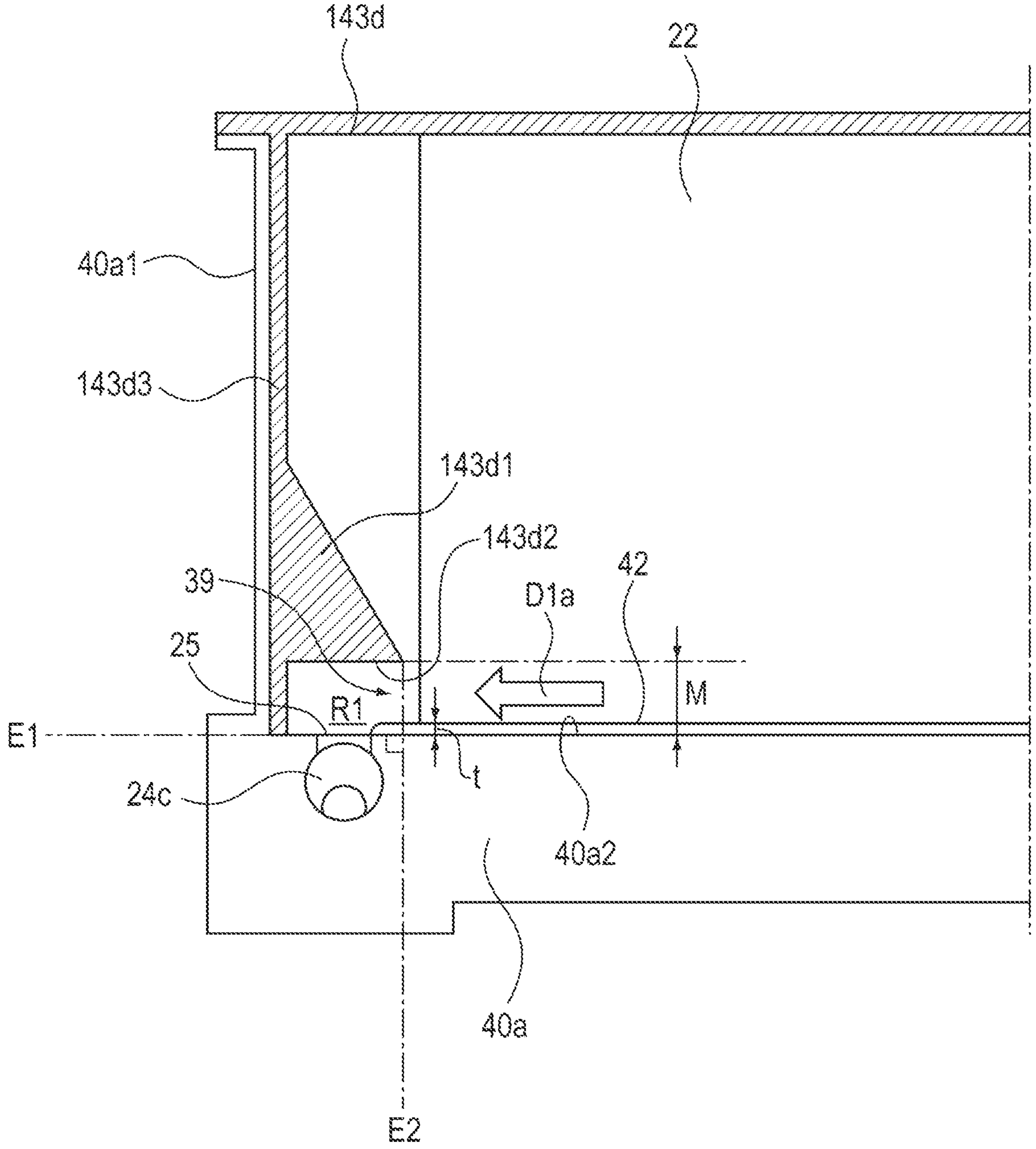
FIG. 51 is a sectional view showing a constitution of an opposing region forming portion provided in a toner accommodating portion of a fifth modified embodiment of the seventh embodiment.

FIG. 49 to FIG. 51 show a third modified embodiment to a fifth modified embodiment in which shapes of opposing region forming portions 141*d*1, 141*d*2, and 141*d*3 are different from each other. FIG. 49 is a sectional view showing a constitution of the opposing region forming portion 141*d*1 provided in the toner accommodating portion 22 of the third modified embodiment of this embodiment. FIG. 50 is a sectional view showing a constitution of the opposing region forming portion 141*d*2 provided in the toner accommodating portion 22 of the fourth embodiment of this embodiment. FIG. 51 is a sectional view showing a constitution of the opposing region forming portion 141*d*3 provided in the toner accommodating portion 22 of the fifth modified embodiment of this embodiment.

In the third modified embodiment shown in FIG. 49, the opposing region forming portion 141*d*1 consisting of a vertical member drooping from the lower surface of a cap member 142*d* to the bottom 40*a*2 of the toner accommodating portion 22 along the side plate 40*a*1 of the frame 40*a* is provided. The opposing region forming portion 141*d*1 is constituted by having a width in which an upper space of the communication opening 25 is substantially covered, and a lower end portion 141*d*1*a* on a side opposite from the toner accommodating portion 22 contacts the bottom 40*a*2 of the toner accommodating portion 22 with the communication opening 25 as a boundary.

In the fourth modified embodiment shown in FIG. 50, a vertical member 142*d*3 drooping from the lower surface of the cap member 142*d* to the bottom 40*a*2 of the toner accommodating portion 22 along the side plate 40*a*1 of the frame 40*a* is provided. Further, at an intermediary portion of the vertical member 142*d*3, the opposing region forming portion 142*d*1 which is perpendicular to the vertical member 142*d*3, which is extended toward the toner accommodating portion 22, and which includes an opposing surface 142*d*2 which is a lower surface of a lateral member substantially covering an upper space of the communication opening 25 is provided.

In the fifth modified embodiment shown in FIG. 51, a vertical member 143*d*3 drooping from the lower surface of the cap member 142*d* to the bottom of the toner accommodating portion 22 along the side plate 40*a*1 of the frame 40*a* is provided. Further, at an intermediary portion of the vertical member 143*d*3, the opposing region forming portion 143*d*1 which is extended toward the toner accommodating portion 22 and which includes an opposing surface 143*d*2 wherein a bottom of a triangular-shaped portion substantially covering an upper space of the communication opening 25 is provided.

Even in the case where the opposing region forming portions 141*d*1, 142*d*1 and 143*d*1 are constituted by shapes as in the third modified embodiment to the fifth modified embodiment, these opposing region forming portions are suitably applicable to these modified embodiments, respectively.

In this embodiment, materials of the respective cap members 40*d*, and 141*d*-143*d* and the feeding member 42 can be appropriately constituted by using general plastic materials. As such plastic materials, polystyrene (PS), polyethylene, terephthalate (PET), polyimide (PI) and the like are applicable. As other plastic materials, polyphenylene sulfide (PPS), polyethylene (PE), polypropylene (PP), and the like are applicable. As further other plastic materials, ABS resin, polycarbonate (PC), polyacetal (POM), and the like are applicable.

Further, in this embodiment, the case where the opposing region forming portions 40*d*1, and 141*d*1-143*d*1 are integrally constituted with the cap members 40*d*, and 141*d*-143*d*, respectively, was described, but the present invention is not limited to this constitution. For example, even in the case where the respective opposing region forming portions 40*d*1, and 141*d*1-143*d*1 are constituted as separate members from the respective cap members 40*d*, and 141*d*-143*d*, the constitution is suitably applicable. Further, the opposing region forming portion for restricting the toner feeding amount by substantially covering the upper space of the communication opening 25 can also be provided on the frame 40*a* side.

Further, in this embodiment, the constitution in which the toner feeding is carried out by the reciprocation motion of the feeding member 42 of the toner accommodating portion 22 of the toner cartridge B in the arrow D1*a* and D1*b* directions in the toner accommodating portion 22 was described as an example, but the present invention is not limited to this constitution. For example, even a constitution in which the toner feeding is carried out by using a known rotation stirring member in which a sheet member is mounted on a rotating shaft is suitably applicable.

Eighth Embodiment

Figure 52:
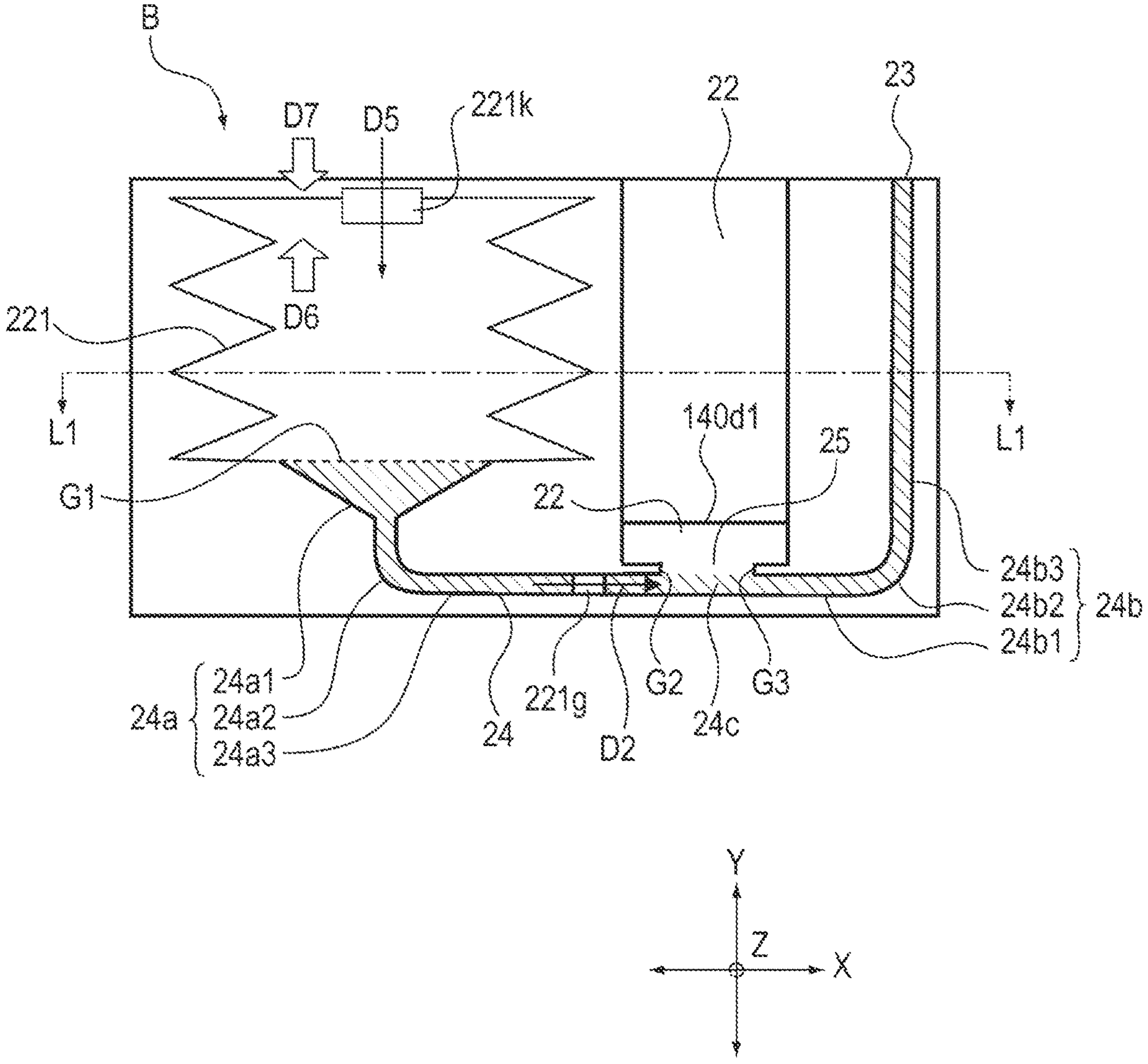
FIG. 52 is a sectional view showing a constitution of a pump portion, a feeding path portion, and an opposing region forming portion provided in a toner accommodating portion in an eighth embodiment.
Figure 53:
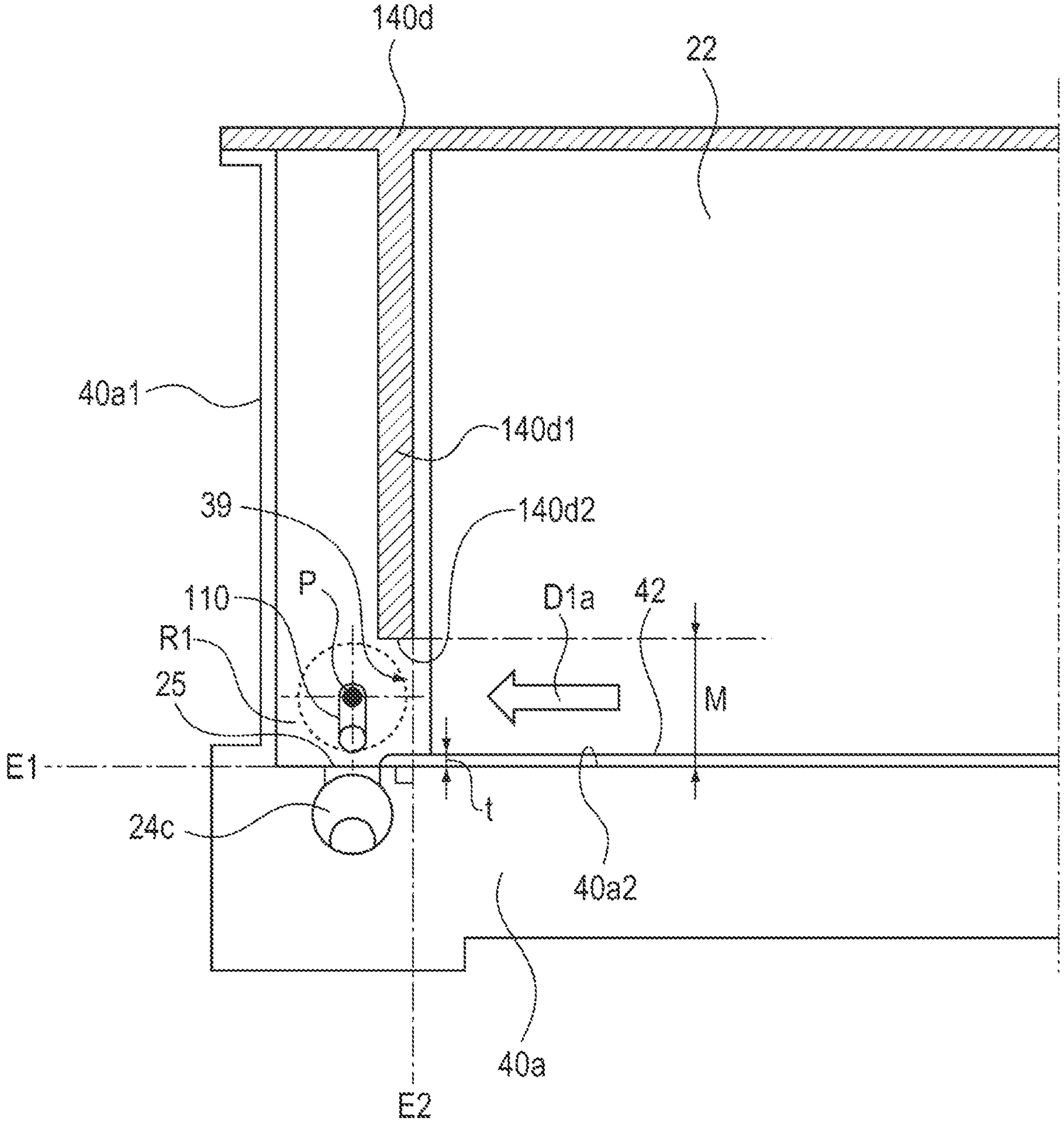
FIG. 53 is a sectional view showing a constitution of the opposing region forming portion and a stirring member which are provided in the toner accommodating portion of the eighth embodiment.

Next, using FIG. 52 and FIG. 53, constitutions of a developer supplying device and an image forming apparatus according to the present invention is an eighth embodiment will be described. Incidentally, members (portions) constituted similarly as in the axis direction seventh embodiment will be described by adding the same symbols or by adding the same member names even when the symbols are different. FIG. 52 is a support showing constitutions of a pump portion 221, the feeding path portion 24, and an opposing region forming portion 140*d*1 provided in the toner accommodating portion 22 in to this embodiment. FIG. 53 is a sectional view showing constitutions of an opposing region forming portion 140*d*1 and a stirring member 110 which are provided in the toner accommodating portion 22 of this embodiment.

In this embodiment, as shown in FIG. 52, the pump portion 221 is provided with an air vent valve 221*k*. The air vent (inlet) valve 221*k* causes the air to flow into the pump portion 221 (into the pump portion) from an outside during the expansion operation of the pump portion 221. Further, in the feeding path portion 24, between the boundary G1 (connection opening), between the pump portion 21 and the feeding path portion 24, and the communication opening a toner inflow suppressing member 221*g* as a suppressing member is provided.

The toner inflow suppressing member 221*g* permits passing of the air during the expansion operation of the pump portion 221, and suppresses passing of the toner. By this, toner clogging of the pump portion 221 and the feeding path portion 24 of the toner accommodating portion 22 is prevented. Incidentally, the image forming process of the image forming apparatus C and constitutions of the process cartridge A and the toner cartridge B are similar to those in the axis direction seventh embodiment, and therefore, overlapping Description Thereof Will be Omitted.

<Pump Portion and Feeding Path Portion>

Using FIG. 52, constitutions of the pump portion 221 and the feeding path portion 24 which are characteristic constitutions of this embodiment will be described. As shown in FIG. 52, the pump portion 221 is provided with the air vent valve 221*k* is provided. Further, a rectilinear portion 24*a*3 of the first feeding path region 24*a* of the feeding path portion 24 is provided with the toner inflow suppressing member 221*g*.

The air vent valve 221*k* is capable of causing the air to flow in an arrow D7 direction from the air vent valve 221*k* when the pump portion 221 performs the expansion operation in an arrow D6 direction as shown in FIG. 52. Further, an air valve such that the air does not flow from the air vent valve 221*k* in a direction opposite to the arrow D5 direction when the pump portion 221 performs the expansion operation in the arrow D6 direction is used.

Further, the toner inflow suppressing member 221*g* provided at the rectilinear portion 24*a*3 of the first feeding path region 24*a* of the feeding path portion 24 uses a filter member through which the air passes and which is capable of sealing the toner.

<Toner Accommodating Portion>

Next, using FIG. 53, a constitution of the toner accommodating portion 22 of this embodiment will be described. As shown in FIG. 53, the opposing region forming portion 140*d*1 constituted integrally with the cap member 140*d* was provided at a position substantially opposing the third feeding path portion 24*c* of the feeding path portion 24 in an upper space of the communication opening 25. Further, the opposing region forming portion 140*d*1 is disposed on a side upstream of the communication opening 25 in the arrow D1*a* direction.

Further, in this embodiment, the gap M1 between the opposing region forming portion 140*d*1 and the bottom 40*a*2 of the toner accommodating portion 22 is constituted by 15 mm, but the present invention is not limited to this constitution.

Further, the stirring member 110 rotating about a rotation center P is provided above the communication opening 25. The stirring member 110 loosens the toner fed from the toner accommodating portion 22 toward the feeding path portion 24.

<Inflow Prevention of Toner into Pump Portion by Air Vent Valve and Toner Inflow to Suppressing Member>

Next, using FIG. 52, an action of preventing inflow of the toner into the pump portion 221 by the air vent valve 221*k* and the toner inflow suppressing member 221*g* will be described.

As shown in FIG. 52, by the expansion operation of the pump portion 221 in the arrow D6 direction, the air is caused to flow into the pump portion 221 from an outside through the air vent valve 221*k* in the arrow D5 direction. For this reason, the air does not flow toward the first feeding path region 24*a* from the second feeding path region 24*b* or the third feeding path region 24*c* of the feeding path portion 24.

On the other hand, by the compression operation of the pump portion 201 in the arrow D7 direction, the air generated form the pump portion 221 flows toward the arrow D2 direction. Then, the air passes through the first feeding path region 24*a*, the third feeding path region 24*c*, and the second feeding path region 24*b* of the feeding path portion 24 and is discharged together with the toner supplied from the toner accommodating portion 22, through the discharge opening 23.

At this time, the toner inflow suppressing member 221*g* provided at the rectilinear portion 24*a*3 of the first feeding path region 24*a* enables the flow of the air in the arrow D2 direction from the first feeding path region 24*a* toward the third feeding path region 24*c* and the second feeding path region 24*b*. On the other hand, the toner inflow suppressing member 221*g* prevents the flow of the toner into the first feeding path region 24*a*.

<Toner Supply by Opposing Region Forming Portion and Stirring Member>

Next, using FIG. 53, the toner supplying action by the opposing region forming portion 140*d*1 and rotation of the stirring member 110 will be described. As shown in FIG. 53, the toner fed in the arrow D1*a* direction by the feeding to member 42 is partially scraped off of the feeding member 42 by the opposing region forming portion 141*d*1 provided on the cap member 140*d*.

For this reason, the toner on the feeding member 42 is restricted in amount of the toner toward the communication opening 25 by the opposing region forming portion 140*d*1, so that the toner is supplied to the third feeding path region 24*c* of the feeding path portion 24 through the communication opening 25 by gravitation.

In this embodiment, as shown in FIG. 52, during the expansion operation of the pump portion 221 in the arrow D6 direction, the air does not flow in a direction from the third feeding path region 24*c* toward the pump portion 221 by the action of the air vent valve 221*k*. For this reason, a force for drawing the toner from the communication opening 25 toward the third feeding path region 24*c* does not generate.

For this reason, as shown in FIG. 53, the toner fed toward the communication opening 25 by the feeding member 42 is loosened by the rotation of the stirring member 110, so that the toner is made easy to drop from the communication opening 25 into the third feeding path region 24*c* of the feeding path portion 24 by the gravitation.

<Effect of Toner Back-Flow Prevention>

The amount of the toner fed to the feeding path portion 24 through the communication opening 25 can be restricted by the toner inflow suppressing member 221*g* and the opposing region forming portion 140*d*1. By this, the flow of the toner into the pump portion 221 can be prevented. By this, clogging of the pump portion 221 and the feeding path portion 24 with the toner can be prevented. Other constitutions are constituted similarly as in the axis direction respective embodiments, and a similar effect can be obtained.

INDUSTRIAL APPLICABILITY

The developer supplying device and the image forming apparatus of the present invention is capable of being utilized in industry for manufacturing an image forming apparatus to which electrophotographic technology is applied.

The present invention is not restricted to the foregoing embodiments, but can be variously changed and modified without departing from the spirit and the scope of the present invention. Accordingly, the following claims are attached for making public the scope of the present invention.

This application claims the Conventional Priority from Japanese Patent Application 2019-168100 filed Sep. 17, 2019, Japanese Patent Application 2019-168101 filed Sep. 17, 2019 and Japanese Patent Application 2019-168102 filed Sep. 17, 2019, all disclosure of which are incorporated by reference herein.

The invention claimed is:

1. An image forming apparatus comprising:
- a main assembly including a pipe;
- a toner supplying device detachably attached to the main assembly, the toner supplying device including:
  - a first toner accommodating portion that is configured to accommodate toner, and
  - a pump portion for generating air flow,
  - the toner supplying device including a discharge opening for discharging toner together with air after the air generated by the pump portion and the toner are merged inside the toner supplying device; and
- a developing device including:
  - a rotatable developing roller configured to bear toner for being supplied to a photosensitive drum, and
  - a second toner accommodating portion configured to accommodate toner to be conveyed from the toner supplying device, the toner being received through a receiving opening of the second toner accommodating portion, being accommodated therein, and being supplied to the developing roller,
- wherein the pipe is configured to pass toner upward from the discharge opening toward the receiving opening by the air flow generated by the pump portion,
- wherein, as seen in a rotational axis direction of the developing roller, a part of the toner supplying device and a part of the developing device are aligned in a direction of gravitation.

2. The image forming apparatus according to claim 1, further comprising a laser scanner configured to scan a laser light on the photosensitive drum,
- wherein, as seen in the rotational axis direction, the laser scanner is provided at the same position as the toner supplying device in the direction perpendicular to both the direction of gravitation and the rotational axis direction.

3. The image forming apparatus according to claim 1, further comprising a laser scanner configured to scan a laser light on the photosensitive drum,
- wherein, as seen in the rotational axis direction, the laser scanner is provided at the same position as the developing device in the direction perpendicular to both the direction of gravitation and the rotational axis direction.

4. The image forming apparatus according to claim 1, wherein, as seen in the rotational axis direction, the toner supplying device is provided at the same position-as the photosensitive drum in the direction perpendicular to both the direction of gravitation and the rotational axis direction.

5. The image forming apparatus according to claim 1, wherein, as seen in the rotational axis direction, the toner supplying device is provided at the same position as the developing roller in the direction perpendicular to both the direction of gravitation and the rotational axis direction.

6. The image forming apparatus according to claim 1, wherein, as seen in the rotational axis direction, the pump portion is provided at the same position as the developing device in the direction perpendicular to both the direction of gravitation and the rotational axis direction.

7. The image forming apparatus according to claim 1, wherein, as seen in the rotational axis direction, the pipe is provided at the same position as the toner supplying device in the direction perpendicular to both the direction of gravitation and the rotational axis direction.

8. The image forming apparatus according to claim 1, wherein, as seen in the rotational axis direction, the pump portion is provided at the same position as the photosensitive drum in the direction perpendicular to both the direction of gravitation and the rotational axis direction.

9. The image forming apparatus according to claim 1, wherein, as seen in the rotational axis direction, the first toner accommodating portion is provided at the same position as the developing device in the direction perpendicular to both the direction of gravitation and the rotational axis direction.

10. The image forming apparatus according to claim 1, wherein, as seen in the rotational axis direction, the first toner accommodating portion is provided at the same position as the second toner accommodating portion in the direction perpendicular to both the direction of gravitation and the rotational axis direction.

11. The image forming apparatus according to claim 1, further comprising a laser scanner configured to scan a laser light on the photosensitive drum, wherein, as seen in the rotational axis direction, the laser scanner is provided at the same position as the first toner accommodating portion in the direction perpendicular to both the direction of gravitation and the rotational axis direction.

12. The image forming apparatus according to claim 1, further comprising a laser scanner configured to scan a laser light on the photosensitive drum, wherein, as seen in the rotational axis direction, the laser scanner is provided at the same position as the pipe in the direction perpendicular to both the direction of gravitation and the rotational axis direction.

13. The image forming apparatus according to claim 1, wherein, as seen in the rotational axis direction, the pump portion is at an end portion of the toner supplying device in the direction perpendicular to both the direction of gravitation and the rotational axis direction.

* * * * *